United States Patent
Okumura

(10) Patent No.: US 10,455,829 B2
(45) Date of Patent: Oct. 29, 2019

(54) LIGHT IRRADIATION DEVICE AND LIGHT IRRADIATION SYSTEM

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/562,494

(22) PCT Filed: Apr. 15, 2016

(86) PCT No.: PCT/JP2016/002052
§ 371 (c)(1),
(2) Date: Sep. 28, 2017

(87) PCT Pub. No.: WO2016/170766
PCT Pub. Date: Oct. 27, 2016

(65) Prior Publication Data
US 2018/0092345 A1 Apr. 5, 2018

(30) Foreign Application Priority Data
Apr. 20, 2015 (JP) ................................. 2015-085822

(51) Int. Cl.
*A01M 29/10* (2011.01)
*B64C 13/20* (2006.01)
(Continued)

(52) U.S. Cl.
CPC ............. *A01M 29/10* (2013.01); *B64C 13/20* (2013.01); *B64C 27/08* (2013.01); *B64C 39/024* (2013.01);
(Continued)

(58) Field of Classification Search
CPC ........ A01M 29/10; B64C 13/20; B64C 27/08; B64D 47/02; F41G 3/14
See application file for complete search history.

(56) References Cited

U.S. PATENT DOCUMENTS

| 9,613,539 B1 * | 4/2017 | Lindskog | ................. G08G 5/04 |
| 2006/0268664 A1 * | 11/2006 | Lewis | .................... A01K 79/02 |
| | | | 367/139 |

(Continued)

FOREIGN PATENT DOCUMENTS

| JP | H06-292495 A | 10/1994 |
| JP | 2000-217498 A | 8/2000 |

(Continued)

OTHER PUBLICATIONS

International Search Report for PCT Application No. PCT/JP2016/002052, dated May 31, 2016.

(Continued)

*Primary Examiner* — Quan-Zhen Wang
*Assistant Examiner* — Rajsheed O Black-Childress

(57) ABSTRACT

A light irradiation device includes: at least one imaging means that images a monitoring region to continue to accurately irradiate a moving target with light; at least one projection means that irradiates the monitoring region with signal light; a control means that controls the imaging means to image the monitoring region and controls the projection means to emit the signal light; at least one propeller that moves the own device in the air; and a flight control means that controls flight of the own device by controlling the propeller, the control means controlling, when recognizing a light irradiation target to be irradiated with the signal light on image data imaged by the imaging means, the projection means to emit the signal light toward the light irradiation target.

18 Claims, 44 Drawing Sheets

(51) Int. Cl.
*B64C 27/08* (2006.01)
*B64D 47/02* (2006.01)
*F41G 3/14* (2006.01)
*B64D 47/08* (2006.01)
*H04N 5/225* (2006.01)
*B64C 39/02* (2006.01)
*F41G 7/22* (2006.01)
*G08B 13/196* (2006.01)

(52) U.S. Cl.
CPC .............. *B64D 47/02* (2013.01); *B64D 47/08* (2013.01); *F41G 3/14* (2013.01); *F41G 3/145* (2013.01); *H04N 5/2256* (2013.01); *B64C 2201/027* (2013.01); *B64C 2201/141* (2013.01); *F41G 7/226* (2013.01); *F41G 7/2293* (2013.01); *G08B 13/1965* (2013.01)

(56) References Cited

U.S. PATENT DOCUMENTS

| | | | |
|---|---|---|---|
| 2014/0148978 A1 | 5/2014 | Duncan et al. | |
| 2014/0201126 A1* | 7/2014 | Zadeh | G06K 9/627 706/52 |
| 2014/0261151 A1* | 9/2014 | Ronning | A01M 29/10 116/22 A |
| 2014/0285667 A1* | 9/2014 | Aimura | G08G 1/166 348/148 |
| 2015/0009695 A1* | 1/2015 | Christmas | G03H 1/2249 362/466 |
| 2016/0055399 A1 | 2/2016 | Hiester | |
| 2016/0063310 A1 | 3/2016 | Okamoto et al. | |
| 2018/0045400 A1 | 2/2018 | Bushee | |
| 2018/0064094 A1* | 3/2018 | Cantrell | H04W 4/40 |
| 2018/0292184 A1* | 10/2018 | Down | F41H 11/02 |

FOREIGN PATENT DOCUMENTS

| | | |
|---|---|---|
| JP | 2008-237038 A | 10/2008 |
| JP | 2009-045054 A | 3/2009 |
| JP | 2011-229453 A | 11/2011 |
| JP | 2011-250745 A | 12/2011 |
| JP | 2014-018167 A | 2/2014 |
| JP | 2014-031118 A | 2/2014 |
| JP | 2014-119827 A | 6/2014 |
| JP | 3199308 U | 8/2015 |
| WO | 2014/157058 A1 | 10/2014 |

OTHER PUBLICATIONS

English translation of Written opinion for PCT Application No. PCT/JP2016/002052.

U.S. Office Action for U.S. Appl. No. 16/412,506 dated Jun. 26, 2019.

U.S. Office Action for U.S. Appl. No. 16/412,532 dated Jun. 25, 2019.

* cited by examiner

LIGHT IRRADIATION DEVICE AND LIGHT IRRADIATION SYSTEM

This application is a National Stage Entry of PCT/JP2016/002052 filed on Apr. 15, 2016, which claims priority from Japanese Patent Application 2015-085822 filed on Apr. 20, 2015, the contents of all of which are incorporated herein by reference, in their entirety.

TECHNICAL FIELD

The present invention relates to a light irradiation device and a light irradiation system. In particular, the present invention relates to a light irradiation device and a light irradiation system that irradiate a moving target with light.

BACKGROUND ART

Over recent year, bird strikes have been problematic. Around an airport, when a bird is sucked into an air inlet of a jet engine of an airplane that takes off/lands on a runway, a large accident may occur. Further, in a wind power station, when a bird collides with a blade of a wind power generator, the blade may be broken or the power generator may malfunction.

PTL 1 discloses a bird detection system that extracts a bird candidate image from images captured in an airport and an airport periphery and detects a bird based on a size of the extracted bird candidate image and a moving time of the bird candidate image. According to the technique of PTL 1, a bird having come flying to a facility such as an airport, a wind power station, or a periphery thereof can be detected.

PTL 2 discloses a bird repellent device that detects a bird that is approaching a wind power generator and forces the detected bird to evacuate. The device of PTL 2 detects a bird by continuously imaging a predetermined space region and forces the detected bird to evacuate by emitting substantially parallel light toward a space where the detected bird is flying.

PTL 3 discloses a bird and animal control system that threateningly excludes birds and animals using a threatening sound.

Further, without limitation to birds and animals such as birds, there is an application for continuing to capture movements of a moving object such as an automobile and irradiating the moving object with light.

PTL 4 discloses an imaging system that causes a flying robot to image an object having entered a monitoring space. The flying robot of PTL 4 tracks, when detecting that an object has entered a monitoring space, the detected object and images the object from a predetermined altitude.

CITATION LIST

Patent Literature

PTL 1: International Publication No. WO2014/157058
PTL 2: Japanese Laid-open Patent Publication No. 2011-229453
PTL 3: Japanese Laid-open Patent Publication No. 2000-217498
PTL 4: Japanese Laid-open Patent Publication No. 2014-119827

SUMMARY OF INVENTION

Technical Problem

According to the techniques of PTLs 1 to 3, evacuation of birds can be forced in addition to detection of birds. However, in the technique of PTL 2, while light can be emitted toward a space where a bird is flying, there is a problem that it is not always possible for the bird itself to be hit with light. Further, when evacuation of a bird is forced using a threatening sound as in PTL 3, realistically, it is necessary that a person directly go to a spot where a bird has been detected and cause the threatening sound to accurately reach the detected bird.

According to the technique of PTL 4, it is possible that a moving body such as an automobile having entered a monitoring space is detected using a flying robot and the detected moving body is imaged. However, a method for continuously irradiating, while causing a flying robot to fly by following a moving body, the moving body with light is not disclosed.

An object of the present invention is to provide a light irradiation device that solves the above-described problems and continues to irradiate a moving target with light accurately.

Solution to Problem

A light irradiation device of the present invention includes: at least one imaging means that images a monitoring region; at least one projection means that irradiates the monitoring region with signal light; a control means that controls the imaging means to image the monitoring region and controls the projection means to emit the signal light; at least one propeller that moves the own device in the air; and a flight control means that controls flight of the own device by controlling the propeller, the control means controls, when recognizing a light irradiation target to be irradiated with the signal light on image data imaged by the imaging means, the projection means to emit the signal light toward the light irradiation target.

A light irradiation system according to the present invention includes: at least one light irradiation device including an imaging means that images a monitoring region, a projection means that irradiates the monitoring region with signal light, a control means that controls the imaging means to image the monitoring region and controls the projection means to emit the signal light, at least one propeller that moves the own device in the air, and a flight control means that controls flight of the own device by controlling the propeller and monitors a charging state of a rechargeable battery mounted on the own device; and at least one stationary camera station including the imaging means, the projection means, and the control means, the control means controls, when recognizing a light irradiation target to be irradiated with signal light on image data imaged by the imaging means, the projection means to emit the signal light toward the light irradiation target.

Advantageous Effects of Invention

According to the present invention, it is possible to provide a light irradiation device that continues to irradiate a moving target with light accurately.

DESCRIPTION OF EMBODIMENTS

Hereinafter, example embodiments of the present invention will be described using the accompanying drawings. However, in the example embodiments to be described below, to carry out the present invention, technically preferable limits are set, but the scope of the invention is not limited to the following. In all the figures used to describe the following example embodiments, the same place is assigned with the same reference sign unless there is a particular reason. Further, in the following example embodiments, repetitive description on the same configuration/operation may be omitted.

(First Example Embodiment)
[Configuration]

First, a light irradiation device 1 according to a first example embodiment of the present invention will be described with reference to corresponding drawings.

Figure 1:
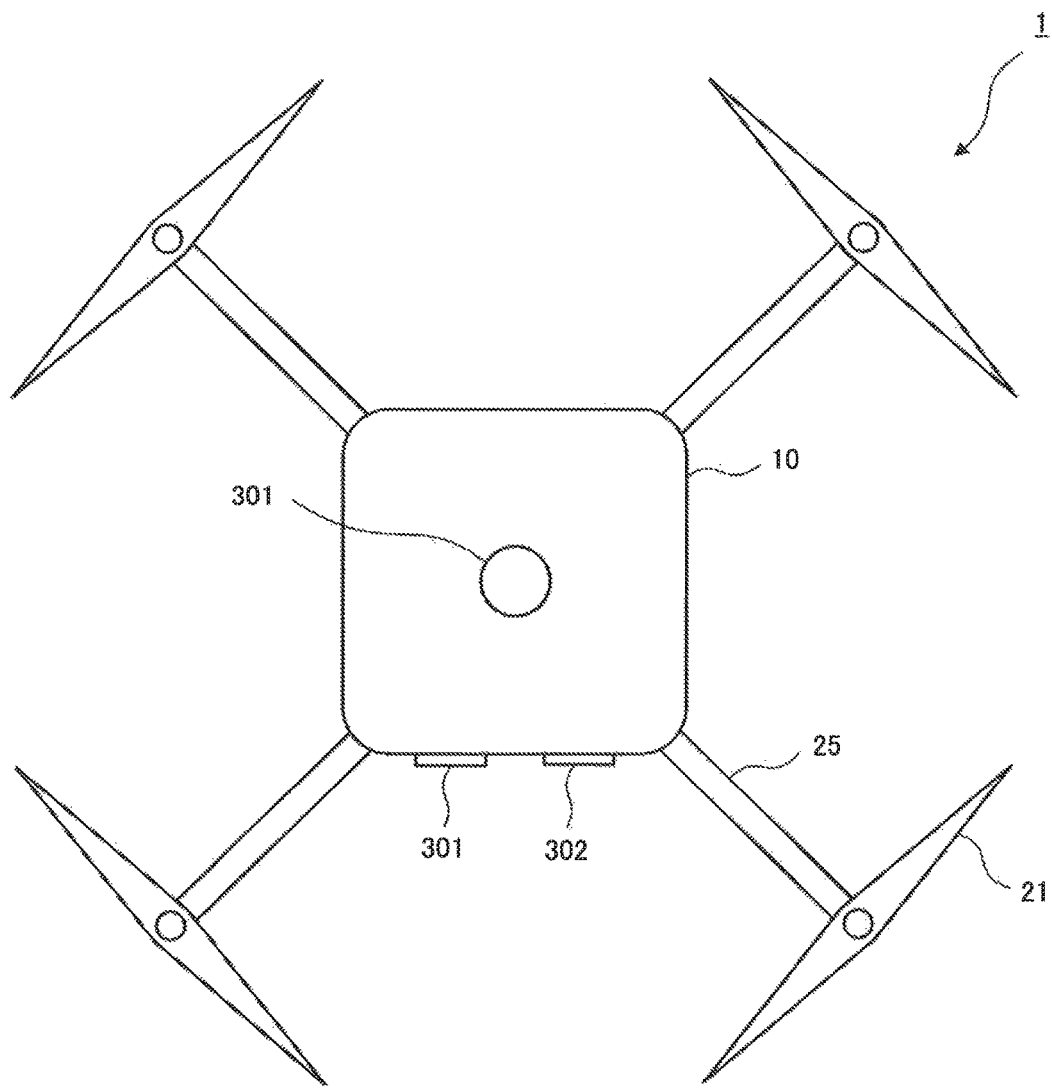
FIG. 1 is a bottom view of one example of a light irradiation device according to a first example embodiment of the present invention.
Figure 2:
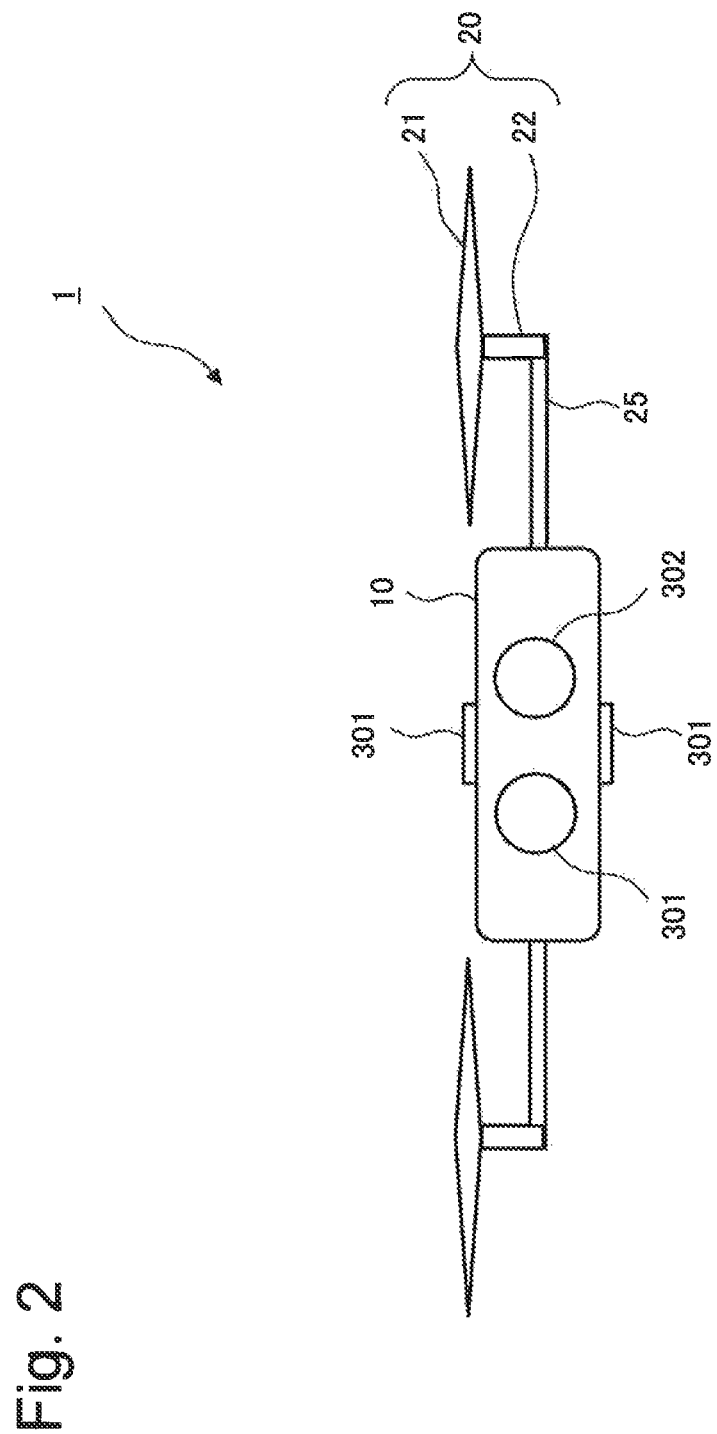
FIG. 2 is a side view of one example of the light irradiation device according to the first example embodiment of the present invention.

FIG. 1 is a bottom view of the light irradiation device 1 according to the present example embodiment. FIG. 2 is a side view of the light irradiation device 1 according to the present example embodiment. A top view, a rear view, an oblique view, and the like of the light irradiation device 1 are omitted.

The light irradiation device 1 according to the present example embodiment includes a main body 10 mounted with a camera function for imaging a monitoring region and a projector function for irradiating a target (hereinafter, referred to as a light irradiation target) moving in the monitoring region with light. As in FIG. 1 and FIG. 2, a camera 301 and a projector 302 are exposed to the outside from the main body 10 of the light irradiation device 1. In FIG. 1 and FIG. 2, only tip portions of the camera 301 and the projector 302 are illustrated, and most functions thereof are mounted inside the main body 10. Further, a function of the camera 301 is enabled by an imaging means to be described later, and a function of the projector 302 is enabled by a projection means to be described later.

The camera 301 may be disposed such that the light irradiation device 1 has a visual field of 360 degrees, and a number thereof is not limited. When, for example, a visual field of 360 degrees is obtained via a single camera 301, one unit of the camera 301 is employable. In the visual field of the camera 301, a visual field of 360 degrees may be obtained by changing an aerial posture, even when a visual filed of 360 degrees is not obtained in a stationary state. Further, a plurality of cameras 301 may be disposed to mutually compensate a part of the visual field.

The projector 302 is preferably disposed on a front face of the light irradiation device 1 when monitoring forward, on a lower face of the light irradiation device 1 when monitoring downward, and on an upper face of the light irradiation device 1 when monitoring upward. The camera 301 and the projector 302 may be disposed on faces different from each other. Further, as in FIG. 3, a plurality of cameras 301 and projectors 302 may be disposed as a set on a plurality of faces. Further, a protection member such as a protection film, a protection glass, and the like is provided for the camera 301 and the projector 302.

Further, the light irradiation device 1 according to the present example embodiment includes at least one propeller 20 for moving the main body 10 in the air. The propeller 20 is also referred to as a rotor or a rotary wing. Each propeller 20 includes a blade 21 for generating a lift force by rotation and a motor 22 for rotating the blade and is fixed to the main body 10 using a frame 25. A size and an attachment position of the propeller 20 of FIG. 1 to FIG. 3 are conceptual and therefore are not sufficiently designed in such a way to cause the light irradiation device 1 to fly.

Figure 3:
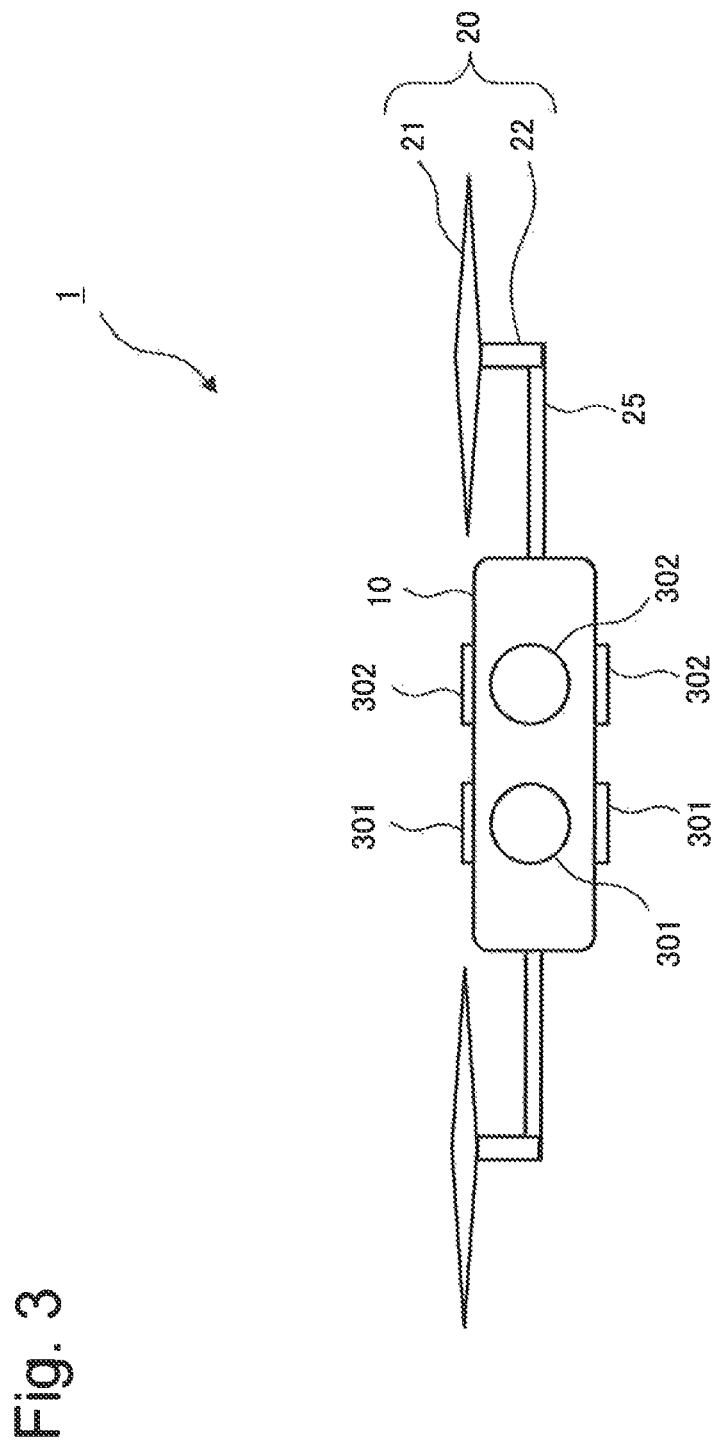
FIG. 3 is a side view of another example of the light irradiation device according to the first example embodiment of the present invention.

In the examples of FIG. 1 to FIG. 3, four propellers 20 are disposed in the main body 10 of the light irradiation device 1. When the light irradiation device 1 includes a plurality of propellers 20, rotation numbers of the respective propellers 20 are controlled independently of each other.

In the examples of FIG. 1 to FIG. 3, a quadcopter including four blades 21 is cited as one example. The light irradiation device 1 may include a single blade 21 or may be a multicopter including a plurality of blades 21. When posture stability in the air and flight performance are considered, the light irradiation device 1 is preferably a multicopter including a plurality of blades 21. The light irradiation device 1 according to the present example embodiment can be enabled by a flight function of a small flying object generally referred to as a drone.

When the light irradiation device 1 includes a plurality of blades 21, sizes of the respective blades 21 may be different from each other. Further, rotation faces of the respective blades 21 disposed in the light irradiation device 1 may be different from each other. For example, as in a general helicopter, a configuration in which a main propeller for obtaining a lift force and a sub-propeller for stabilizing a posture of a fuselage are included may be made. Further, for example, the light irradiation device 1 may be configured to float in the air by a floating force of an air ball, a balloon, or the like filled with gas having a specific gravity smaller than that of the air and use the propeller 20 for propulsion and direction control.

[Light Irradiation Device]

Next, a functional configuration of the light irradiation device 1 according to the present example embodiment will be described with reference to a corresponding drawing.

Figure 4:
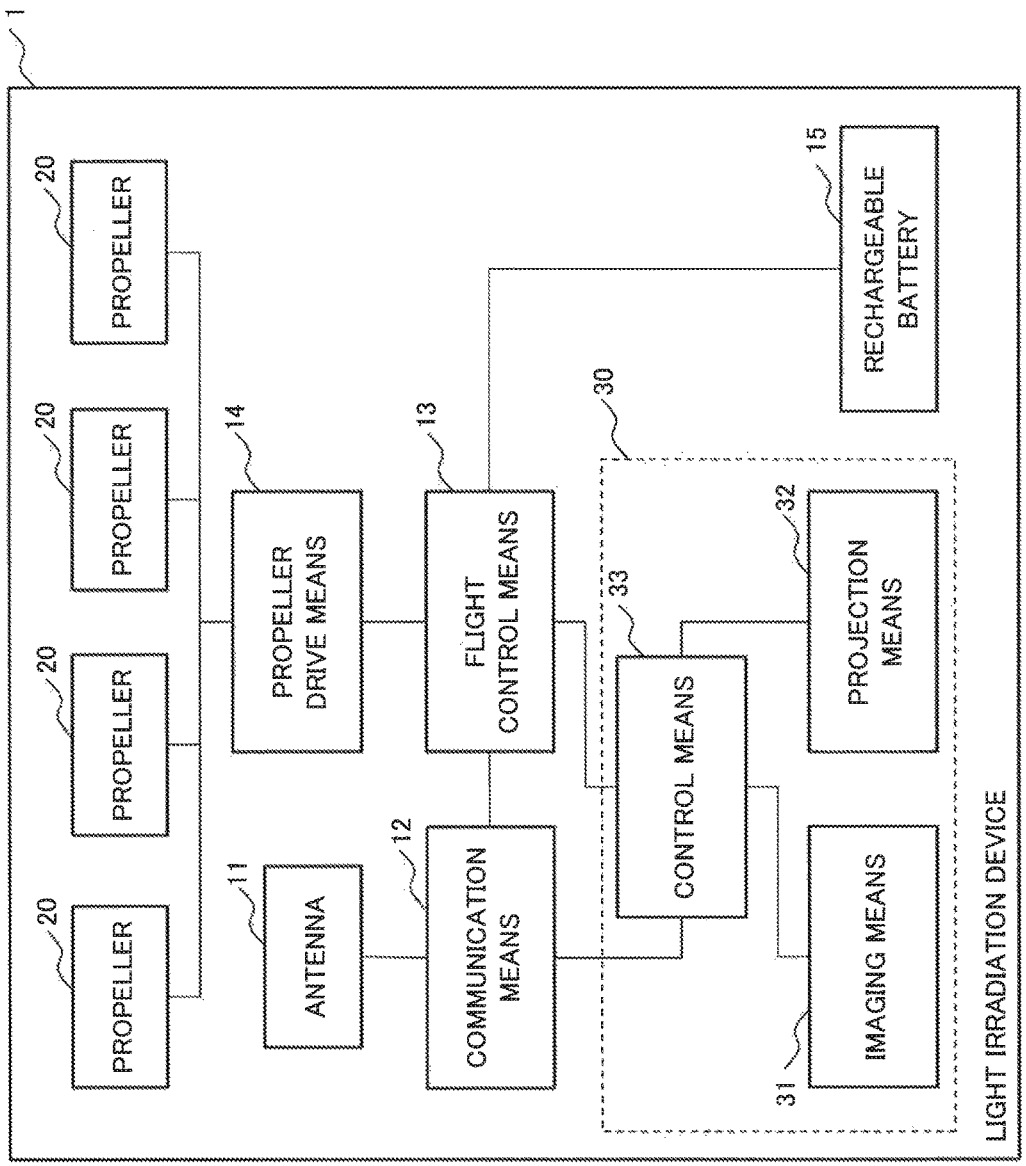
FIG. 4 is a block diagram illustrating a configuration of the light irradiation device according to the first example embodiment of the present invention.

As in FIG. 4, the light irradiation device 1 according to the present example embodiment includes an antenna 11, a communication means 12, a flight control means 13, a propeller drive means 14, a rechargeable battery 15, at least one propeller 20, an imaging means 31, a projection means 32, and a control means 33.

The antenna 11 is an antenna for receiving a radio signal originated by an external higher-level system or the like.

The communication means 12 includes a communication control function for receiving a radio signal received by the antenna 11 and transmitting data generated inside the light irradiation device 1 to an external higher-level system or the like.

The flight control means 13 is a means that controls flight of the light irradiation device 1. The flight control means 13 is a means to control flight of the light irradiation device 1. Using FIG. 5, the flight control means 13 will be described in detail.

[Flight Control Means]

Figure 5:
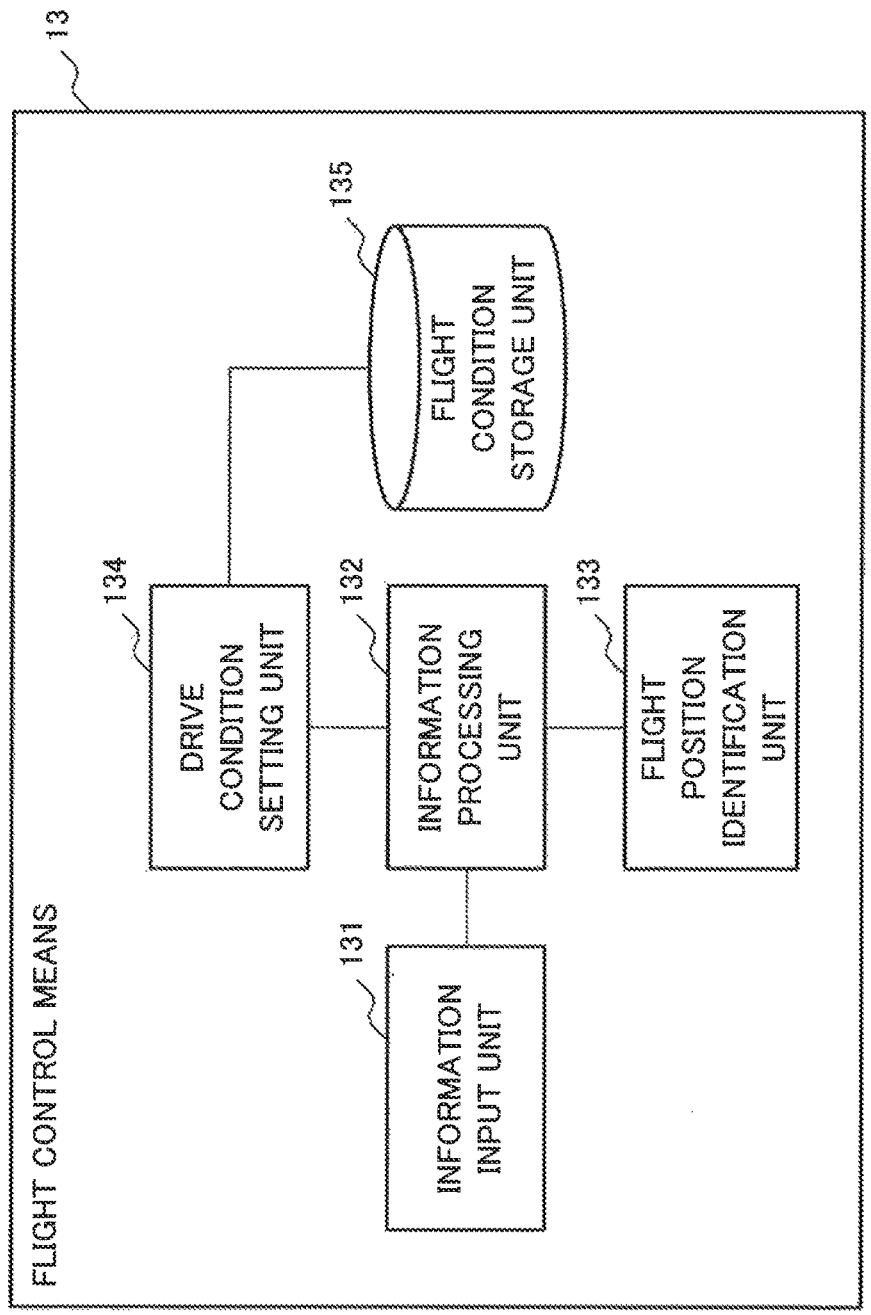
FIG. 5 is a block diagram illustrating a configuration of a flight control means of the light irradiation device according to the first example embodiment of the present invention.

As in FIG. 5, the flight control means 13 includes an information input unit 131, an information processing unit 132, a flight position identification unit 133, a drive condition setting unit 134, and a flight condition storage unit 135.

The information input unit 131 receives information from the communication means 12 or the control means 33 and outputs the received information to the information processing unit 132.

The information input unit 131 receives, from the communication means 12, for example, information about what monitoring region is monitored and what target is set as a light irradiation target. Further, the information input unit 131 receives, from the control means 33, for example, information about what a detected light irradiation target is and where the light irradiation target is located. Further, the information input unit 131 receives, from the control means 33, for example, a flight instruction regarding in what direction the own device is caused to fly.

Further, the information input unit 131 notifies, when receiving a flight condition regarding a flight position, a flight velocity, and the like from a higher-level system, the information processing unit 132 of the flight condition.

The information processing unit 132 sets a flight condition for the light irradiation device 1, based on information input to the flight control means 13. Usually, the information processing unit 132 controls the light irradiation device 1 to fly toward a light irradiation target 501. At how much distance the light irradiation device 1 approaches the light irradiation target 501 may be included in a flight condition stored, for example, by the flight condition storage unit 135.

Further, the information processing unit 132 outputs, when receiving a flight condition acquired from a higher-level system, a processing result for setting the flight condition to the drive condition setting unit 134.

The flight position identification unit 133 is a means to identify a current position where the light irradiation device 1 is flying. The flight position identification unit 133 includes, for example, a positioning system such as a GPS (Global Positioning System) and the like and a sensor such as a geomagnetic sensor, an acceleration sensor, a velocity sensor, an altitude sensor, a ranging sensor, and the like for identifying a flight position.

The drive condition setting unit 134 acquires an appropriate flight condition from the flight condition storage unit 135 in accordance with the processing result of the information processing unit 132 and sets a drive condition for the propeller 20 based on the acquired flight condition. The drive condition setting unit 134 outputs the drive condition for the propeller 20 set by itself to the propeller drive means 14. When the processing result obtained by the information processing unit 132 includes a flight condition acquired from a higher-level system, a drive condition for the propeller 20 based on the flight condition is output to the propeller drive means 14.

The flight condition storage unit 135 is a storage device that stores a flight condition of the light irradiation device 1. The flight condition storage unit 135 may store, for example, a drive condition for the propeller 20 in accordance with a size and a moving velocity of a light irradiation target. The flight condition storage unit 135 may store, for example, a drive condition for the propeller 20 in accordance with a distance relation and a position relation with the light irradiation target. The flight condition storage unit 135 may collectively store, for example, drive conditions in accordance with operations performed by the light irradiation device 1 in a table format or the like.

Returning to FIG. 4, the propeller drive means 14 is a means that drives the propeller 20 in accordance with control of the flight control means 13. In FIG. 4, while one propeller drive means 14 is provided for a plurality of propellers 20, a plurality of propeller drive means 14 may be provided for a plurality of propellers 20.

For example, at a stage to cut down a distance with a light irradiation target, the propeller drive means 14 increases a rotational speed of the propeller 20. When, for example, a moving velocity of the light irradiation target is fast, the propeller drive means 14 increases a rotational speed of the propeller 20. The propeller drive means 14, for example, changes a rotational speed of a plurality of propellers 20 and thereby changes a flight posture and a direction of the light irradiation device 1 to an appropriate state. The operation of the propeller drive means 14 is not limited to the examples cited here.

[Information Input/Output Function]

Figure 6:
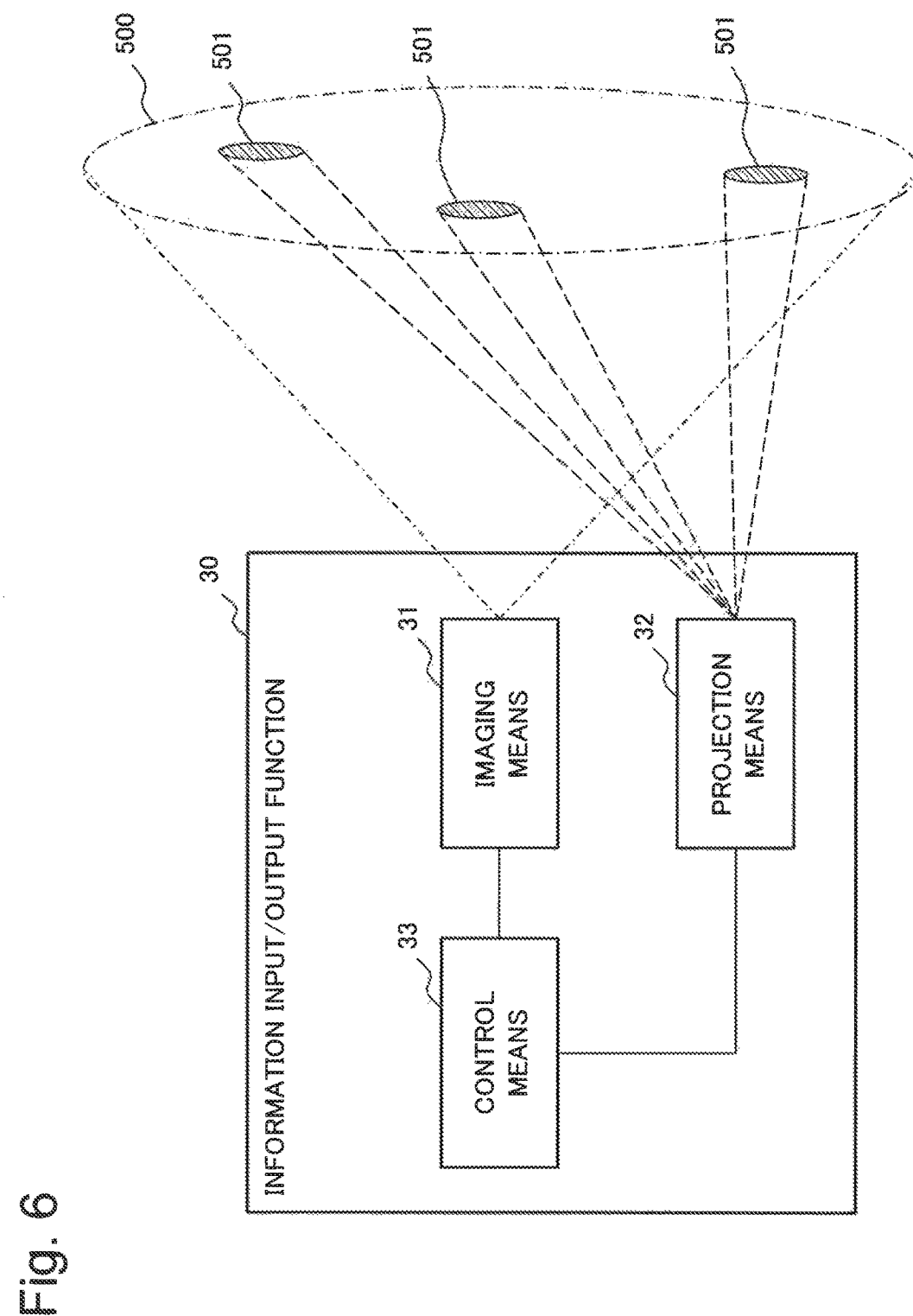
FIG. 6 is a block diagram illustrating a configuration of an information input/output function of the light irradiation device according to the first example embodiment of the present invention.

The imaging means 31, the projection means 32, and the control means 33 configure an information input/output function 30 as in FIG. 6. The imaging means 31 images a range of a monitoring region 500. The control means 32 analyzes the image imaged by the imaging means 31 and recognizes an object on the image. When a light irradiation target 501 is included in the object on the image, the projection means 32 projects light to the light irradiation target 50. In FIG. 6, while an example of a plurality of light irradiation targets 501 is illustrated, one light irradiation target 501 is possible.

The imaging means 31 continues to image the light irradiation target 50 after irradiating the light irradiation target 50 with light. The control means 33 analyzes, one by one, an image imaged by the imaging means 31 and continues to identify a position of the light irradiation target 50. The projection means 32 continues to irradiate the light irradiation target 501 with light in accordance with control of the control means 33.

Further, when detecting any change or operation for light emitted to the imaged monitoring region 500, the information input/output function 30 can also function as an interface device that executes processing in accordance with the detection content.

When, for example, the light irradiation target 501 has quickly performed an avoidance operation in the monitoring region 500, the information input/output function 30 may detect the avoidance operation and emit light having an intensity or pattern different from a previous one to the light irradiation target 501. In other words, the information input/output function 30 makes an interactive response to any change or operation for the emitted light.

The information input/output function 30 monitors reflected light of signal light emitted to the light irradiation target 501 and operates interactively. When, for example, the light irradiation target 501 includes a mirror surface, it may be difficult for the information input/output function 30 to detect a part of or the entire light expected to return by scattering of signal light emitted to the light irradiation target 501. Further, also when the light irradiation target 501 absorbs signal light, it may be difficult for the information input/output function 30 to detect a part of or the entire light expected to return by scattering of signal light emitted to the light irradiation target 501. In these cases, the information input/output function 30 can determine that the light irradiation target 501 includes a mirror surface or the light irradiation target 501 is covered with a light absorber. In other words, the information input/output function 30 verifies how much light has returned to the information input/output function 30 in signal light emitted to the light irradiation target 501 and thereby can ascertain a state of the light irradiation target 501.

Further, the information input/output function 30 may include a function for detecting the light irradiation target 50 by a detection function, not illustrated, such as microwaves, millimeter waves, and the like, for example, and directing an imaging direction of the imaging means 31 in a direction of the detected light irradiation target 50.

[Imaging Means]

Figure 7:
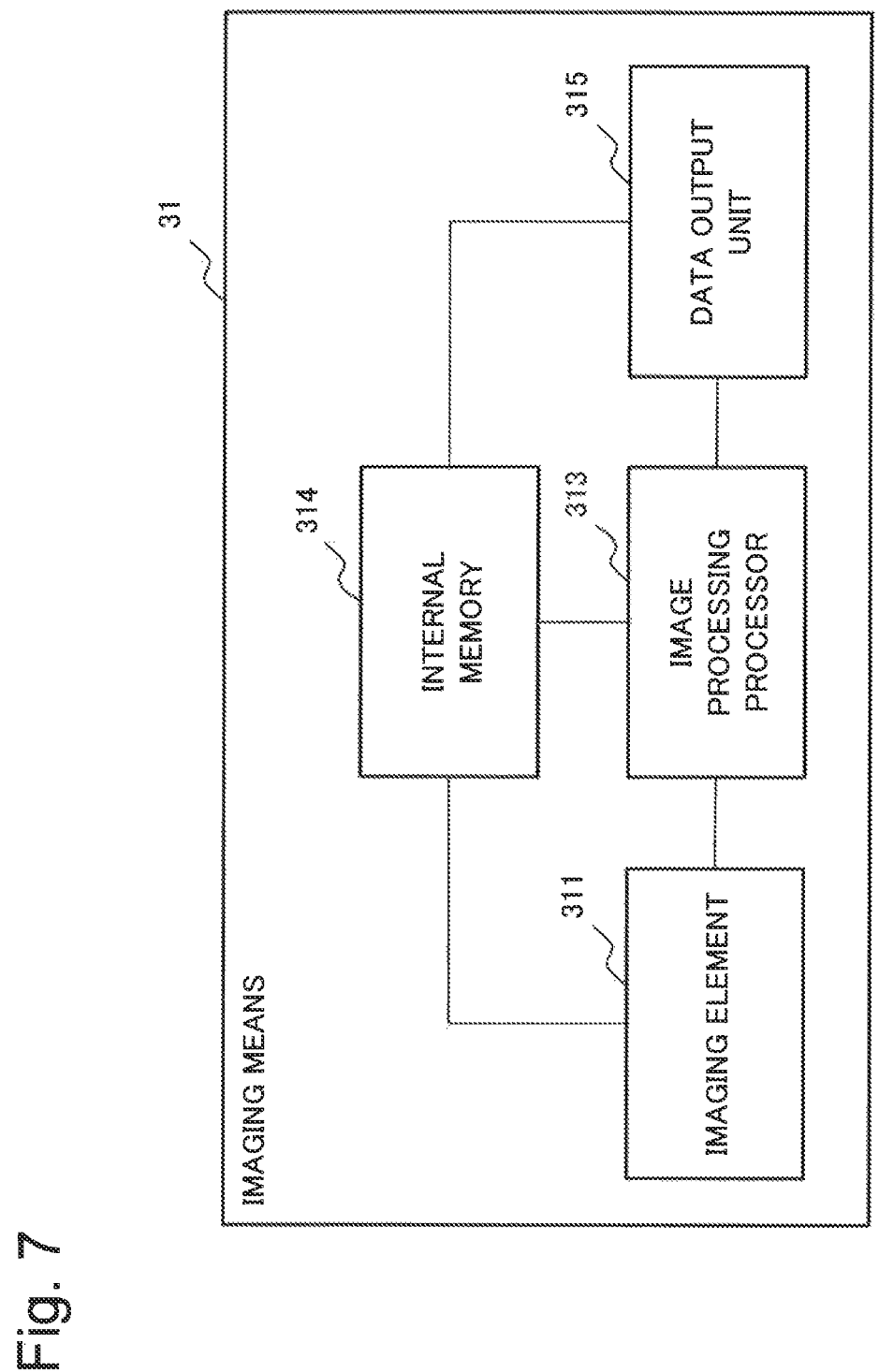
FIG. 7 is a block diagram illustrating a configuration of an imaging means of the light irradiation device according to the first example embodiment of the present invention.

FIG. 7 is a block diagram illustrating a configuration of the imaging means 31 according to the present example embodiment. The imaging means 31 includes an imaging element 311, an image processing processor 313, an internal memory 314, and a data output unit 315.

Although not illustrated, in the imaging means 31, at least one imaging lens is preferably incorporated. The lens incorporated in the imaging means 31 is preferably a zoom lens that can change a focal length and is preferably mounted with an autofocus function for automatically adjusting a focal point. Further, the imaging means 31 is preferably mounted with a function applied to general digital cameras such as a function for shake prevention. However, the imaging means 31 may not include a lens, as in a pinhole camera.

The imaging element 311 is an element for imaging a monitoring region 500 and acquiring image data of the monitoring region 500. The imaging element 311 is a photoelectric conversion element in which semiconductor components are integrated into a circuit. The imaging element 311 can be enabled using a solid imaging element such as a CCD (Charge-Coupled Device), a CMOS (Complementary Metal-Oxide-Semiconductor), and the like, for example. The imaging element 311 includes an element for imaging light of a visible region but may include an element capable of imaging/detecting electromagnetic waves such as infrared rays, ultraviolet rays, X-rays, gamma rays, radio waves, microwaves, and the like.

The image processing processor 313 is an image processing-dedicated integrated circuit that executes image processing such as dark current correction, interpolation correction, color space conversion, gamma correction, aberration correction, noise reduction, image compression, and the like for image data imaged by the imaging element 311. When image data is output without being processed, the image processing processor 313 is omissible. As the image processing processor 313, a processor designed to be able to execute necessary processing is usable.

The internal memory 314 is a storage element that temporality stores image data having not been completely processed upon execution of image processing by the image processing processor 313 and already-processed image data. A configuration in which image data imaged by the imaging element 311 is temporarily stored on the internal memory 314 may be made. The internal memory 314 may include a general memory.

The data output unit 315 outputs image data already processed by the image processing processor 313 to the control means 33.

[Control Means]

The control means 33 controls the projection means 32 to project an appropriate image toward the light irradiation target 501 when the light irradiation target 501 is included in the monitoring region 500 imaged by the imaging means 31. Further, the control means 33 provides, when functioning as a user interface device, image information in accordance with a change or operation detected in the monitoring region 500 for the projection means 32 and controls the projection means 32 to project an image relating to the image information. Further, the control means 33 outputs, when having recognized the light irradiation target 501, a flight instruction for causing the own device to fly toward the light irradiation target 501 to the flight control means 13. The control means 33 can be enabled using a function of a microcomputer including, for example, an arithmetic device and a control device.

The control means 33 may be configured to transmit a result obtained by detecting the light irradiation target 501 and information relating to an operation performed for the monitoring region 500 to a higher-level system such as a server and the like at a predetermined timing.

Figure 8:
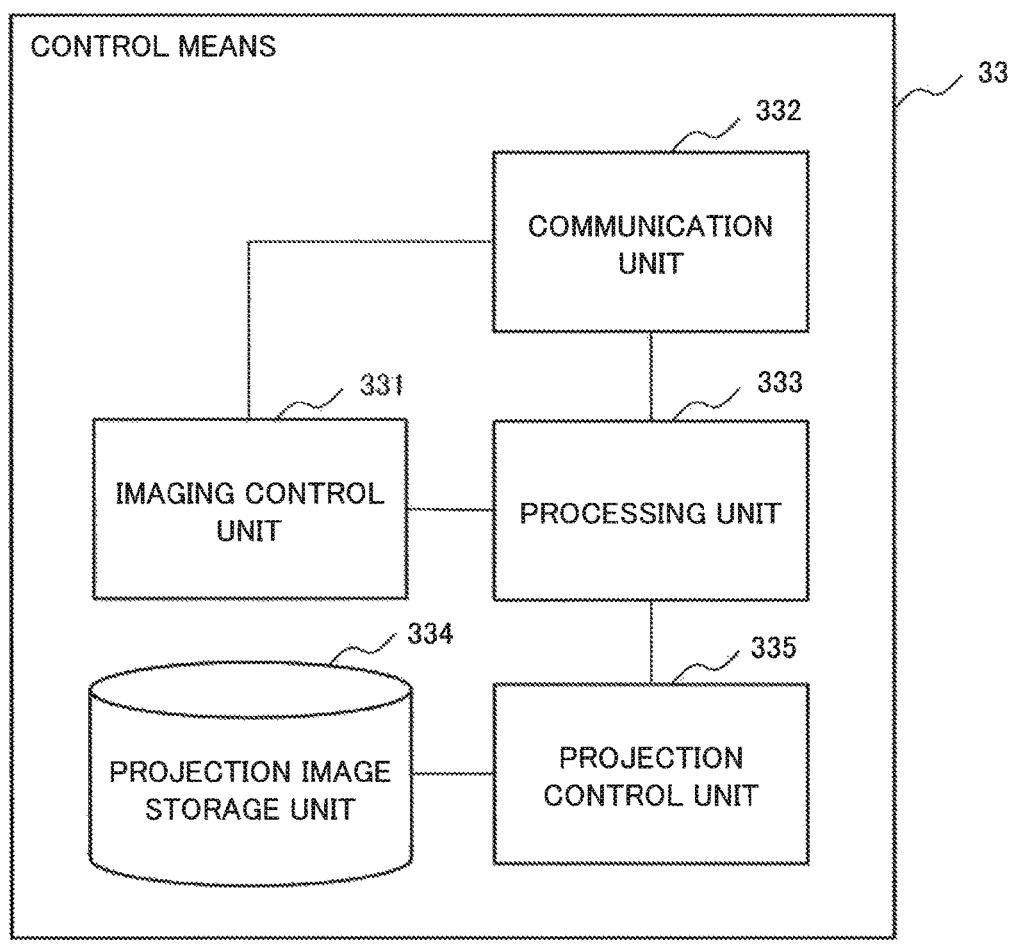
FIG. 8 is a block diagram illustrating a configuration of a control means of the light irradiation device according to the first example embodiment of the present invention.

As in FIG. 8, the control means 33 includes an imaging control unit 331, a communication unit 332, a processing unit 333, a projection image storage unit 334, and a projection control unit 335.

The imaging control unit 331 controls the imaging means 31 to image the monitoring region 500. The imaging control unit 331 causes the imaging means 31 to image the monitoring region 500 at a predetermined timing. The imaging control unit 331 may control, for example, the monitoring region 500 to be imaged at a constant cycle until detection of the light irradiation target 501 and the light irradiation target 501 to be video-imaged by shortening an imaging cycle in a stage where after detected, the light irradiation target 501 is being irradiated with light. The imaging control unit 331 may control, for example, the monitoring region 500 to be video-imaged, regardless of the presence or absence of detection of the light irradiation target 501. The imaging control by the imaging control unit 331 is not limited to the examples cited here.

The imaging control unit 331 acquires image data output from the imaging means 31 and outputs the acquired image data to the processing unit 333.

The communication unit 332 is a means to communicate with the communication means 12 and the flight control means 13. The communication unit 332 transfers, when receiving information relating to the light irradiation target 501 from the communication means 12, the received information to the processing unit 333. Further, the communication unit 332 responds, when receiving an instruction for detecting the light irradiation target 501 from the communication means 12, to the received instruction and transmits an instruction for imaging the monitoring region 500 to the imaging control unit 331. Further, the communication unit 332 transmits, when receiving an analysis result of the monitoring region 500 from the processing unit 333, the analysis result to the flight control means 13.

The processing unit 333 analyzes image data of the monitoring region 500 acquired from the imaging control unit 331 and determines an irradiation condition for light in accordance with the analysis result. Further, the processing unit 333 transmits the analysis result of the monitoring region 500 to the communication unit 332.

Using FIG. 9, a configuration of the processing unit 333 will be described.

Figure 9:
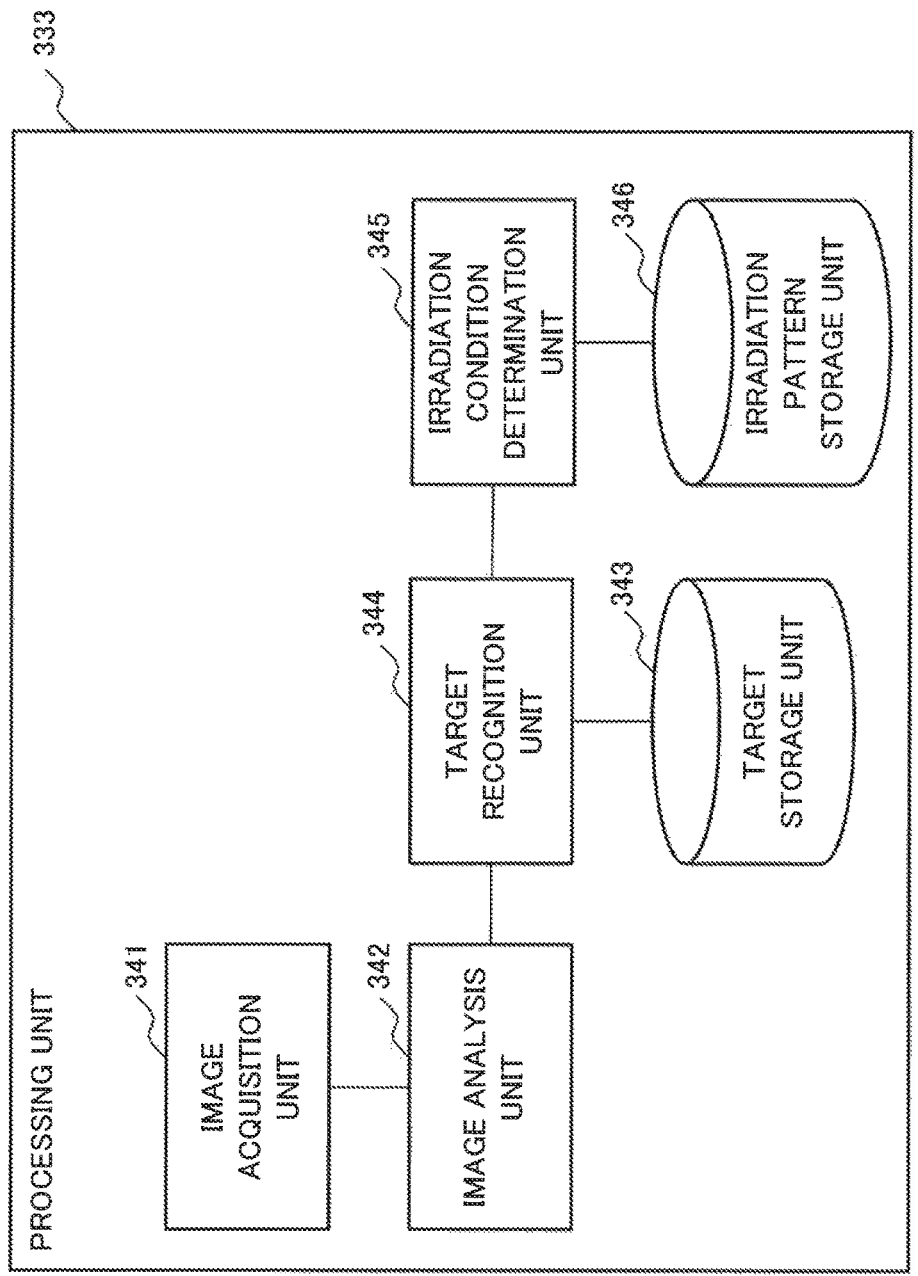
FIG. 9 is a block diagram illustrating a configuration of a processing unit included in the control means of the light irradiation device according to the first example embodiment of the present invention.

As in FIG. 9, the processing unit 333 includes an image acquisition unit 341, an image analysis unit 342, a target storage unit 343, a target recognition unit 344, an irradiation condition determination unit 345, and an irradiation pattern storage unit 346.

The image acquisition unit 341 acquires image data from the imaging control unit 331 and outputs the acquired image data to the image analysis unit 342.

The image analysis unit 342 acquires image data from the image acquisition unit 341 and analyzes the acquired image data. The image analysis unit 342 analyzes, for example, the presence or absence of a candidate of the light irradiation target 501 in the image data. The image analysis unit 342 outputs, when detecting a candidate (hereinafter, a light irradiation candidate) of the light irradiation target 501, information relating to the detected light irradiation candidate to the target recognition unit 344. The information relating to a light irradiation candidate includes, for example, image information and information relating to an acceleration, a velocity, a position, and the like of the light irradiation candidate. The image analysis unit 342 analyzes, for example, a plurality of pieces of image data that is temporally continuous and analyzes information relating to a velocity, an acceleration, and a position of the light irradiation candidate. The information relating to a light irradiation candidate is not limited to the examples cited here.

The target storage unit 343 stores information relating to the light irradiation target 501. The target storage unit 343 stores, for example, feature data of the light irradiation target 501. The target storage unit 343 stores, as feature data of the light irradiation target 501, for example, data relating to a shape, a size, a moving velocity, a moving pattern, and the like of the light irradiation target 501.

The target recognition unit 344 recognizes, based on the information relating to the light irradiation candidate acquired from the image analysis unit 342, whether the light irradiation candidate is the light irradiation target 501, using feature data stored on the target storage unit 343. The target recognition unit 344 outputs, when recognizing that the light irradiation candidate is the light irradiation target 501, information relating to a size, an acceleration, a velocity, a position, and the like of the light irradiation target 501 to the irradiation condition determination unit 345.

When the light irradiation target 501 is a bird, the target recognition unit 344 can recognize the bird via application of a method and an algorism disclosed, for example, in PTL 1 (International Publication No. WO2014/157058), PTL 2 (Japanese Laid-open Patent Publication No. 2011-229453), or the like. Further, when the light irradiation target 501 is something other than a bird, the target recognition unit 344 may recognize the light irradiation target 501 via application of a method and an algorism suitable for recognizing the light irradiation target 501. The algorism for recognizing the light irradiation target 501 by the target recognition unit 344 is not limited.

The irradiation condition determination unit 345 determines, when acquiring the information relating to a size, an acceleration, a velocity, a position, and the like of the light irradiation target 501 from the target recognition unit 344, an irradiation condition for signal light to be emitted to the light irradiation target 501, based on the acquired information, by referring to the irradiation pattern storage unit 346. The irradiation condition determination unit 345 sets, as the irradiation condition for signal light, a condition including an irradiation direction, an irradiation time, a luminance, a pulse width, an irradiation pattern, and the like of signal light. The irradiation condition determination unit 345 determines, when a plurality of light irradiation targets 501 has been detected, an irradiation condition for signal light to be emitted to the plurality of light irradiation targets 501.

When the light irradiation target 501 is, for example, a bird, the irradiation condition determination unit 345 refers to the irradiation pattern storage unit 346 and determines a condition for emitting signal light having strong luminance toward the bird. When, for example, the light irradiation target 501 continues to be irradiated with signal light of a mark, the irradiation condition determination unit 345 refers to the irradiation pattern storage unit 346 and determines a condition for continuously irradiating the light irradiation target 501 and a specific position of a periphery thereof with signal light. In any of the situations, the irradiation condition determination unit 345 determines an irradiation condition for signal light, based on the information of a size, an acceleration, a velocity, a position, and the like of the light irradiation target 501 acquired from the target recognition unit 344.

Further, the irradiation condition determination unit 345 predicts, when the light irradiation target 501 is an animal such as a bird and the like, a direction of repelling the light irradiation target 501 upon irradiating the light irradiation target 501 with signal light. At that time, the irradiation condition determination unit 345 determines a timing of irradiating the light irradiation target 501 with signal light.

When, for example, a bird flying to a facility such as an airport and the like is repelled, it is necessary for the bird to evacuate in a direction away from the airport. In such a case, the irradiation condition determination unit 345 preferably emits signal light at a timing when the light irradiation device 1 has moved between the airport and the bird.

When, for example, a bird having entered a midair region of an airport is suddenly irradiated with signal light, it is predicted that the bird evacuates in a direction of an airplane about to take off. In such a case, the irradiation condition determination unit 345 preferably determines to emit signal light at a timing when the light irradiation device 1 has moved between a take-off/landing spot of the airplane and the bird.

It is supposed that, for example, when a bird being flying in a direction away from an airport while being flying in a periphery of the airport is irradiated with signal light, the panicked bird flies toward the airport. In such a case, the irradiation condition determination unit 345 preferably determines not to emit signal light.

The irradiation pattern storage unit 346 stores an irradiation pattern emitted to the light irradiation target 501. For example, for a bird, an irradiation pattern in which a bird is irradiated with light having strong luminance obtained by narrowing an irradiation diameter may be stored. When, for example, a mark is emitted to the light irradiation target 501, the irradiation pattern storage unit 346 may store an irradiation pattern in which a predetermined position of the light irradiation target 501 is irradiated with signal light having a relatively large irradiation diameter. When, for example, it is difficult to directly irradiate the light irradiation target 501 to be irradiated with a mark with signal light, the irradiation pattern storage unit 346 may store an irradiation pattern in which a predetermined position of a periphery of the light irradiation target 501 is irradiated with signal light having a relatively large irradiation diameter. The irradiation pattern stored on the irradiation pattern storage unit 346 is not limited to the examples cited here and can be optionally set.

Returning to FIG. 8, the projection image storage unit 334 stores an objective image projected by the projection means 32. The projection image storage unit 334 may be configured to store data other than the objective image. The objective image includes a predetermined image such as a circular image and the like, for example, for identifying that a target irradiated with an objective image is a detection target. Further, when the projection means 32 includes a space modulation element of a phase modulation type, the projection image storage unit 334 may store a phase distribution displayed on a display surface of the space modulation element. When it is not necessary to set a shape of signal light to be emitted to the light irradiation target 501, the configuration and function of the projection image storage unit 334 may be omitted.

The projection control unit 335 acquires, when acquiring an irradiation condition for signal light from the processing unit 333, an appropriate objective image from the projection image storage unit 334. The projection control unit 335 provides the acquired objective image to the projection means 32, and controls, based on the irradiation condition, the projection means 32 to project the objective image as signal light.

[Projection Means]

Figure 10:
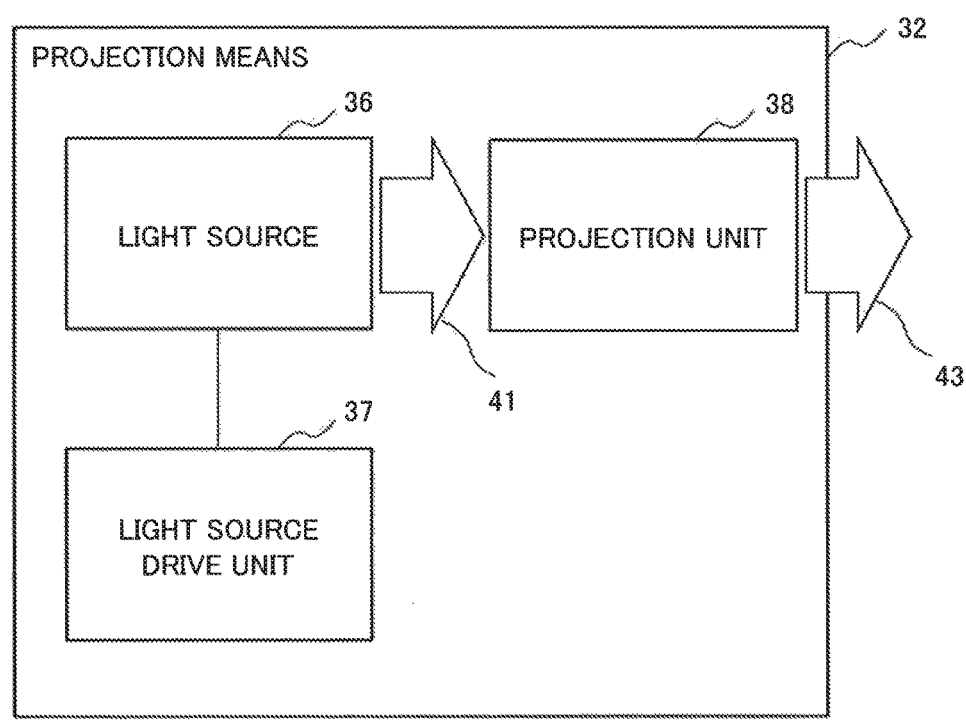
FIG. 10 is a block diagram illustrating a configuration of a projection means of the light irradiation device according to the first example embodiment of the present invention.

FIG. 10 is a block diagram illustrating a configuration of the projection means 32 according to the present example embodiment. The projection means 32 includes a light source drive unit 37, a light source 36, and a projection unit 38.

The light source 36 includes a light source that emits light 41 of a specific wavelength. The light source 36 is configured to emit light 41 of a visible light region. However, the light source 36 may be configured to emit light 41 of an infrared region, an ultraviolet region, or the like other than a visible light region.

As the light source 36, for example, a light emitting source such as a laser light source, an LED (Light Emitting Diode), a lamp, an electric-discharge lamp, an electric bulb, and the light is usable. The light emitting source used as the light source 36 is not limited to the examples cited here. Further, the light source 31 may be a reflection body that reflects light emitted from another light emitting source.

The light source drive unit 37 drives the light source 36 in such a way as to emit signal light of an output specified based on an irradiation condition set by the control means 33.

The projection unit 38 projects the light 41 emitted from the light source 36 as signal light 43.

Figure 11:
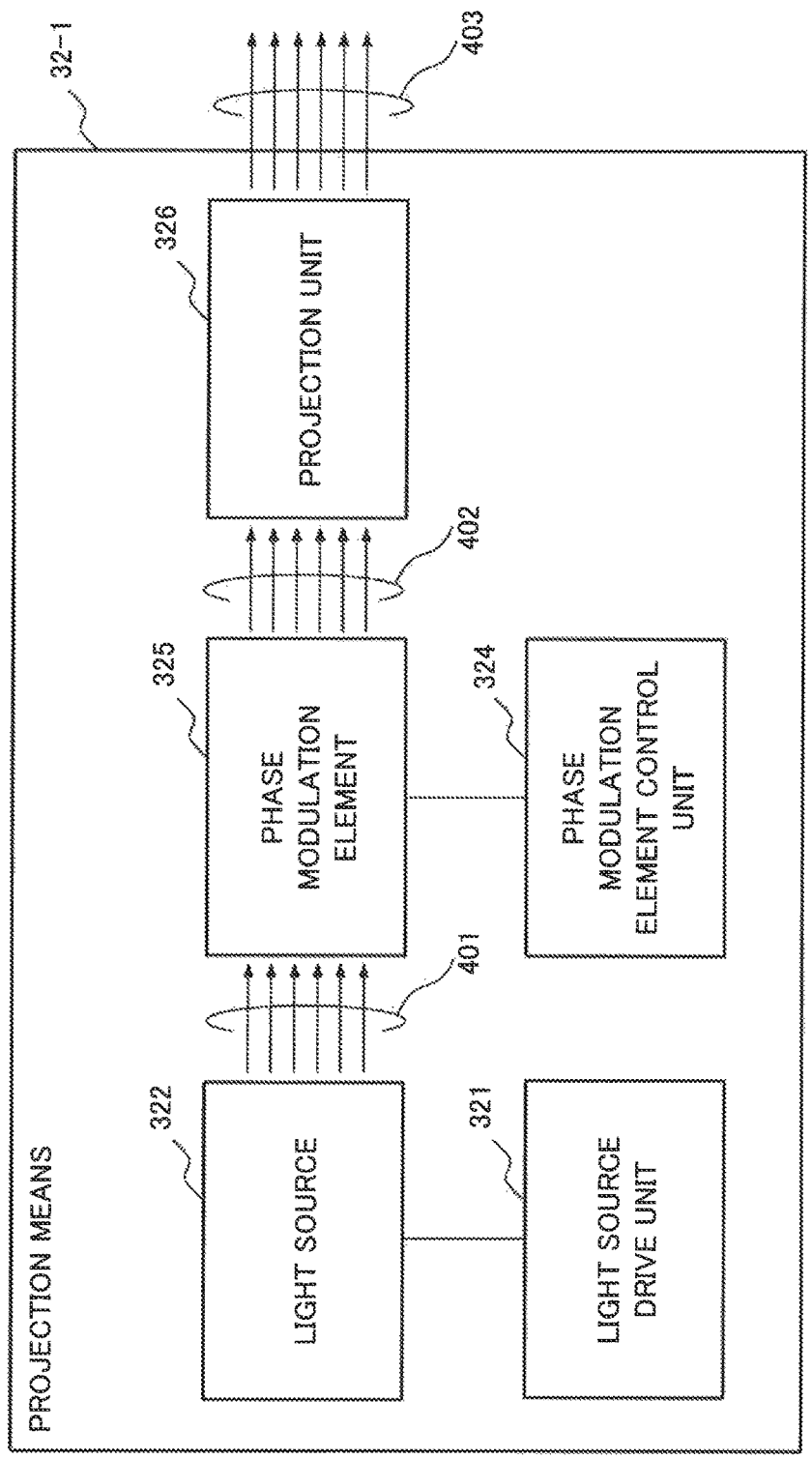
FIG. 11 is a block diagram illustrating a configuration example of the projection means of the light irradiation device according to the first example embodiment of the present invention.

The projection means 30 can be configured, for example, as in FIG. 11, as a projection means 32-1 mounted with a phase-modulation-type modulation element.

FIG. 11 is a block diagram illustrating a configuration example of the projection means 32-1 according to the present example embodiment. FIG. 11 is an example in which the projection means 32 includes a phase-modulation-type modulation element. When the phase-modulation-type modulation element is used, a plurality of light irradiation targets can be individually irradiated with signal light by one-time irradiation of a single projection means 32-1. As in FIG. 11, the projection means 32-1 includes a light source drive unit 321, a light source 322, a phase modulation element control unit 324, a phase modulation element 325, and a projection unit 326.

The light source drive unit 321 drives the light source 322 in such a way as to emit laser light of an output specified based on a lase condition set by the projection control unit 34 of the control means 30.

The light source 322 includes a laser light source that emits coherent laser light 401 of a specific wavelength. The light source 11 is configured to emit laser light 401 of a visible light region. However, the light source 11 may be configured to emit laser light 401 of an infrared region, an ultraviolet region, or the like other than a visible light region.

The light source 322 does not project light uniformly onto a region in a projection range but projects light onto a portion by being focused. The projection means 32-1 can reduce an irradiation amount of the laser light 401 upon projection onto a line drawing such as a character, a sign, and the like and therefore can suppress the entire laser output. In other words, the light source 322 can include a small, low-power laser light source and a low-output power supply that drives the laser light source.

The phase modulation element control unit 324 controls the phase modulation element 325 in such a way that a parameter that determines a difference between a phase of the laser light 401 emitted to a display region on the phase modulation element 325 and a phase of modulation light 402 reflected on the display region changes. The parameter that determines the difference between a phase of the laser light 401 emitted to a display region on the phase modulation element 325 and a phase of the modulation light 402 reflected on the display region is, for example, a parameter relating to an optical characteristic such as a refractive index, an optical path length, and the like. The phase modulation element control unit 324 controls a voltage applied to a display region on the phase modulation element 325 and thereby changes a refractive index of the display region, for example. As a result, the laser light 401 emitted to the display region is appropriately diffracted, based on the refractive index of the display region.

In other words, a phase distribution of the laser light 401 emitted to the phase modulation element 325 is modulated in accordance with an optical characteristic of a display region. The control for the phase modulation element 325 using the phase modulation element control unit 324 is not limited to the examples cited here.

The phase modulation element 325 includes a space modulation element of a phase modulation type that receives an incidence of phase-matched, coherent laser light 401 and modulates the phase of the incident laser light 401. The phase modulation element 325 emits modulated modulation light 402 toward the projection unit 326.

In a display region on the phase modulation element 325, a phase distribution for displaying an objective image on a projected surface is displayed. The modulation light 402 reflected on the display region of the phase modulation element 325 becomes an image in such a way that a type of diffraction grating is formed as an aggregate, and light diffracted in these diffraction gratings are collected to form an objective image.

The phase modulation element 325 is enabled, for example, by a space modulation element using a ferroelectric liquid crystal, a homogeneous liquid crystal, a vertically aligned liquid crystal, or the like. The phase modulation element 325 can be enabled, for example, by an LCOS (Liquid Crystal on Silicon). Further, the phase modulation element 325 may be enabled, for example, by an MEMS (Micro Electro Mechanical System).

The projection unit 326 includes an optical system for projecting the modulation light 402 reflected by the phase modulation element 325 as projection light 403.

Figure 12:
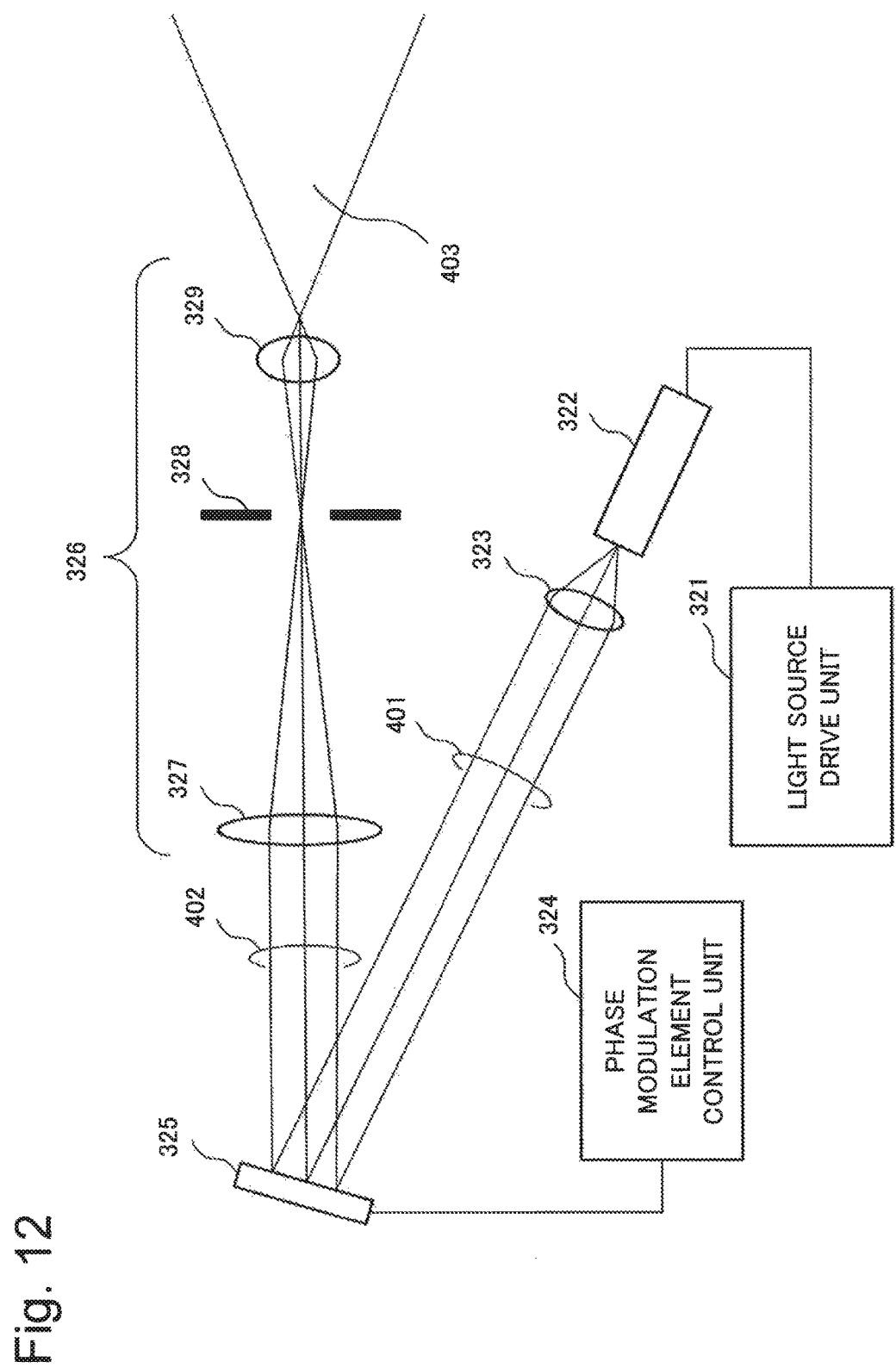
FIG. 12 is a conceptual diagram illustrating one example of an optical system of the configuration example of the projection means of the light irradiation device according to the first example embodiment of the present invention.

FIG. 12 is a conceptual diagram for illustrating an optical configuration of the projection means 32-1 according to the present example embodiment. As in FIG. 12, in the projection means 32-1, laser light emitted by the light source 322 is converted to parallel laser light 401 by a collimator 53 and enters a display surface of the phase modulation element 325.

In the projection means 32-1, as in FIG. 12, an incident angle of the laser light 401 is caused to be non-vertical to the display surface of the phase modulation element 325. In other words, in the projection means 32-1, an emission axis of laser light emitted from the light source 322 is inclined to the display surface on the phase modulation element 325. When an emission axis of the laser light 401 is inclined to the display surface on the phase modulation element 325, the laser light 401 can enter the display surface on the phase modulation element 325 without using a beam splitter, and thereby efficiency can be improved.

The modulation light 402 modulated in the phase modulation element 325 is projected as projection light 403 by the projection unit 326. As in FIG. 12, the projection unit 326 preferably includes a Fourier transform lens 327, an aperture 328, and a projection lens 329. When it is not necessary to define a size of an image upon projection of the projection light 403, the projection unit 326 may not include a lens.

The Fourier transform lens 327 is an optical lens for forming an image formed upon projecting, to infinity, the modulation light 402 reflected on the display surface of the phase modulation element 325 at a neighboring focal position.

The aperture 328 includes a function for eliminating higher-order light included in light focused by the Fourier transform lens 327 and identifying an image region. An opening of the aperture 328 is opened with a smaller size than an image region of a projection image at a position of the aperture 328 and is disposed in such a way as to interrupt a peripheral region of the projection image. The opening of the aperture 328 is formed, for example, to be rectangular or circular. The aperture 328 is preferably disposed at a focal position of the Fourier transform lens 327. However, the aperture 328 may be displaced from the focal position when exerting a function for eliminating higher-order light.

The projection lens 329 is an optical lens for projecting, in an enlarged manner, light focused by the Fourier transform lens 327. The projection lens 329 projects the projection light 403 in such a way that an objective image corresponding to a phase distribution input to the phase modulation element 325 is displayed on a projected surface.

The projection means 32 may emit encrypted infrared laser light as signal light. Even when the light irradiation target 501 is irradiated with the encrypted infrared light, it is difficult to visually recognize signal light without using an infrared camera or the like. Further, even when the infrared laser light has been recognized using an infrared camera or the like, information included in signal light is unlikely to be grasped by a third party when the signal light is encrypted.

It is supposed that when the light irradiation target 501 is, for example, a bird, a flock thereof comes to a facility such as an airport and the like. It is supposed that when any one of a plurality of birds having come as a flock can be irradiated with signal light, the bird recognizes the signal light and then evacuates. At that time, it can be also supposed that another bird evacuates by following the evacuated bird, and therefore, at least one bird may be irradiated with signal light. When a plurality of birds having come as a flock is irradiated with signal light in the same manner, a number of birds that directly recognize the signal light and then evacuate increases, and therefore it is more effective that a plurality of birds is irradiated with signal light.

When the phase modulation element 325 is used as in FIG. 11, a plurality of light irradiation targets 501 can be irradiated with signal light at the same time using a single projection means 32-1.

The above is description on the configuration of the light irradiation device 1 according to the present example embodiment.

As described above, the light irradiation device according to the present example embodiment can reliably track a detected light irradiation target, and therefore the light irradiation target can continue to be irradiated with signal light. In other words, according to the light irradiation device according the present example embodiment, a moving target can continue to be irradiated with light accurately.

When, for example, a bird flying to an airport is a light irradiation target, it is possible that a plurality light irradiation devices is operated on a round-the-clock basis to cause birds not to build nests in the airport or a periphery thereof or to cause birds not to be close thereto. A bird turns its eyes to a thing coming close to itself, and therefore turns its eyes to a light irradiation device having come close thereto and senses light emitted from the light irradiation device. Therefore, according to a light irradiation system using the light irradiation device according to the present example embodiment, an administrator of the system may remotely monitor a state from time to time.

Figure 13:
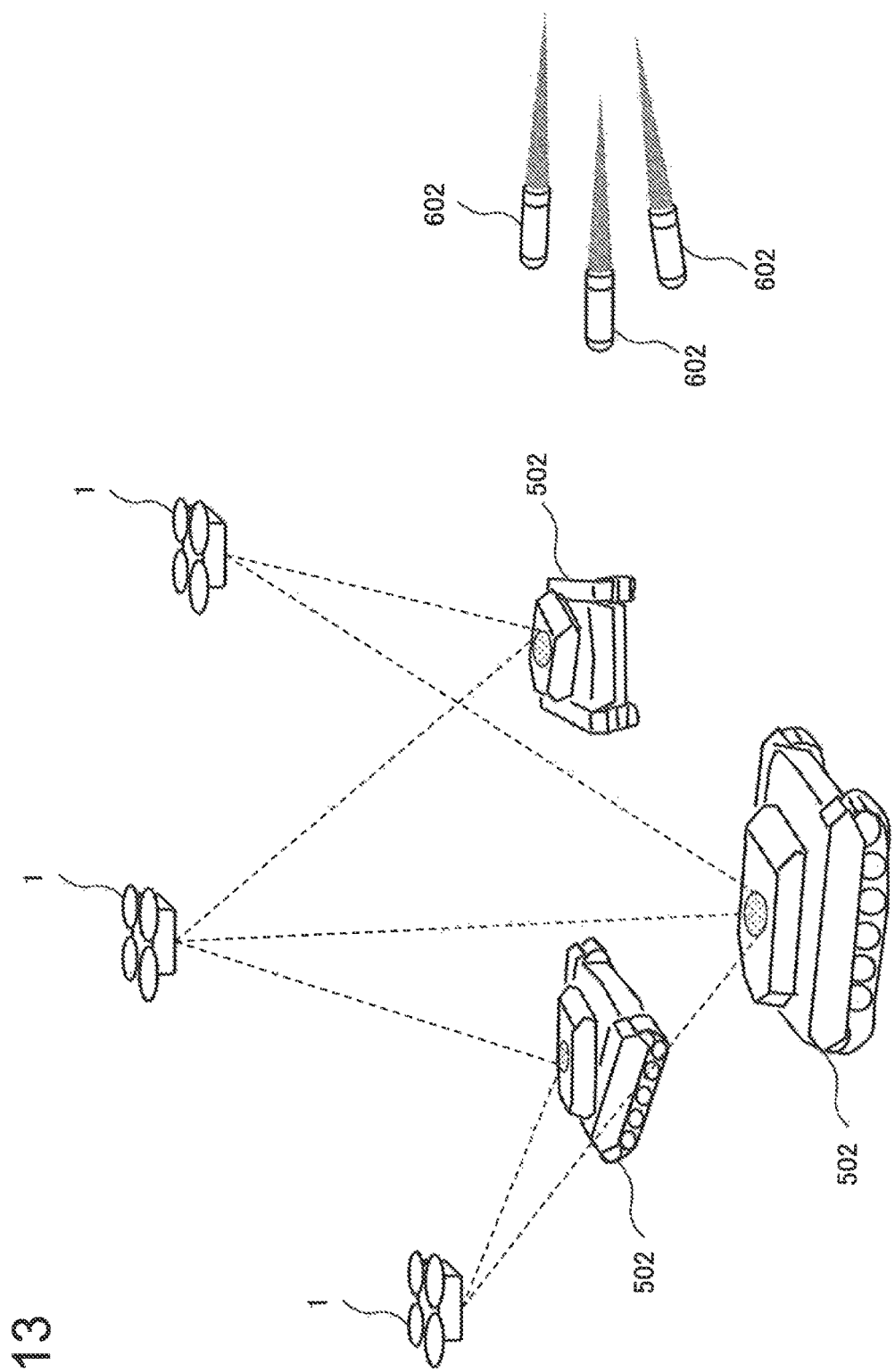
FIG. 13 is a conceptual diagram illustrating one example of a use scene of the light irradiation device according to the first example embodiment of the present invention.

Further, as an example in which a light irradiation target continues to be irradiated with signal light of a mark, there is an application as in FIG. 13. In the example of FIG. 13, a plurality of light irradiation devices 1 irradiates a plurality of light irradiation targets 502 with signal light. In other words, the light irradiation target 502 is irradiated with signal light from a plurality of light irradiation devices 1. Using the signal light emitted to the light irradiation target 502 as a mark, a flying object 602 is guided. The flying object 602 detects the signal light emitted to the light irradiation target 502 and flies to the detected guidance light as a destination.

As in FIG. 13, the light irradiation device 1 can fly around, and therefore one light irradiation device 1 can mark a plurality of light irradiation targets 502. Further, even when one light irradiation device 1 breaks down, another light irradiation device 1 can continue to mark the light irradiation target 502 when a plurality of light irradiation devices 1 flies around. When the same thing as in the light irradiation device 1 is enabled by a determination and operation of a person, one person can respond to only one light irradiation target 502, and therefore many persons are needed. It is difficult to dispose a person in a place to which the flying object 602 is flying and a human life is exposed to danger depending on a case, and therefore it is difficult to enable the same thing as in the light irradiation device 1.

Figure 14:
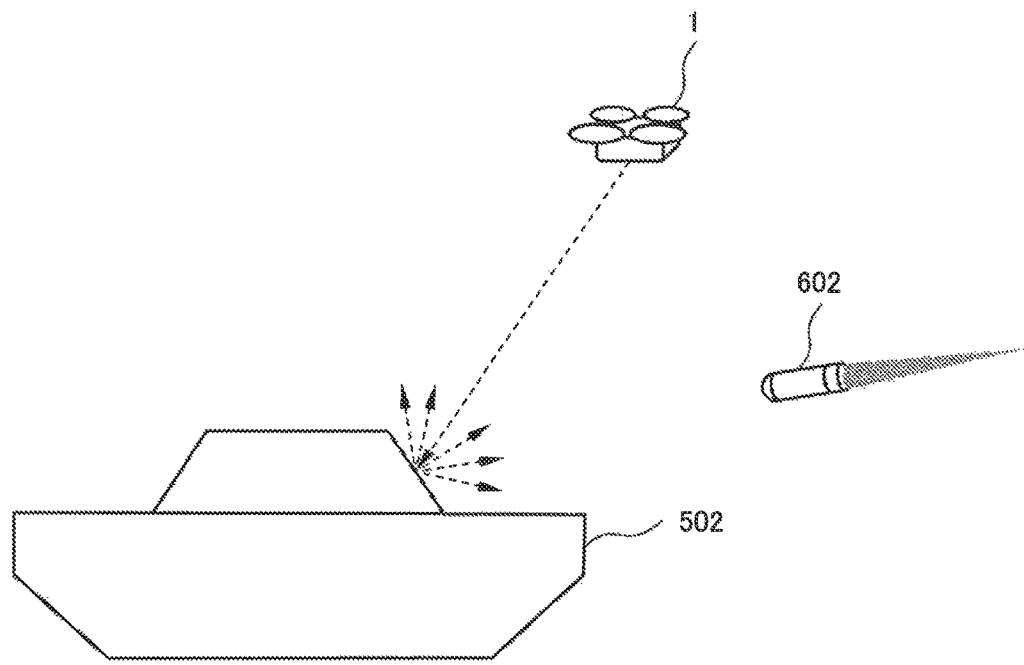
FIG. 14 is a conceptual diagram illustrating one example of a use scene of the light irradiation device according to the first example embodiment of the present invention.
Figure 15:
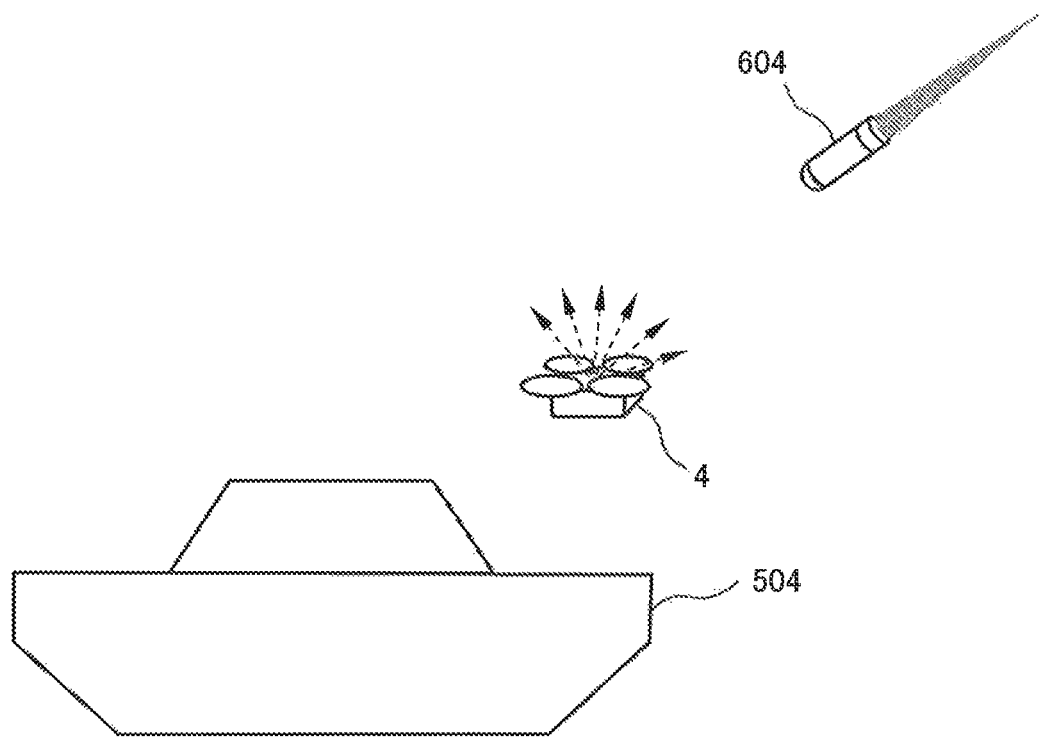
FIG. 15 is a conceptual diagram illustrating one example of a use scene of a light irradiation system according to the first example embodiment of the present invention.
Figure 16:
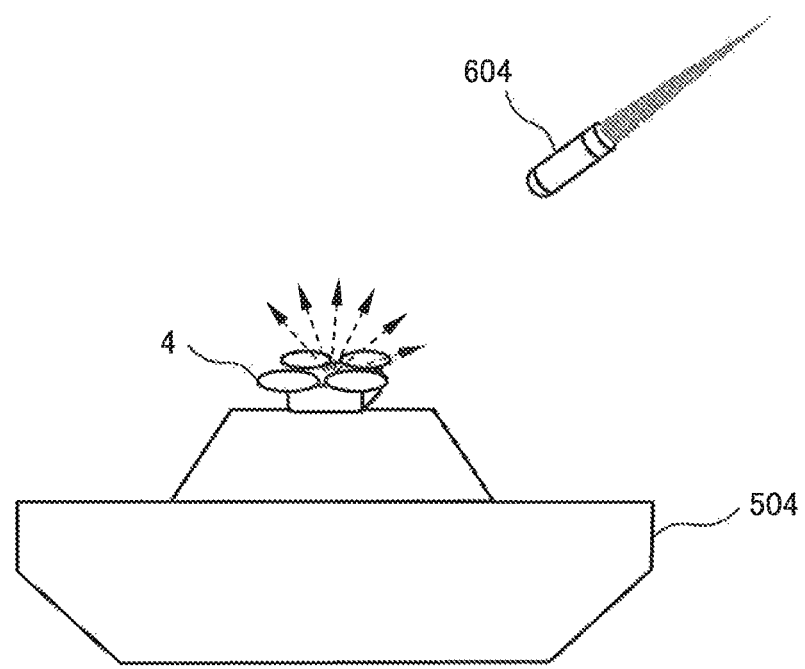
FIG. 16 is a conceptual diagram illustrating one example of a use scene of the light irradiation system according to the first example embodiment of the present invention.

FIG. 14 is an example in which the flying object 602 detects reflected light of signal light emitted to the light irradiation target 502 and flies to the detected reflected light as a destination. FIG. 15 is an example in which a light irradiation device 4 is positioned in a vicinity of a light irradiation target 504 and a flying object 604 is guided by guidance light. FIG. 16 is an example in which the light irradiation device 4 is caused to land on the light irradiation target 504 and the flying object 604 is guided by guidance light. In any of the examples of FIG. 14 to FIG. 16, the flying object 604 can be guided to the light irradiation target 504 reliably by being guided by guidance light emitted from the light irradiation device 4.

(Modified Example)

Figure 17:
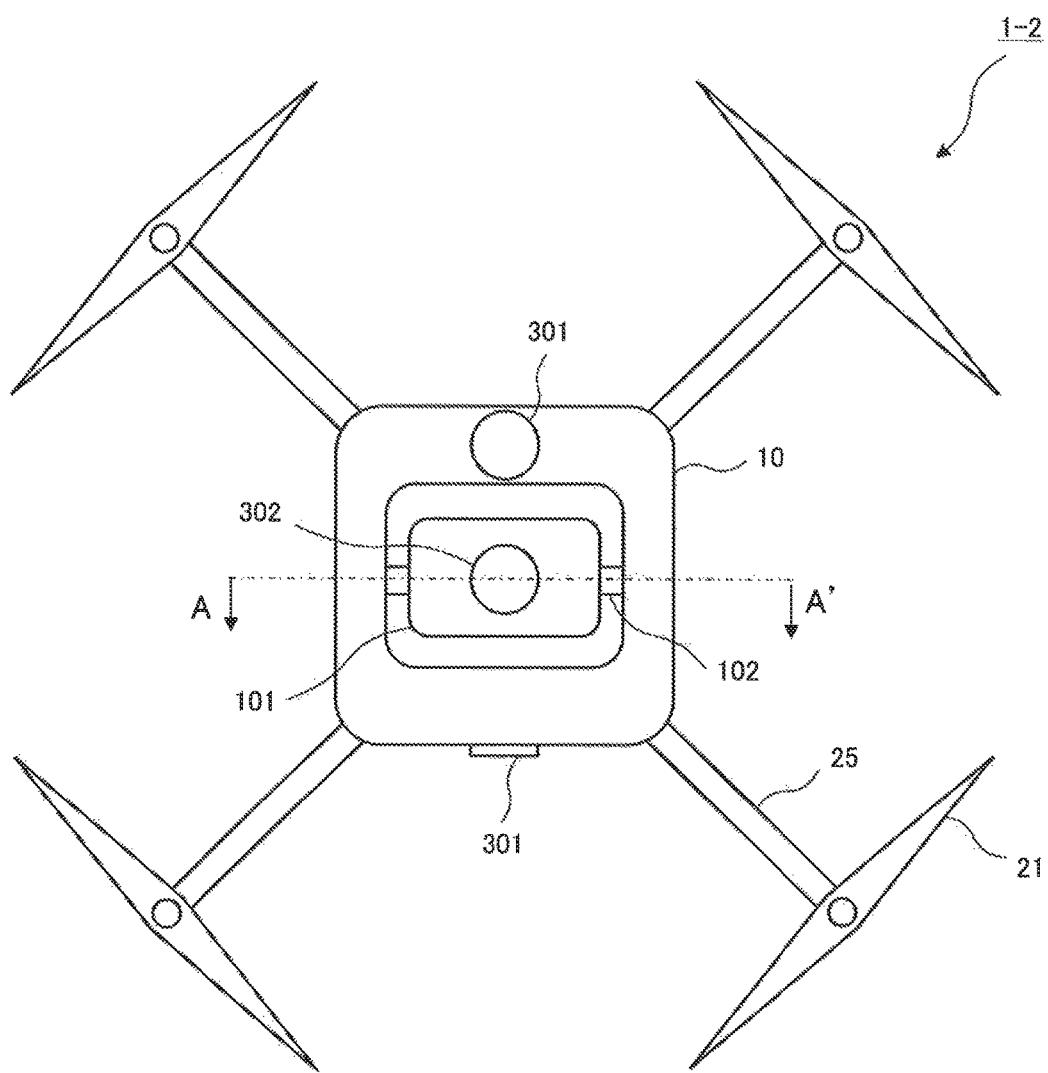
FIG. 17 is a bottom view of a modified example of the light irradiation device according to the first example embodiment of the present invention.
Figure 18:
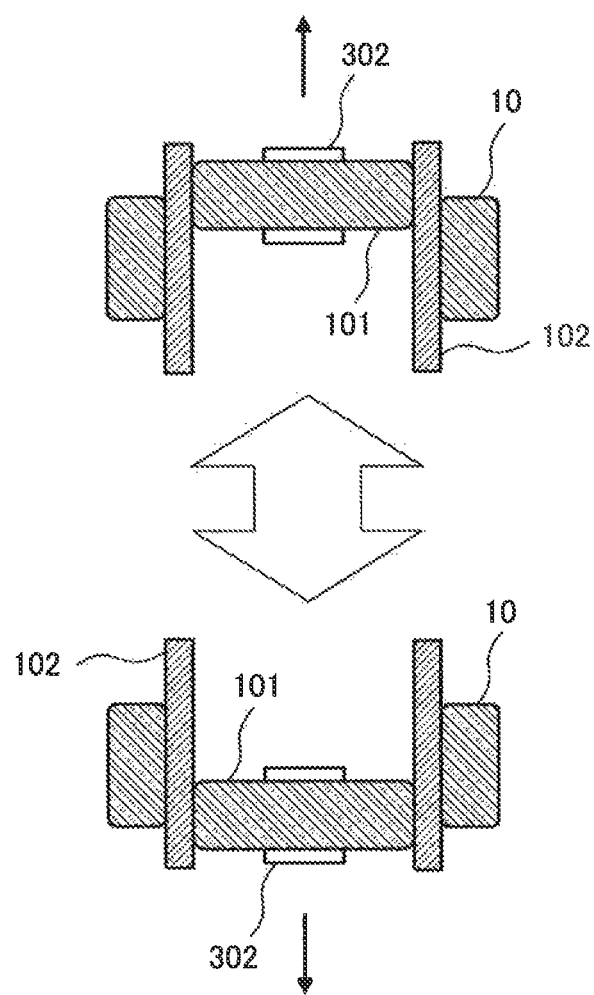
FIG. 18 is a cross-sectional view of the modified example of the light irradiation device according to the first example embodiment of the present invention.

Using FIG. 17 and FIG. 18, a modified example of the light irradiation device 1 according to the present example embodiment will be described. FIG. 17 is conceptual diagram of a light irradiation device 1-2 according to the present modified example. FIG. 18 is an A-A' line cross-sectional view of the light irradiation device 1-2 of FIG. 17.

The light irradiation device 1-2 of FIG. 17 includes a projection unit 101 incorporating a projection means 32. The projection unit 101 is disposed in a hole of a center portion of a main body 10 using a guide 102. As in FIG. 18, a projector 302 protrudes from a pair of opposing faces of the projection unit 101. Signal light generated by a single projection means 32 is emitted from the projectors 302 of both faces of the projection unit 101. Further, in the main body 10, a camera 301 is disposed in such a way as to obtain a visual field of 360 degrees.

As in FIG. 18, the projection unit 101 moves up and down along the guide 102 and thereby the projector 302 can protrude in a vertical direction of the main body. Therefore, the light irradiation device 1-2 can emit signal light in a direction of substantially 360 degrees.

According to the light irradiation device 1-2 of the present modified example, signal light can be emitted in a direction of 360 degrees using a single projection means 32. A configuration in which a projection window is disposed in one face of a projection unit and the projection unit is rotated along a guide, and thereby an irradiation direction of signal light is caused to be 360 degrees can be made.

(Second Example Embodiment)

Figure 19:
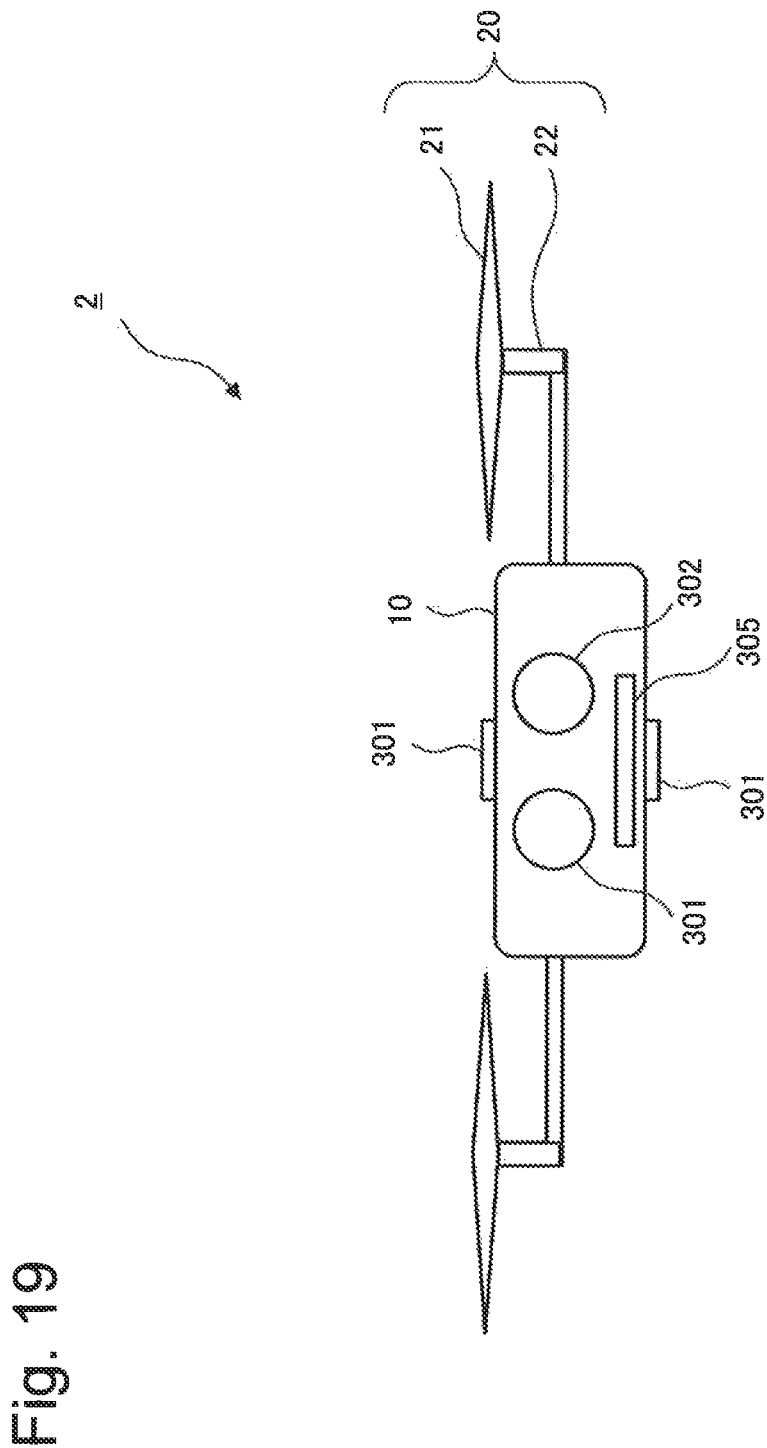
FIG. 19 is a front view of one example of a light irradiation device according to a second example embodiment of the present invention.

Next, a light irradiation device 2 according to a second example embodiment of the present invention will be described with reference to corresponding drawings. FIG. 19 is a front view of the light irradiation device 2 according to the present example embodiment. The light irradiation device 2 includes a sound wave emission port 305 that generates a sound wave. The light irradiation device 2 can irradiate a light irradiation target with a sound wave, together with signal light. The sound wave emission port 305 is an opening for irradiating a light irradiation target with a sound wave, and a shape thereof is not limited.

Figure 20:
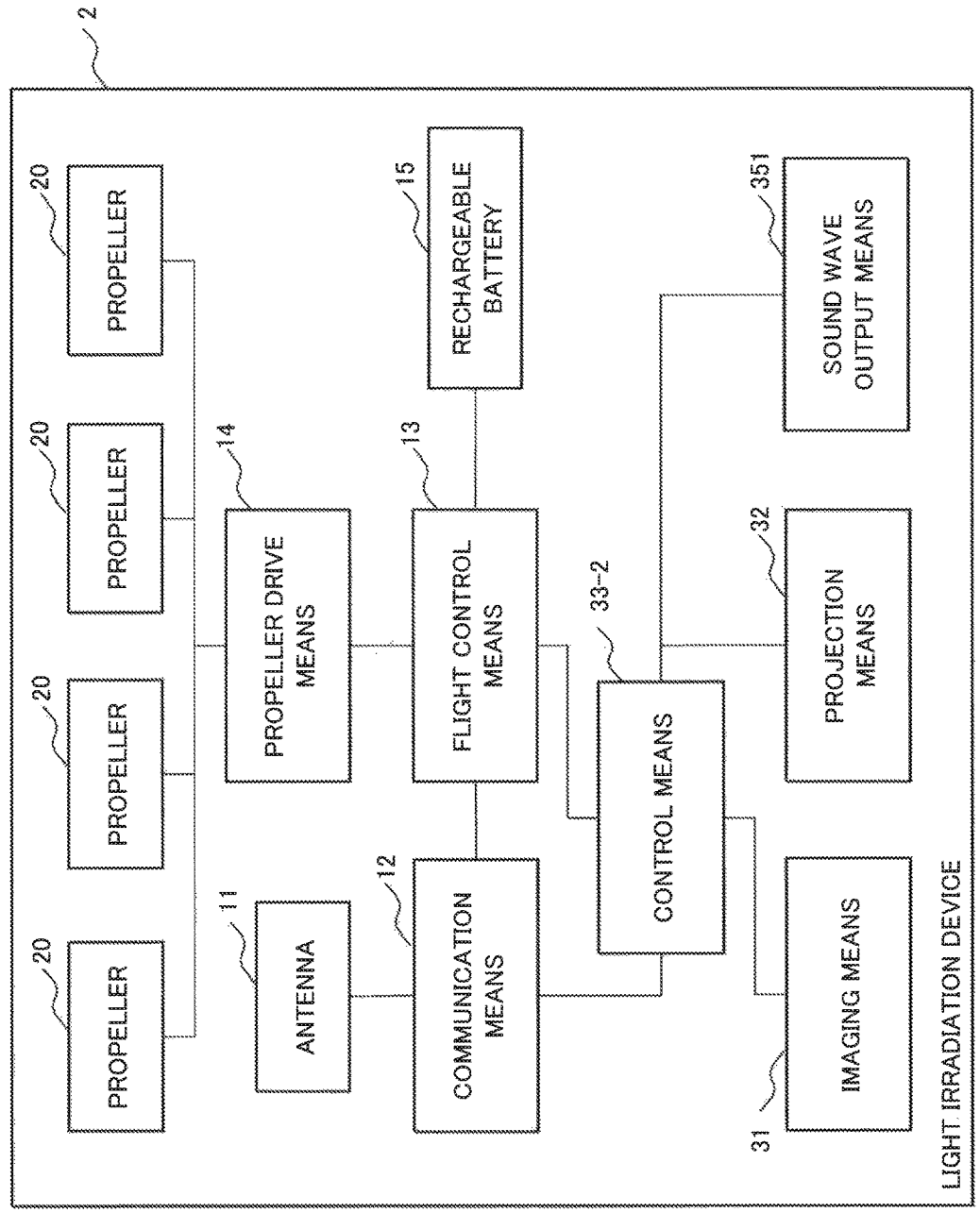
FIG. 20 is a block diagram illustrating a configuration of the light irradiation device according to the second example embodiment of the present invention.
Figure 21:
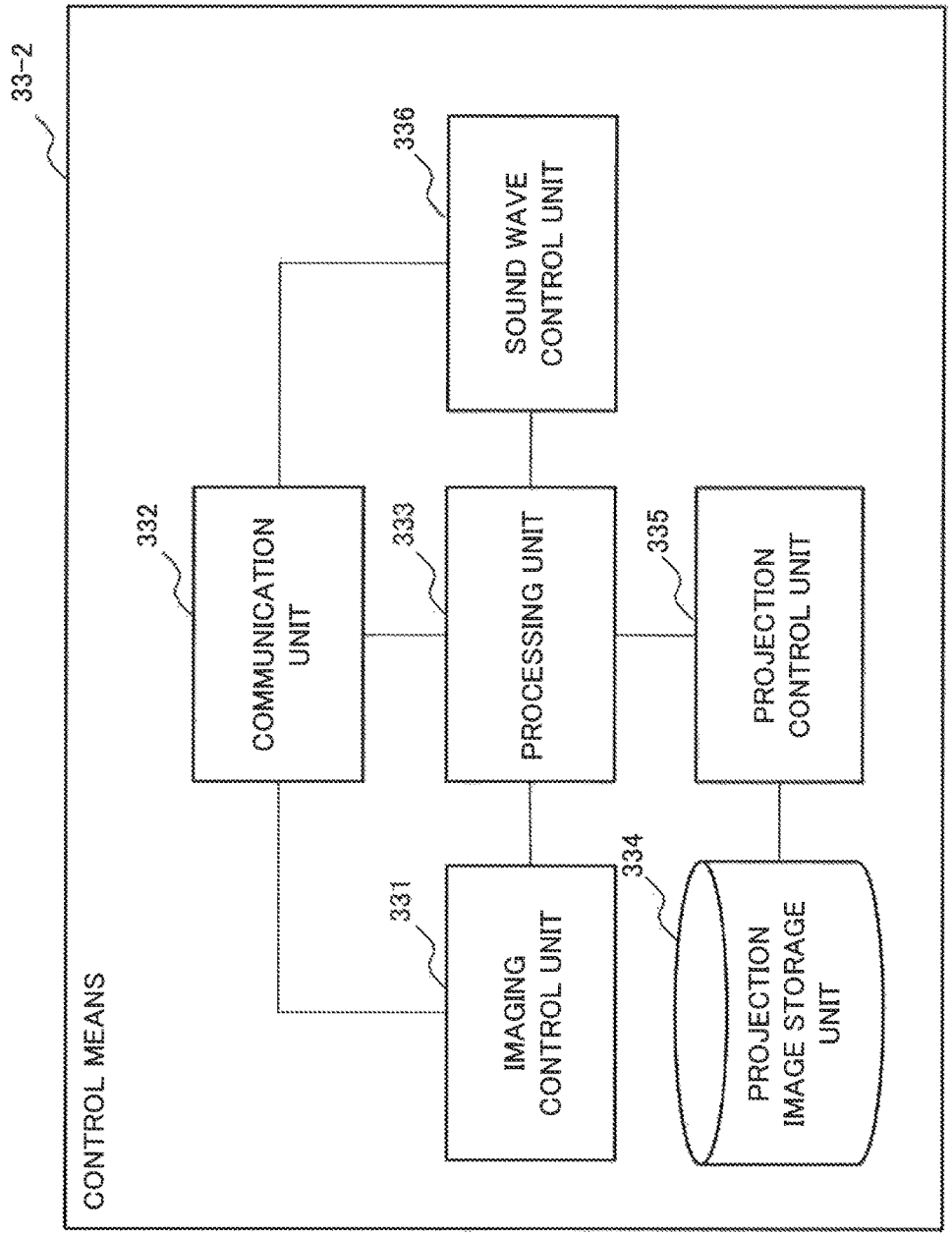
FIG. 21 is a block diagram illustrating a configuration of a control means of the light irradiation device according to the second example embodiment of the present invention.

As in FIG. 20, the light irradiation device 2 according to the present example embodiment includes a configuration in which a sound wave output means 351 is added to the configuration of the light irradiation device 1 according to the first example embodiment. Further, as in FIG. 21, a control means 33-2 of the light irradiation device 2 according to the present example embodiment includes a configuration in which a sound wave control unit 336 is added to the configuration of the control means 33 of the light irradiation device 1 according to the first example embodiment. The configuration of the light irradiation device 2 other than the sound wave output means 351 and the sound wave control unit 336 is the same as the configuration of the light irradiation device 1 according to the first example embodiment.

A processing unit 333 of the control means 33-2 outputs information of a size, an acceleration, a velocity, a position, and the like of a light irradiation target to the sound wave control unit 336.

The sound wave control unit 336 acquires the information of a size, an acceleration, a velocity, a position, and the like of a light irradiation target from the processing unit 333. The sound wave control unit 336 controls the sound wave output means 351 to direct a sound wave to the light irradiation target. The sound wave control unit 336 calculates a distance between the light irradiation device 2 and the light irradiation target, based on position information of the light irradiation target. The sound wave control unit 336 sets a direction in which a sound wave is directed and an output of the sound wave, based on the calculated distance between the light irradiation device 2 and the light irradiation target and the information of the size, the acceleration, the velocity, the position, and the like of the light irradiation target.

The sound wave output means 351 generates a predetermined sound wave in accordance with control of the sound wave control unit 336. The sound wave output means 351 can be enabled, for example, using a speaker having high directionality. A sound wave can be caused to have directionality, for example, by modulating an original sound with ultrasound. The sound wave emitted by the sound wave output means 351 is output from the sound wave emission port 305 toward a light irradiation target.

The light irradiation device 2 emits, toward a bird, for example, a sound wave having a wavelength region or a sound volume which the bird dislikes, in addition to signal light. Further, when the light irradiation device 2 emits a voice of a bird of prey or the like, a bird that is afraid of the bird of prey is frightened and evacuates. Further, the light irradiation device 2 may emit, toward a bird, a sound wave having a wavelength region or a sound volume which the bird dislikes, without signal light irradiation.

As described above, according to the light irradiation device according to the present example embodiment, a sound wave can be emitted to a light irradiation target, in addition to signal light. Therefore, even when a sound is used as a bird strike measure, a person does not need to go to a scene. Further, the light irradiation device according to the present example embodiment can be also used for an application in which a sound having high directionality is fed toward a place irradiated with light.

(Third Example Embodiment)

Figure 22:
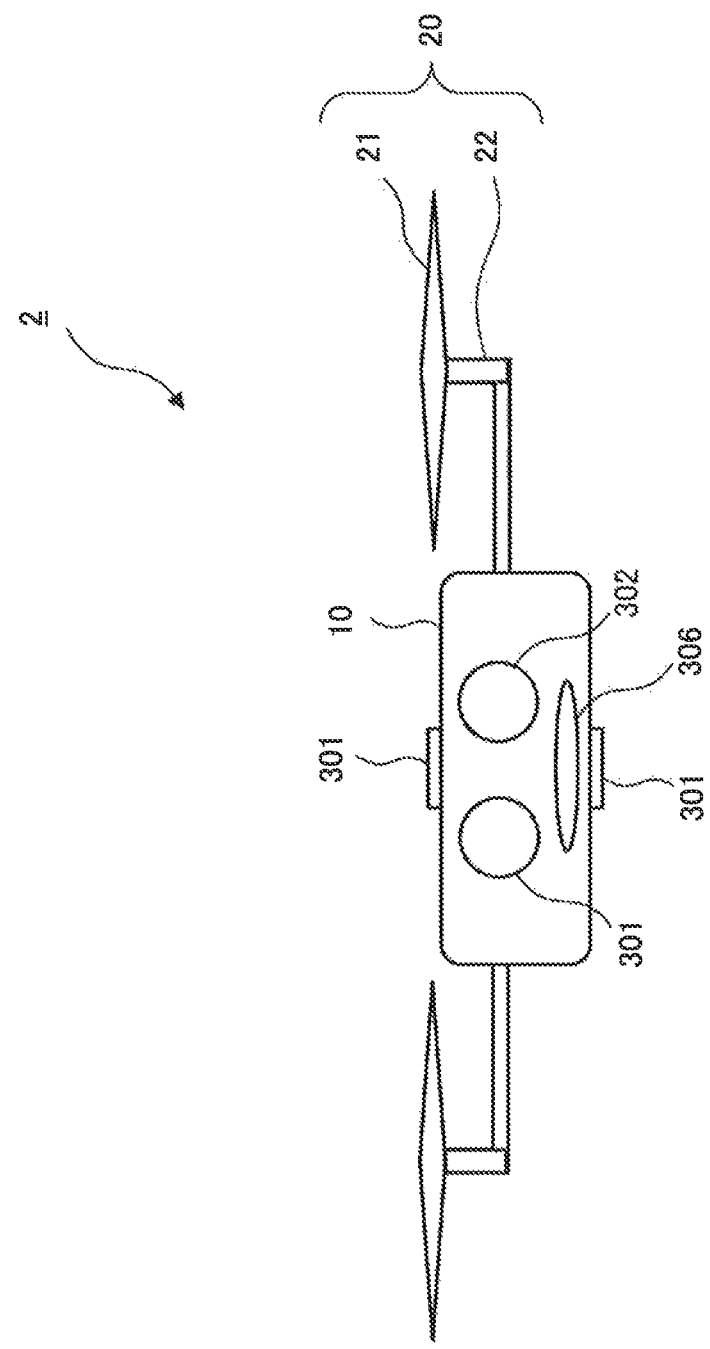
FIG. 22 is a front view of one example of a light irradiation device according to a third example embodiment of the present invention.

Next, a light irradiation device 3 according to a second example embodiment of the present invention will be described with reference to corresponding drawings. FIG. 22 is a front view of the light irradiation device 3 according to the present example embodiment. The light irradiation device 3 includes a sound wave input port 306 to which a sound wave is input. The light irradiation device 3 receives a sound wave during monitoring of a monitoring region. The sound wave input port 306 is an opening to which a sound wave is input, and a shape thereof is not limited.

Figure 23:
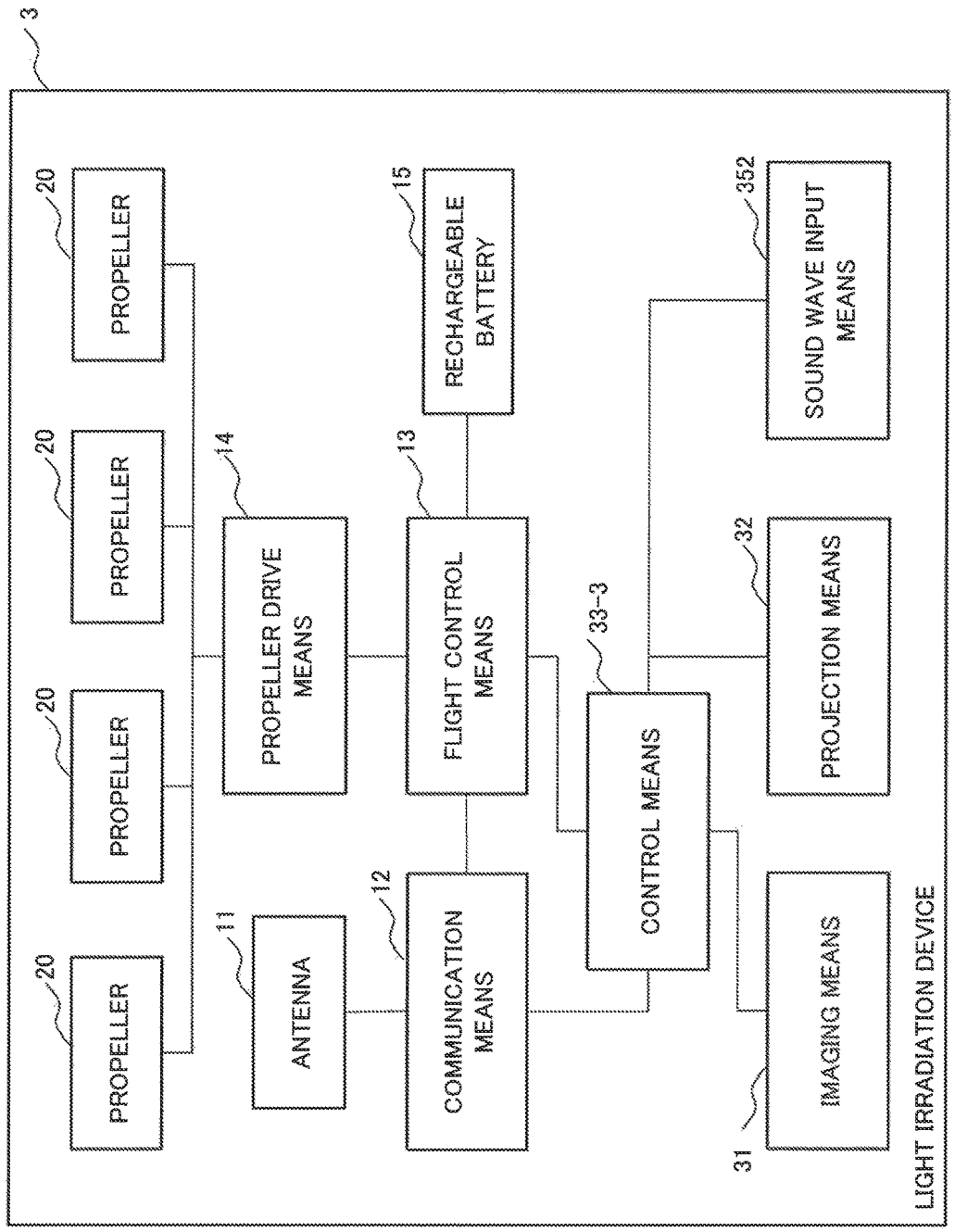
FIG. 23 is a block diagram illustrating a configuration of the light irradiation device according to the third example embodiment of the present invention.
Figure 24:
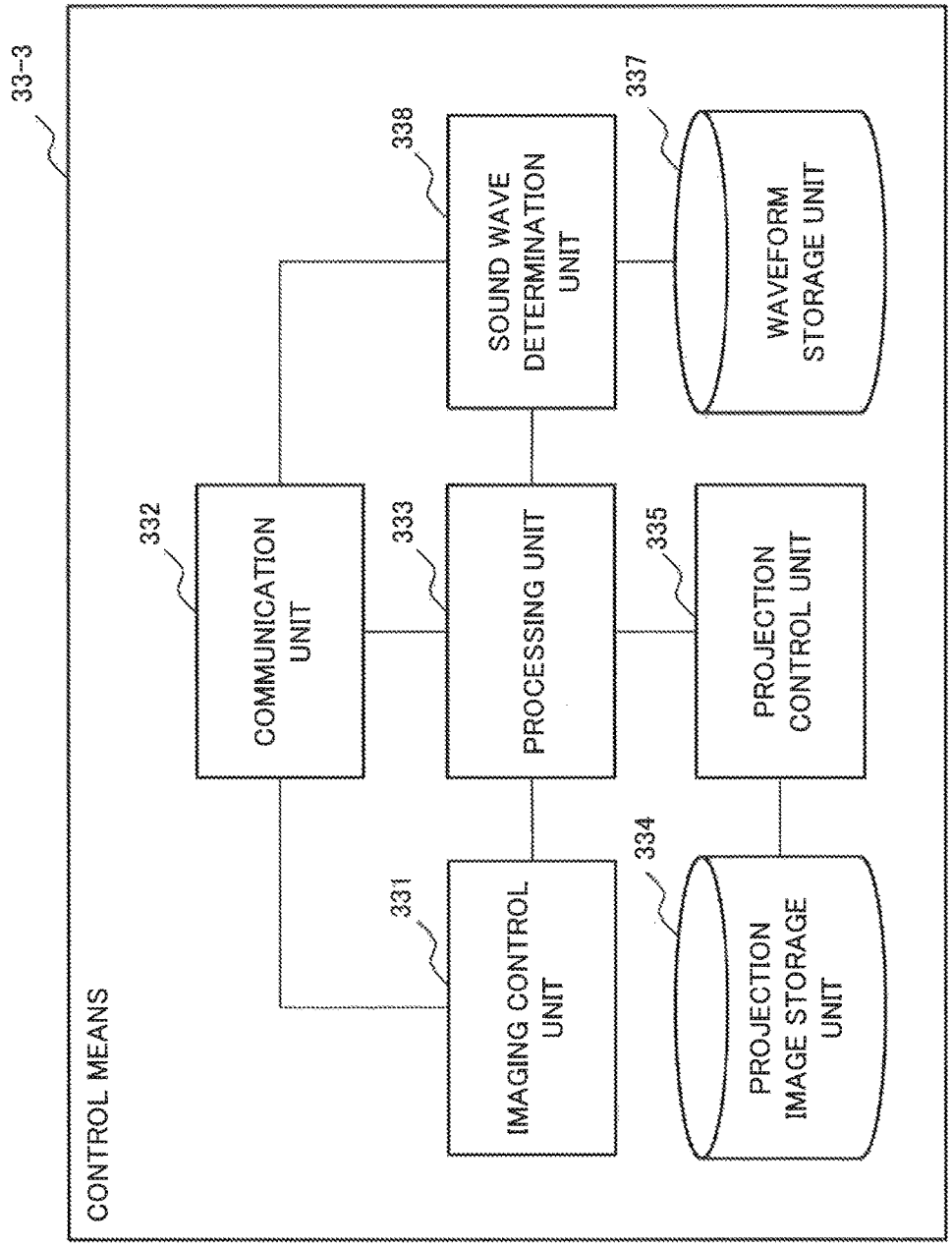
FIG. 24 is a block diagram illustrating a configuration of a control means of the light irradiation device according to the third example embodiment of the present invention.

As in FIG. 23, the light irradiation device 3 according to the present example embodiment includes a configuration in which a sound wave input means 352 is added to the configuration of the light irradiation device 1 according to the first example embodiment. Further, as in FIG. 24, a control means 33-3 of the light irradiation device 3 according to the present example embodiment includes a configuration in which a waveform storage unit 337 and a sound wave determination unit 338 are added to the configuration of the control means 33 of the light irradiation device 1 according to the first example embodiment. The configuration of the light irradiation device 3 other than the sound wave input means 352, the waveform storage unit 337, and the sound wave determination unit 338 is the same as the configuration of the light irradiation device 1 according to the first example embodiment.

The sound wave input means 352 receives a sound wave via the sound wave input port 306 during monitoring of a monitoring region. When a light irradiation target is, for example, a bird and animal such as a bird and the like, the sound wave input means 352 receives a sound wave including a sound emitted from the bird and animal. Further, the sound wave input means 352 acquires sound wave input information including information of a magnitude, a frequency change, and the like of the acquired sound wave for each posture of the light irradiation device 3 and each direction of the sound wave input port 306, with respect to the sound wave acquired during monitoring of the monitoring region.

The sound wave input means 352 outputs the waveform of the sound wave and the sound wave input information acquired during monitoring of the monitoring region to the sound wave determination unit 338. The sound wave input means 352 can be enabled, for example, using a microphone having high directionality.

The waveform storage unit 337 stores feature data of a sound wave emitted from a light irradiation device 503. When, for example, the light irradiation device 503 is birds and animals such as birds and the like, the waveform storage unit 337 stores feature data of sound waves such as sounds, moaning noise, and the like of these birds and animals.

The sound wave determination unit 338 acquires the waveform of the sound wave and the sound wave input information acquired during monitoring of the monitoring region from the sound wave input means 352.

The sound wave determination unit 338 verifies whether a light irradiation target is included in the waveform of the sound wave acquired during monitoring of the monitoring region. At that time, the sound wave determination unit 338 compares the waveform of the sound wave acquired during monitoring of the monitoring region and the feature data stored on the waveform storage unit 337. The sound wave determination unit 338 determines, when detecting feature data of the light irradiation target in the waveform of the sound wave acquired during monitoring of the monitoring region, that the light irradiation target is present in the input sound wave. When the light irradiation target is, for example, a bird and animal such as a bird and the like, the sound wave determination unit 338 tries to detect a sound emitted from the bird and animal from the waveform of the sound wave acquired during monitoring of the monitoring region.

The sound wave determination unit 338 identifies, when determining that feature data derived from the light irradiation target is included in the sound wave acquired during monitoring of the monitoring region, a direction in which the sound wave has been emitted from the sound wave input information. The sound wave determination unit 338 verifies how a magnitude and a frequency of the input sound wave have changed with respect to a posture of the light irradiation device 3 and a direction of the sound wave input port 306 and identifies a position of the light irradiation target.

The sound wave determination unit 338 outputs the identified position of the light irradiation target to the processing unit 333. The processing unit 333 refers to the information acquired from the sound wave determination unit 338 and thereby identifies a position of the light irradiation target.

It is supposed that in a situation where, for example, visibility is poor due to occurrence of a dense fog or occurrence of a cloud of dust, it is difficult for the light irradiation device 3 to image a light irradiation target. Further, it is also supposed that a light irradiation target enters a blind angle of an imaging range of the light irradiation device 3 due to some cause. Further, it is also supposed that a light irradiation target is approaching a position other than a light irradiation target region of the light irradiation device 3. In such cases, the light irradiation device 3 according to the present example embodiment can identify a position of a light detection target using sound wave information input to the sound wave input means 352. The sound wave input means 352 may also include, as an aid for the imaging means 31, a function to the extent that a rough position of a light detection target is identified.

As described above, according to the light irradiation device according to the present example embodiment, it is possible to sense a light irradiation target using auditory information, in addition to visual information imaged by an imaging means. Therefore, a light irradiation target can be captured using auditory information without capturing the light irradiation target using visual information.

(Fourth Example Embodiment)

Figure 25:
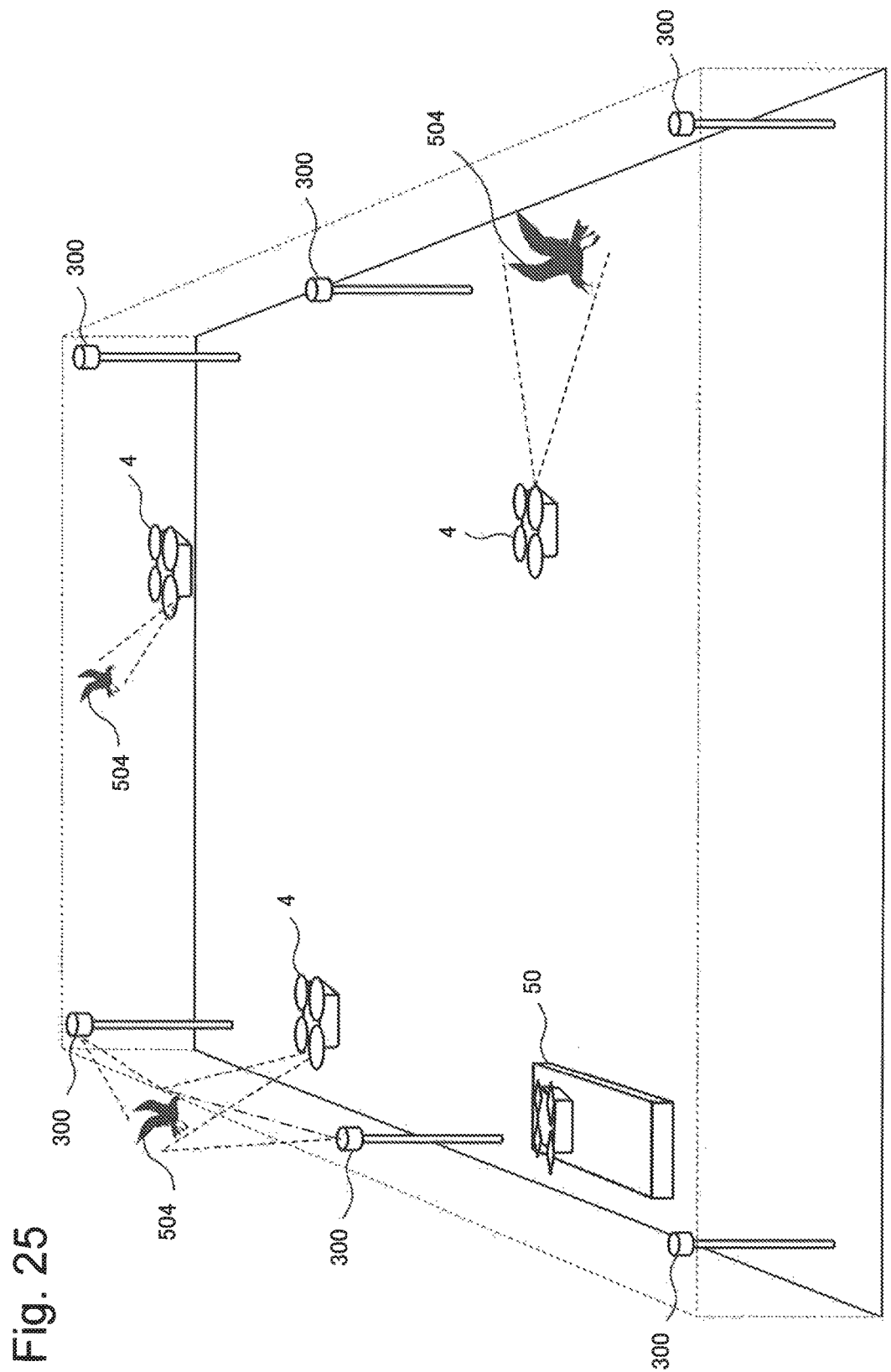
FIG. 25 is a conceptual diagram illustrating one example of a light irradiation system according to a fourth example embodiment of the present invention.

Next, a light irradiation system according to a fourth example embodiment of the present invention will be described with reference to corresponding drawings. FIG. 25 is a conceptual diagram relating to the light irradiation system according to the present example embodiment. The light irradiation system according to the present example embodiment is installed, for example, in an airport or the like and can be used for repelling the light irradiation target 504 such as a bird and the like having flied to the airport or a periphery thereof.

A flight control means 13-4 of a light irradiation device 4 of the light irradiation system according to the present example embodiment includes a configuration in which a rechargeable battery monitoring unit 136 is added to the flight control means 13 of the light irradiation device 1 according to the first example embodiment. The sound wave generation function of the light irradiation device 2 according to the second example embodiment and the sound wave input function of the light irradiation device 3 according to the third example embodiment may be added to the light irradiation device 4 according to the present example embodiment.

Further, the light irradiation system according to the present example embodiment includes a stationary camera station 300, in addition to the light irradiation device 4. A number of installation units of the camera station 300 can be changed according to a scale of the light irradiation system of the present example embodiment. When, for example, the light irradiation system is used in an airport, approximately several tens to several hundred units of camera stations 300 are realistically installed.

Further, the light irradiation system according to the present example embodiment includes a power feeding station 50 for feeding power to the light irradiation device 4. A number of installation units of the power feeding station 50 can be changed in accordance with a scale of the light irradiation system according to the present example embodiment.

Figure 26:
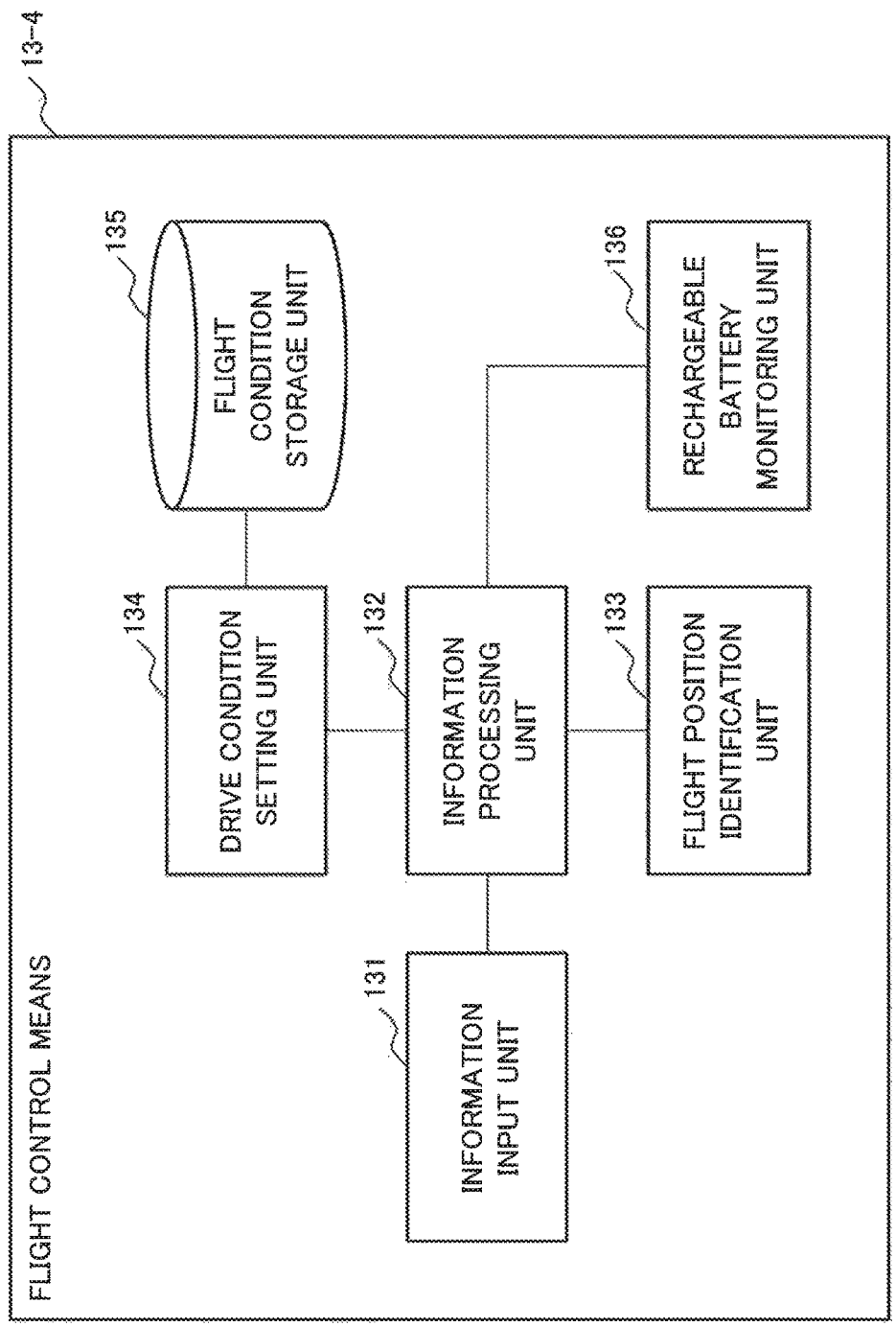
FIG. 26 is a block diagram illustrating a configuration of a flight control means of a light irradiation device according to the fourth example embodiment of the present invention.

As in FIG. 26, the light irradiation device 4 includes a rechargeable battery monitoring unit 136. The rechargeable battery monitoring unit 136 monitors a remaining amount and a usage situation of a rechargeable battery 15 of the own device. Further, the rechargeable battery monitoring unit 136 acquires a flight situation of the own device from an information processing unit 132 and determines whether the acquired flight situation is caused to be toward the power feeding station 50 in accordance with the remaining amount and the usage situation of the rechargeable battery 15.

The rechargeable battery monitoring unit 136 notifies, for example, when determining that a remaining amount of the rechargeable battery 15 is small and it is difficult to continue to irradiate the light irradiation target 504 with light as is, the information processing unit 132 or the like in such a way as to perform control for landing on the power feeding station 50. The rechargeable battery monitoring unit 136 notifies, when detecting, for example, a value more than an output of the rechargeable battery 15, the information processing unit 132 or the like in such a way as to perform control for landing on the power feeding station 50. The rechargeable battery monitoring unit 136 may notify, for example, in preparation for a high frequency time zone of the light irradiation target 504, the information processing unit 132 or the like at a predetermined time in such a way as to perform control for landing on the power feeding station 50.

The flight control means 13-4 controls the own device to move toward the power feeding station 50 in accordance with the notification of the rechargeable battery monitoring unit 136.

Further, the light irradiation device 4 wirelessly communicates with the camera station 300 via the communication means 12. The light irradiation device 4 moves, when receiving, for example, information in which the light irradiation target 504 is approaching from the camera station 300, to a position where the light irradiation target 504 can be repelled by being irradiated with signal light. The light irradiation device 4 irradiates the light irradiation target 504 with signal light at a timing when having reached a position where the light irradiation target 504 can be repelled. In this manner, the light irradiation device 4 repels the light irradiation target 504 in cooperation with the camera station 300.

Figure 27:
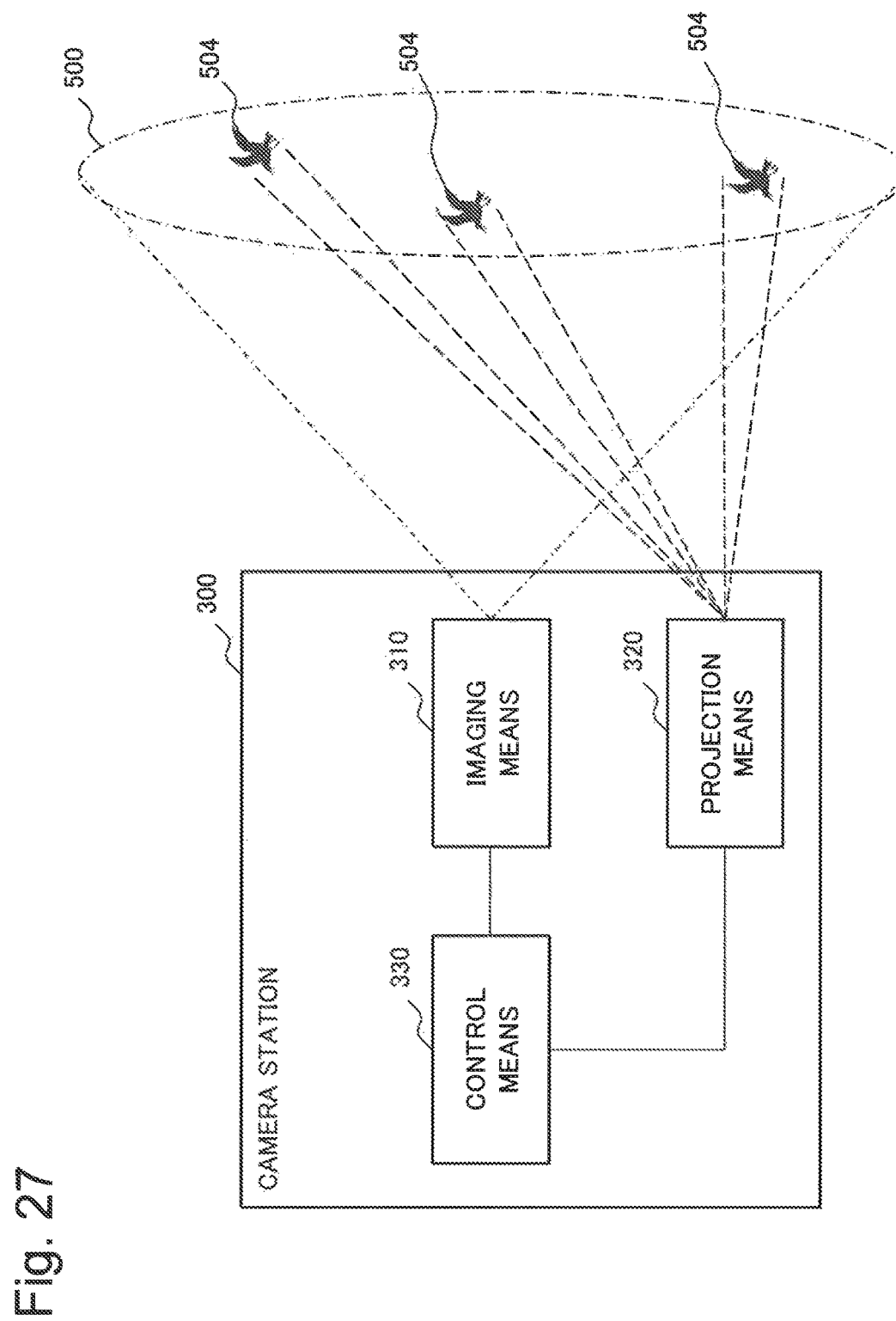
FIG. 27 is a block diagram illustrating a configuration of a camera station of the light irradiation system according to the fourth example embodiment of the present invention.

As in FIG. 27, the camera station 300 includes an imaging means 310, a projection means 320, and a control means 330 in the same manner as the information input/output function 30 of the light irradiation device 1 according to the first example embodiment. The imaging means 310 includes the function of the imaging means 31, the projection means 320 includes the function of the projection means 32, and the control means 330 includes the function of the control means 31. The projection means 320 irradiates the light irradiation target 504 in a monitoring region 500 with signal light.

The camera station 300 monitors the monitoring region 500 including the light irradiation target 504 using a camera, not illustrated, and irradiates the light irradiation target 504 with signal light via a projector that is not illustrated. The camera station 300 is preferably installed in a periphery of a target facility, for example.

The camera station 300 is mounted on a pole or the like reaching a height where the light irradiation target 504 is easily monitored. The height where the camera station 300 is mounted can be optionally set. A monitoring direction of the camera station 300 can be preferably changed by a remote operation. It is possible that, for example, rotatable fixtures are disposed at a tip of the pole horizontally and vertically and an information input/output function of the camera station 300 is disposed in the fixtures. Further, a configuration in which a function for controlling a monitoring direction is added to the camera station 300 and the monitoring direction is controlled by an external terminal operation may be made.

Further, the camera station 300 wirelessly communicates with another camera station 300 and the light irradiation device 4 using a communication unit in the control means 330. The camera station 300 cooperatively repels the light irradiation target 504 in cooperation with the another camera station 300 and the light irradiation device 4. The camera station 300 may analyze image data received from the another camera station 300 and the light irradiation device 4 and thereby determine a position of a light irradiation target.

Figure 28:
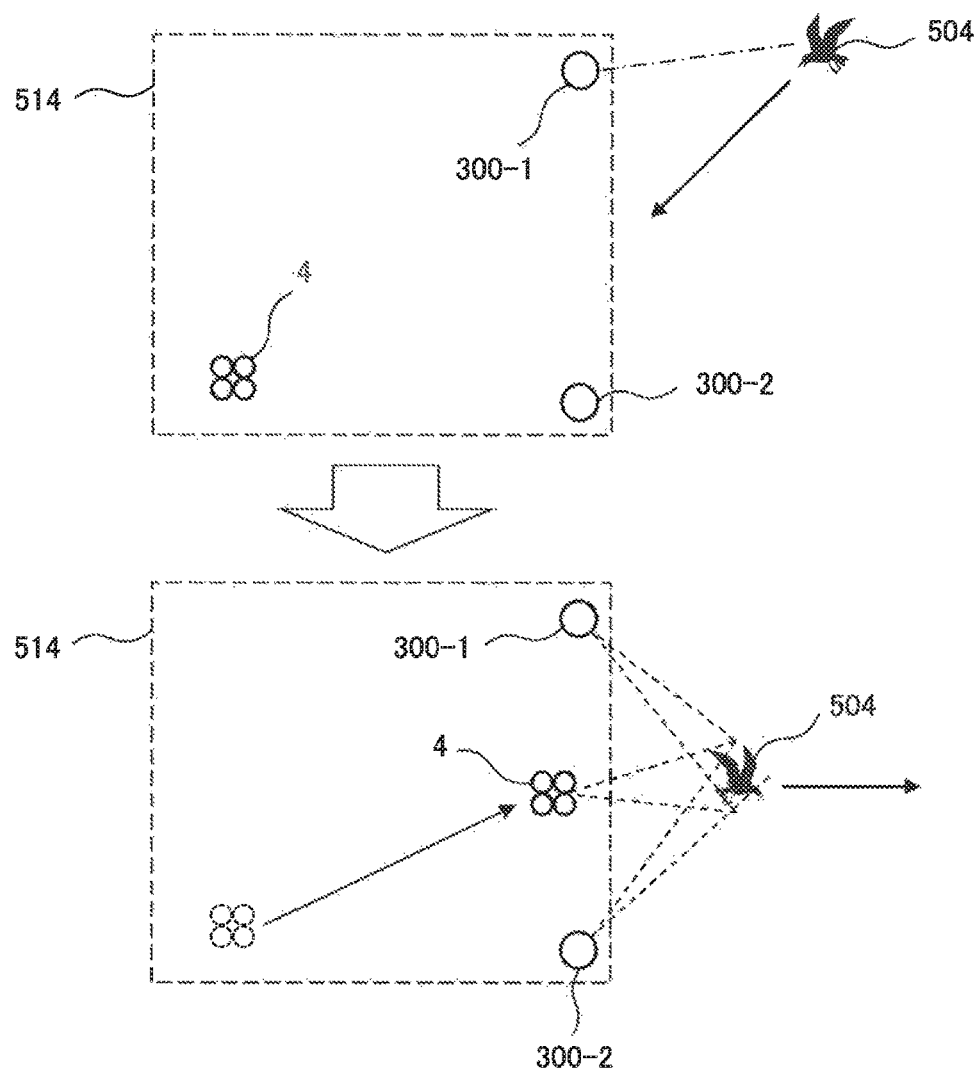
FIG. 28 is a conceptual diagram illustrating one example in which a light irradiation target is repelled by the light irradiation system according to the fourth example embodiment of the present invention.
Figure 29:
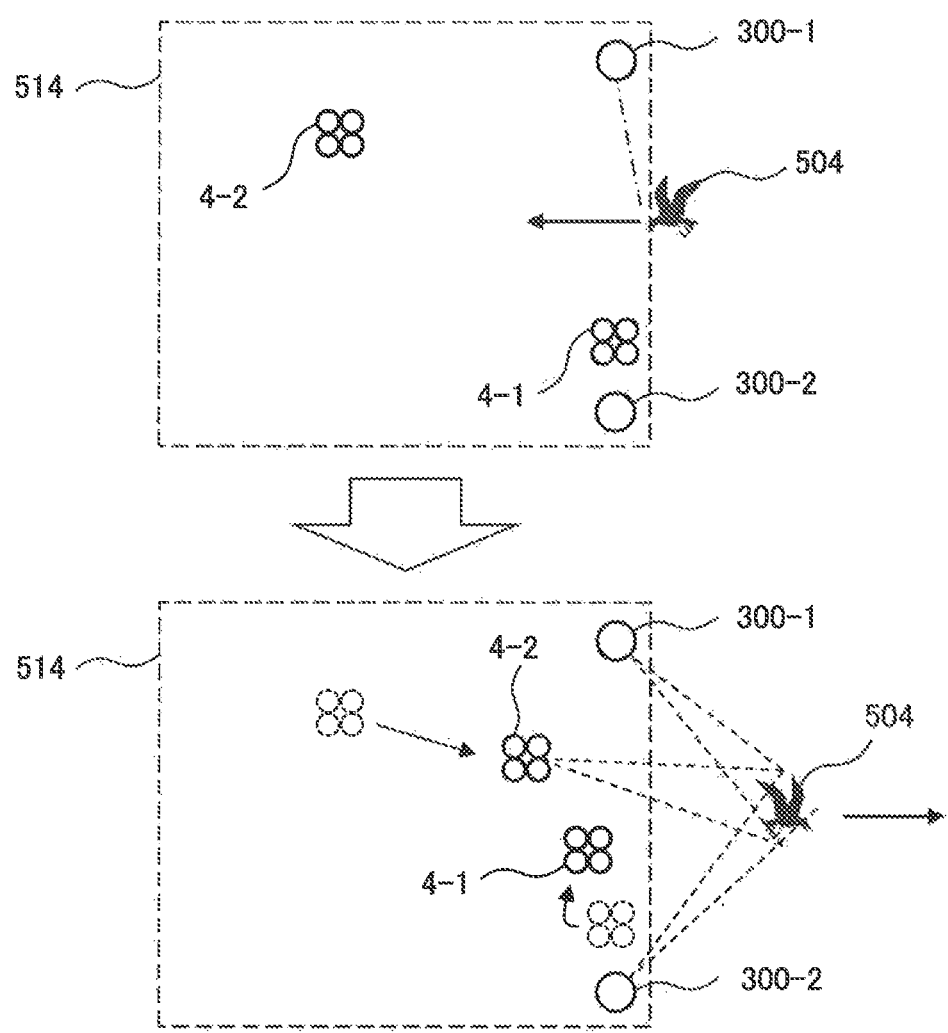
FIG. 29 is a conceptual diagram illustrating another example in which a light irradiation target is repelled by the light irradiation system according to the fourth example embodiment of the present invention.

FIG. 28 and FIG. 29 each are a conceptual diagram illustrating one example in which the light irradiation target 504 intending to invade a facility region 514 is repelled.

The example of FIG. 28 is a case in which when the light irradiation target 504 is irradiated with signal light, the light irradiation target 504 can be repelled to the outside of a range of the facility region 514.

First, a camera station 300-1 detects the light irradiation target 504. When having detected the light irradiation target 504, the camera station 300-1 irradiates the detected light irradiation target 504 with signal light and notifies anther camera station 300-2 and the light irradiation device 4 of a position of the light irradiation target 504 to make a notification to emit signal light.

The camera station 300-2 receives the notification from the camera station 300-1 and irradiates the light irradiation target 504 with signal light. The light irradiation device 4 receives the notification from the camera station 300-1, approaches the light irradiation target 504, and irradiates the light irradiation target 504 with signal light at a timing when having reached a position where the light irradiation target 504 can be repelled to the outside of a range of the facility region 514.

The example of FIG. 29 is a case in which when the light irradiation target 504 is irradiated with signal light, the light irradiation target 504 may enter a range of the facility region 514.

First, the camera station 300-1 detects the light irradiation target 504. When having detected the light irradiation target 504, the camera station 300-1 irradiates the detected light irradiation target 504 with signal light and notifies another camera station 300-2 and light irradiation devices 4-1 and 4-2 of a position of the light irradiation target 504. At that time, the camera station 300-1 notifies the camera station 300-2 and the light irradiation device 4-1 likely to force the light irradiation target 504 to move into the facility region 514 when being irradiated with signal light in such a way as not to suddenly emit signal light. On the other hand, the camera station 300-1 notifies the light irradiation device 4-2 unlikely to force the light irradiation target 504 to move into the facility region 514 even when being irradiated with signal light in such a way as to immediately irradiate the light irradiation target 504 with signal light.

The light irradiation device 4-2 approaches, when receiving the notification of the camera station 300-1, the light irradiation target 504 while irradiating the light irradiation target 504 with signal light. The camera station 300-2 receives the notification from the camera station 300-1 and waits. The light irradiation device 4 approaches, when receiving the notification from the camera station 300-1, the light irradiation target 504 and irradiates the light irradiation target 504 with signal light at a timing when having reached a position where the light irradiation target 504 can be repelled to the outside of a range of the facility region 514.

In this manner, the light irradiation system according to the present example embodiment can reliably repel a light irradiation target from a facility region in cooperation among a plurality of camera stations 300 and the light irradiation device 4. In other words, in the light irradiation system according to the present example embodiment, a plurality of camera stations 300 and the light irradiation device 4 mutually cooperate and cooperatively irradiate a light irradiation target with signal light for guiding the light irradiation target in a desired direction.

Further, a light irradiation target detection device 200 including a radar function for detecting a light irradiation target may be added to the camera station 300. When the light irradiation target is a bird, the light irradiation target detection device 200 is equivalent to a bird radar. The light irradiation target detection device 200 may be added to a configuration including the light irradiation device 4, the power feeding station 50, and the like.

Figure 30:
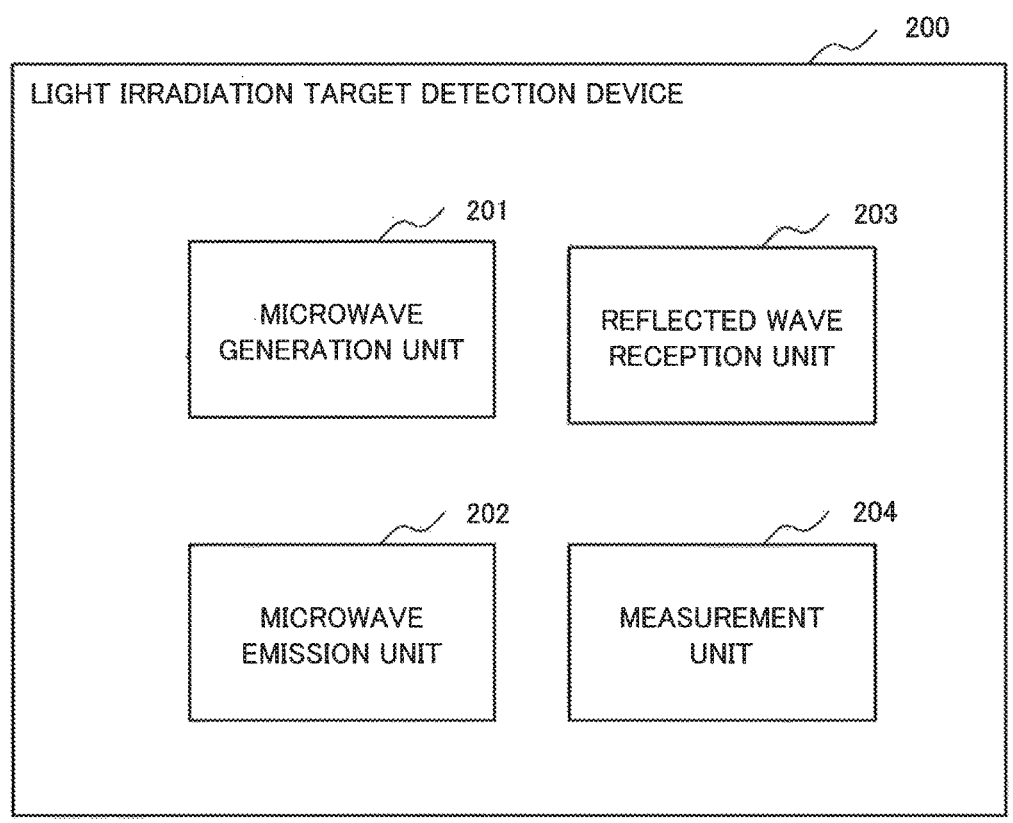
FIG. 30 is a block diagram illustrating a configuration of one example of a light irradiation target detection device mounted on the light irradiation system according to the fourth example embodiment of the present invention.

As in FIG. 30, the light irradiation target detection device 200 includes, for example, a microwave generation unit 201, a microwave irradiation unit 202, a reflected wave reception unit 203, and a measurement unit 204.

The microwave generation unit 201 generates a microwave of a specific wavelength. The microwave generation unit 201 may generate a microwave of a specific wavelength such as an X band, an S band, and the like when the light irradiation target 504 is a bird. The microwave emission unit 202 emits a microwave toward the light irradiation target 504. The reflected wave reception unit 203 includes an antenna (not illustrated) for scanning and receiving a reflected wave of the microwave emitted by the microwave emission unit 202. The antenna of the reflected wave reception unit 203 scans the reflected wave while rotating. The measurement unit 204 measures a position and a direction of the light irradiation target 504 according to a situation of the reflected wave. The measurement unit 204 can measure a direction of the light irradiation target 504 by the reflected wave scanned while the antenna rotates. Further, the measurement unit 204 can measure a position of the light irradiation target 504 by a return time of the reflected wave.

The light irradiation target detection device 200 transmits the detection result to the control means 330 of the camera station 300. When the light irradiation target detection device 200 is mounted on the light irradiation device 4, the light irradiation target detection device 200 transmits the detection result to the control means 33 of the light irradiation device 4.

Further, the light irradiation system according to the present example embodiment may be configured to receive information of a bird radar mounted on another system. The light irradiation system according to the present example embodiment may set, based on the received information of the bird radar, an imaging direction of the light irradiation target 504 and a projection direction of signal light.

Figure 31:
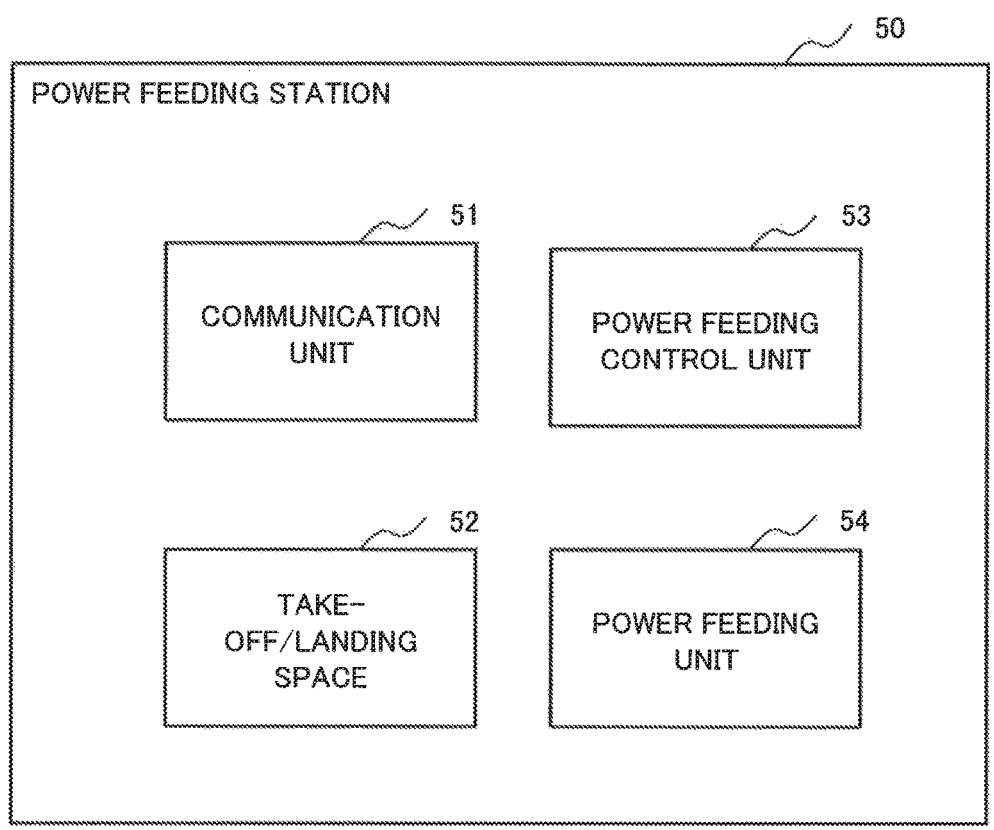
FIG. 31 is a block diagram illustrating a configuration of a power feeding station of the light irradiation system according to the fourth example embodiment of the present invention.

As in FIG. 31, the power feeding station 50 includes a communication unit 51, a take-off/landing space 52, a power feeding control unit 53, and a power feeding unit 54. Only one power feeding station 50 is illustrated in FIG. 31, but a plurality of power feeding stations 50 may be provided.

The communication unit 51 wirelessly communicates with a light irradiation device. The communication unit 51 can be configured to emit, in response to a landing request from a light irradiation device that needs power feeding, a landing signal to the light irradiation device. Further, the communication unit 51 may be configured to emit a landing instruction to the light irradiation device that needs power feeding. Further, the communication unit 51 may be configured to notify the light irradiation device of vacancy situations of the take-off/landing space 52 and the power feeding unit 54.

The take-off/landing space 52 is a space for causing a light irradiation device to take off and land. The take-off/landing space 52 is preferably disposed on an upper face of the power feeding station 50. A configuration in which upon landing on the take-off/landing space 52, power can be fed to the light irradiation device from the power feeding unit 54 may be made.

The power feeding control unit 53 sets a condition for feeding power to a light irradiation device. The power feeding control unit 53, for example, may change power to be fed in accordance with a charging state of a light irradiation device or may change power to be fed in accordance with a number of light irradiation devices being fed with power. A feeding mode of power set by the power feeding control unit 53 is not limited.

The power feeding unit 54 is a portion for feeding power to a light irradiation device. The power feeding unit 54 can be configured, for example, to directly bring a power feeding instrument of the power feeding unit 54 into contact with a power plug of a light irradiation device and feed power to the light irradiation device in accordance with control of the power feeding control unit 53. Further, the power feeding unit 54 can be also configured, for example, to wirelessly feed power to a power reception unit of a light irradiation device. A technique for feeding power to a light irradiation device using the power feeding unit 54 is not limited.

Further, when the light irradiation target 504 is a bird, the power feeding station 50 may receive information of a bird radar and set a charging timing for the light irradiation device 4 in cooperation with the bird radar. A configuration in which when, for example, a bird is not being captured by the bird radar, a light irradiation device is requested to land and is fed with power can be made. Further, a configuration in which when, for example, a large number of birds have been captured by the bird radar, a flying time of the birds is predicted and many light irradiation devices 4 can fly at the predicted flying time while sufficient power is stored can be made.

As described above, according to the light irradiation system according to the present example embodiment, a plurality of camera stations and a light irradiation device mutually cooperate, and thereby a light irradiation target can be guided in a desired direction. Further, according to the light irradiation system according to the present example embodiment, a light irradiation device monitors a battery remaining amount of the own device and thereby can charge a rechargeable battery by returning to a power feeding station by itself. Further, it is more effective that a bird radar is added to the light irradiation system according to the present example embodiment and a charging timing in a power feeding station is set in cooperation with the bird radar.

(Modified Example)

Figure 32:
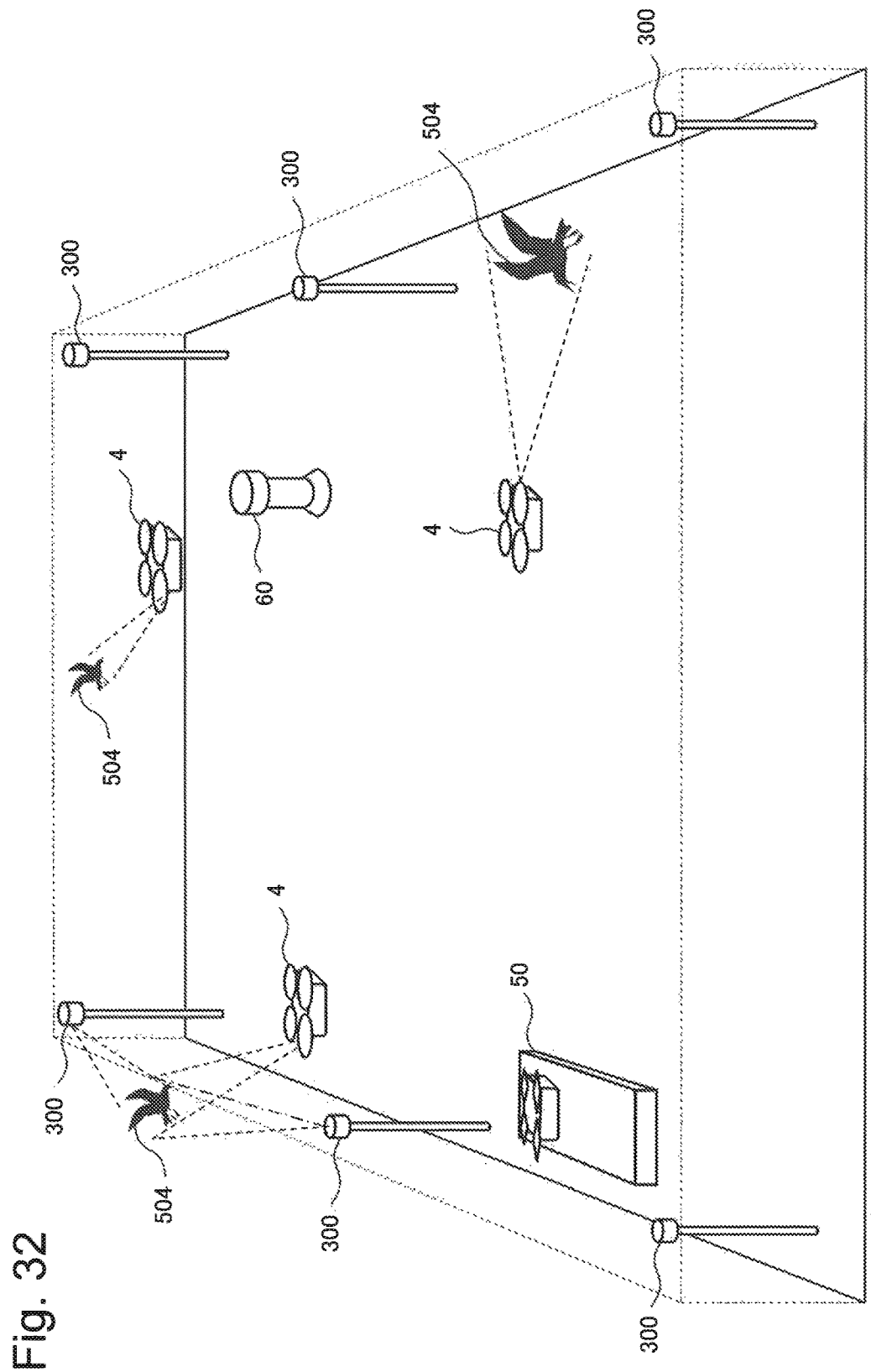
FIG. 32 is a conceptual diagram illustrating a modified example of the light irradiation system according to the fourth example embodiment of the present invention.

A modified example of the light irradiation system according to the fourth example embodiment will be described using corresponding drawings. FIG. 32 is a conceptual diagram illustrating a configuration of a light irradiation system according to the modified example. The modified example of FIG. 32 includes a configuration in which a monitoring center 60 is added to the configuration of FIG. 25.

The monitoring center 60 wirelessly communicates mutually with a plurality of camera stations 300 and a plurality of light irradiation devices 4. The monitoring center 60 collects information of light irradiation targets 504 from the plurality of camera stations 300 and the plurality of light irradiation devices 4. The monitoring center 60 notifies the plurality of camera stations 300 and the plurality of light irradiation devices 4 of how to respond to the respective light irradiation targets 504.

The plurality of camera stations 300 and the plurality of light irradiation devices 4 operate in accordance with an instruction of the monitoring center 60. Further, the monitoring center 60 may be configured to wirelessly control a flight operation of the light irradiation device 4.

When the light irradiation target 504 is a bird, a function of a bird radar may be added to the monitoring center 60. In this case, the monitoring center 60 sets imaging directions of the plurality of camera stations 300 and the plurality of light irradiation devices 4, based on information acquired by the bird radar.

According to the light irradiation system of the present modified example, operations of a plurality of camera stations 300 and a plurality of light irradiation devices 4 can be controlled by the monitoring center 60, and thereby the plurality of camera stations 300 and the plurality of light irradiation devices 4 can be operated more cooperatively. As a result, it is possible to more reliably cause a light irradiation target not to invade a facility region.

(Fifth Example Embodiment)

Figure 33:
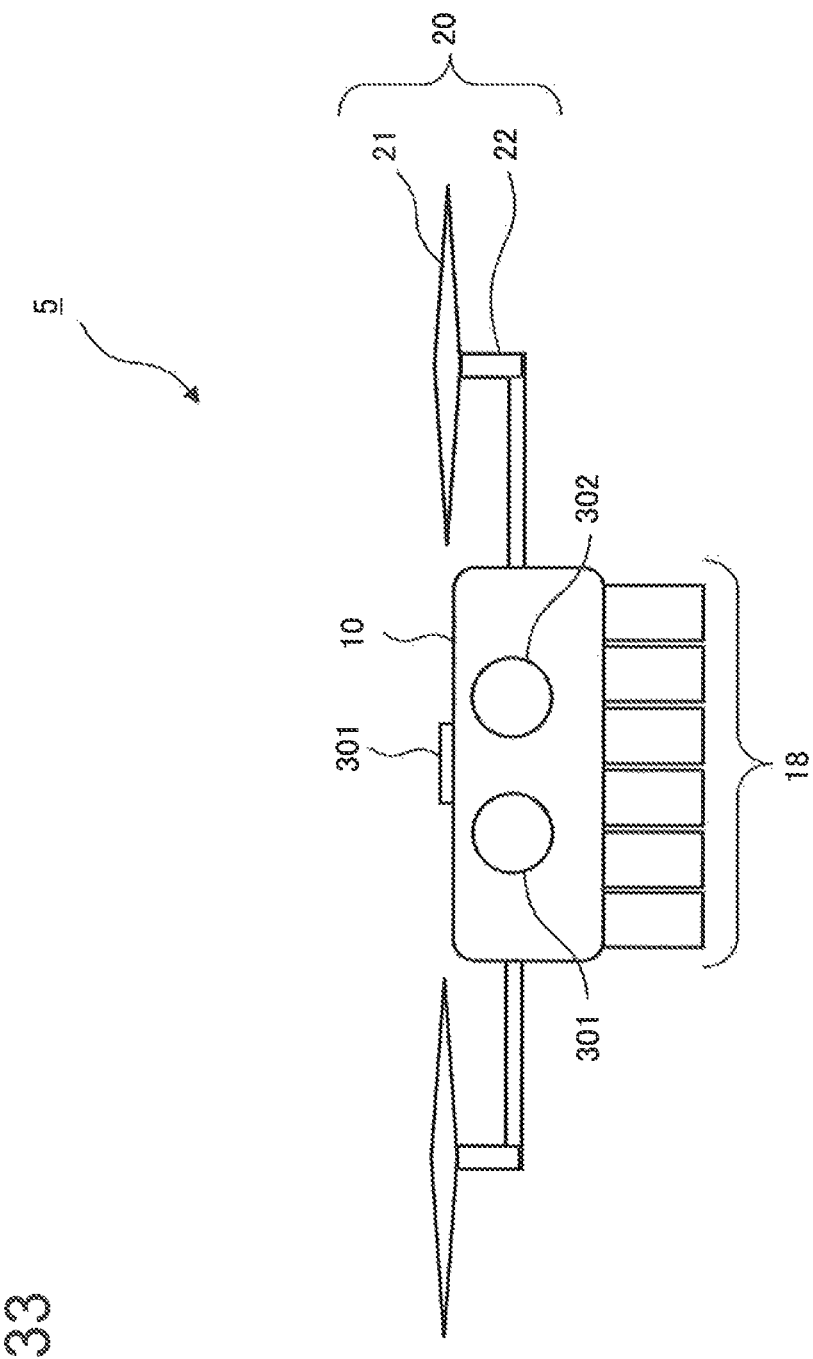
FIG. 33 is a side view of one example of a light irradiation device according to a fifth example embodiment of the present invention.

Next, a light irradiation system according to a fifth example embodiment of the present invention will be described with reference to corresponding drawings. FIG. 33 is a side view of a light irradiation device 5 according to the present example embodiment. The light irradiation device 5 according to the present example embodiment includes at least one slave device 18, in addition to the light irradiation device 1 according to the first example embodiment. The slave device 18 is a detachable device including a function for guiding light.

Figure 34:
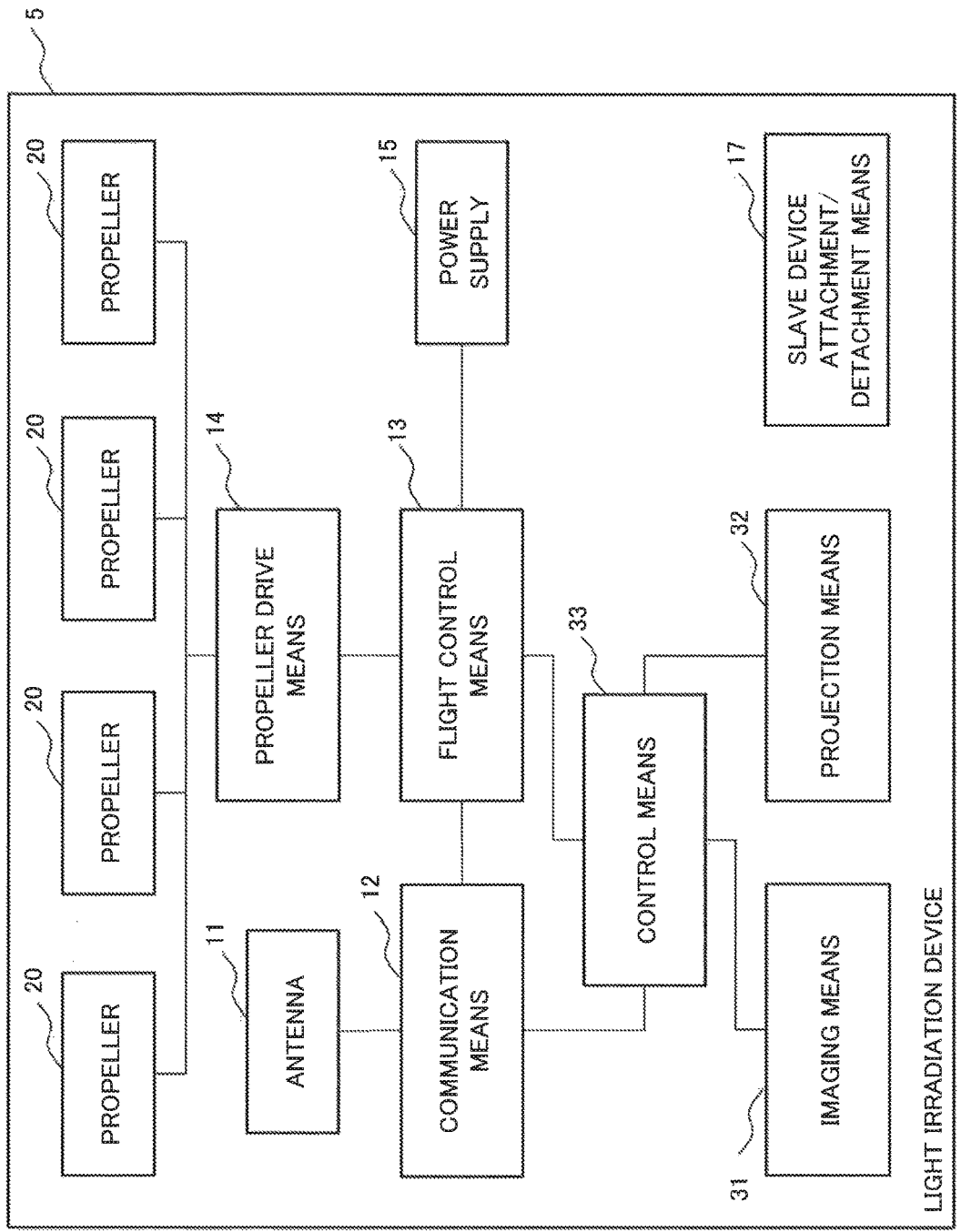
FIG. 34 is a block diagram illustrating a configuration of the light irradiation device according to the fifth example embodiment of the present invention.

As in FIG. 34, the light irradiation device 5 according to the present example embodiment includes a configuration in which a slave device attachment/detachment means 17 is added to the configuration of the light irradiation device 1 according to the first example embodiment.

Figure 35:
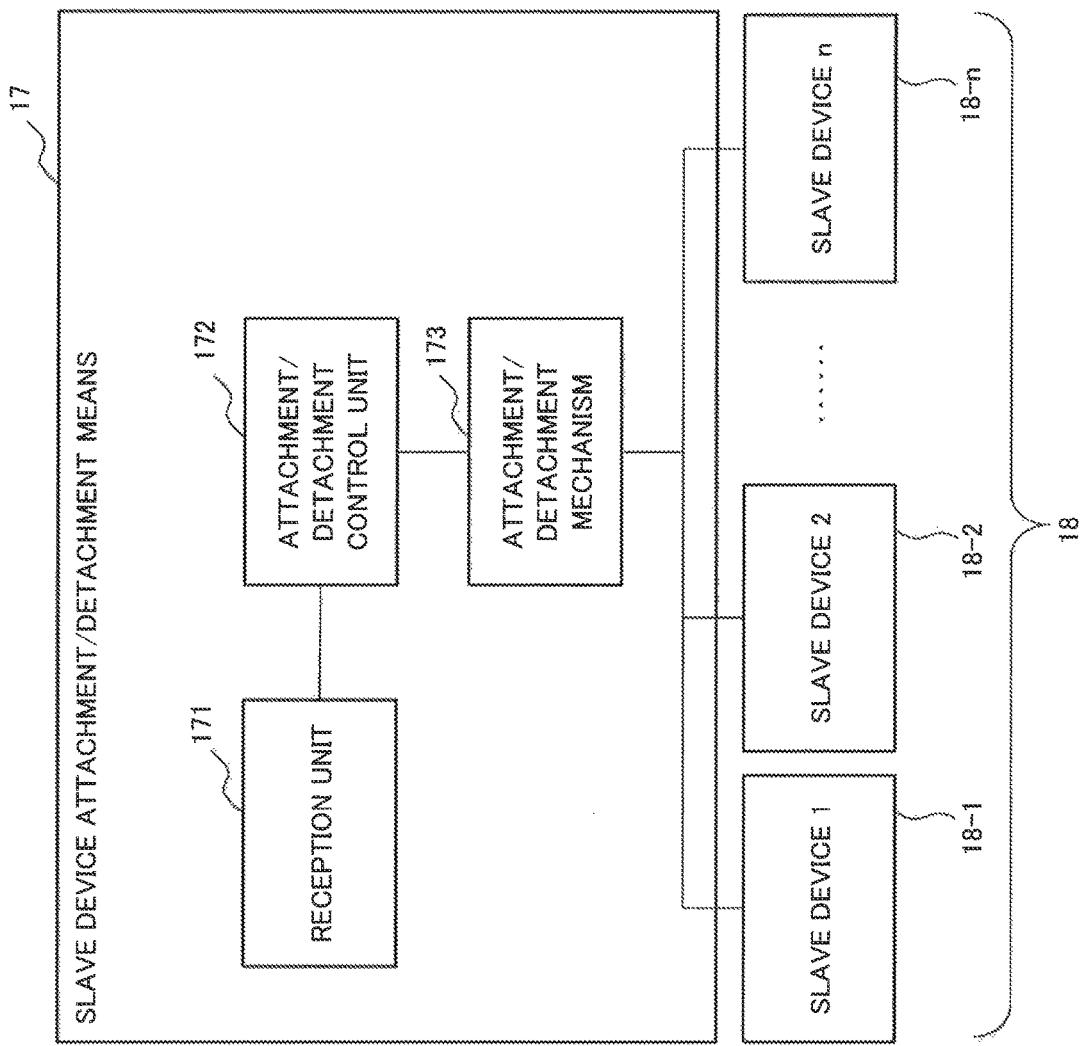
FIG. 35 is a block diagram illustrating a configuration of a slave device attachment/detachment means of the light irradiation device according to the fifth example embodiment of the present invention.

FIG. 35 is a block diagram illustrating a configuration of the slave device attachment/detachment means 17. The slave device attachment/detachment means 17 includes a reception unit 171, an attachment/detachment control unit 172, and an attachment/detachment mechanism 173.

The reception unit 171 detaches, in a situation where the slave device 18 is detached, any slave device 18 of slave devices 18-1 to n (n is a natural number) from the light irradiation device 5. When, for example, a light irradiation device has been close, at a predetermined distance, to or makes contact with a light irradiation target, a higher-level system transmits an instruction for detaching the slave device 18 to the light irradiation device 5. At that time, the reception unit 171 receives the instruction via the communication means 12 and outputs the received instruction to the attachment/detachment control unit 172.

The attachment/detachment control unit 172 controls the attachment/detachment mechanism 173 to detach any slave device 18 in accordance with the received instruction.

The attachment/detachment mechanism 173 is a mechanism for attaching and detaching the slave device 18. The attachment/detachment mechanism 173 operates in accordance with control of the attachment/detachment control unit 172 and detaches a specified slave device 18. The attachment/detachment mechanism 173 has, for example, a structure connected to the slave device 18 by being fitted into a part of the slave device 18 or by holding a part of the slave device.

Figure 36:
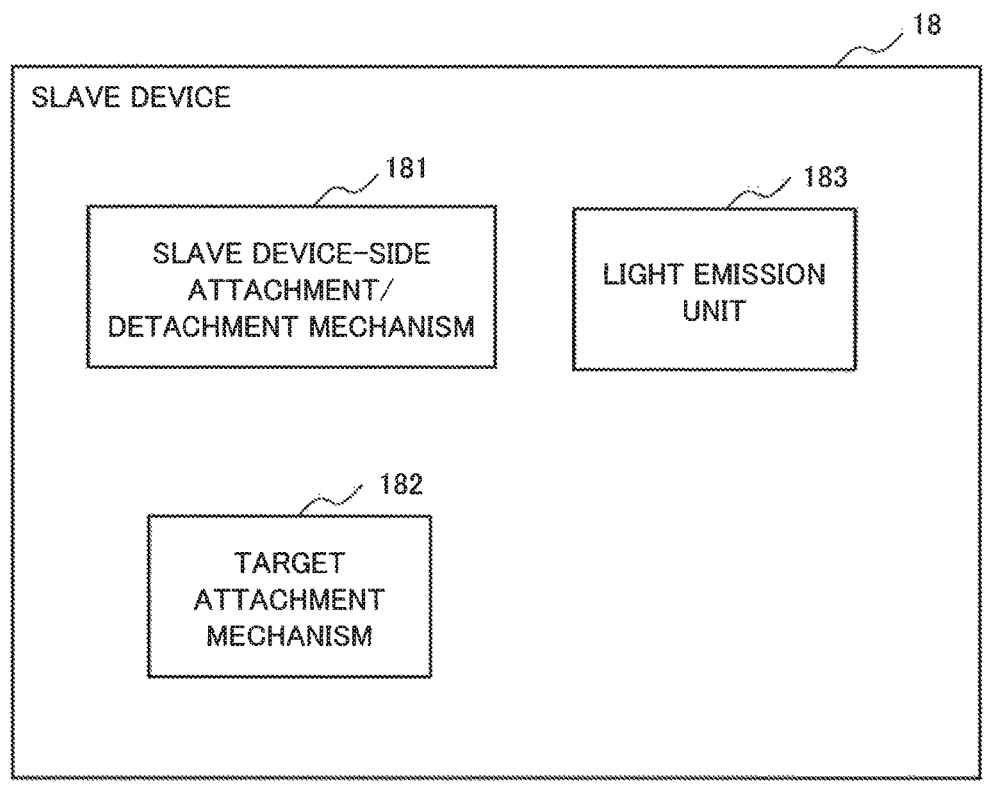
FIG. 36 is a block diagram illustrating a configuration of a slave device of the light irradiation device according to the fifth example embodiment of the present invention.

FIG. 36 is a block diagram illustrating a configuration of the slave device 18. The slave device 18 includes a slave device-side attachment/detachment mechanism 181, a target attachment mechanism 182, and a light emission unit 183.

The slave device-side attachment/detachment mechanism 181 is a portion connected to the attachment/detachment mechanism 173 and a mechanism attached to/detached from the attachment/detachment mechanism 173 in association with a movement of the attachment/detachment mechanism 173. The structures of the attachment/detachment mechanism 173 and the slave device-side attachment/detachment mechanism 181 are not limited.

The target attachment mechanism 182 is a mechanism for being attached to a light irradiation target or a periphery thereof. When, for example, the light irradiation target is attracted to a magnet, the target attachment mechanism 182 can be a magnet. Further, the target attachment mechanism 182 may be, for example, an adhesive or the like that adheres to the light irradiation target. The target attachment mechanism 182 is not limited.

The light emission unit 183 generates guidance light when the slave device 18 has been detached. The generation of guidance light is not limited.

Figure 37:
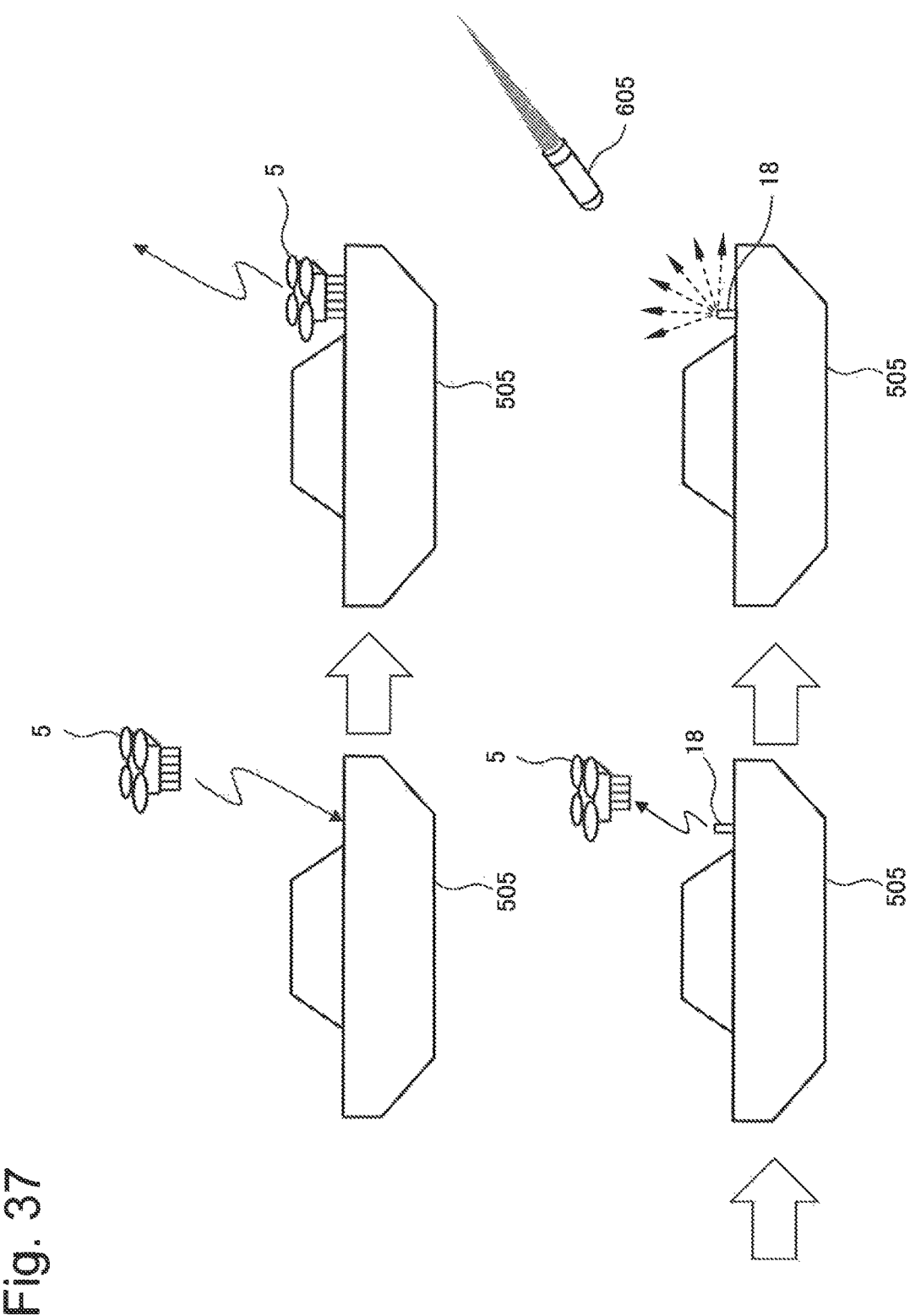
FIG. 37 is a conceptual diagram illustrating one example of a use scene of the light irradiation device according to the fifth example embodiment of the present invention.

FIG. 37 is one example of a use scene of the light irradiation device 5 according to the present example embodiment.

In the example of FIG. 37, first, the light irradiation device 5 approaches a light irradiation target 505 and tries to land. The light irradiation device 5 detaches, when having landed on the light irradiation target 505, any slave device 18. The detached slave device 18 is attached to the light irradiation target 505 and generates guidance light for guiding a flying object. The flying object guided by the guidance light flies toward the light irradiation target 505.

As described above, according to the light irradiation device according to the present example embodiment, the light irradiation device 5 can dispose a slave device which generates guidance light for a plurality of light irradiation targets. Therefore, according to the present example embodiment, a flying object guided by guidance light can be more efficiently guided to a light irradiation target, compared with the light irradiation device according to the fourth example embodiment. At that time, even when the flying object guided by guidance light makes contact with the light irradiation target, the light irradiation device according to the present example embodiment is not broken down.

(Sixth Example Embodiment)

Figure 38:
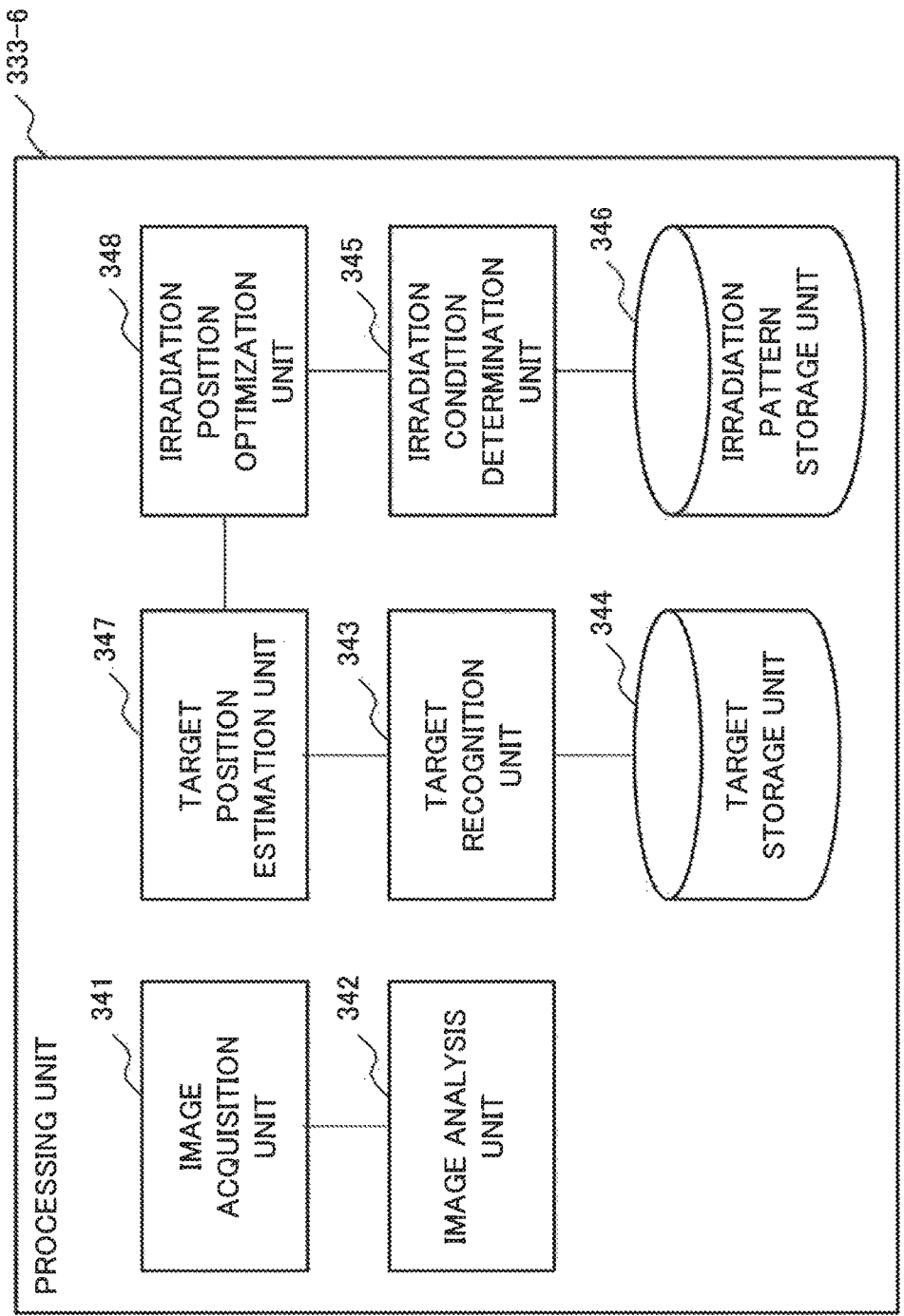
FIG. 38 is a block diagram illustrating a configuration of a processing unit included in a control means of a light irradiation device according to a sixth example embodiment of the present invention.

Next, a light irradiation device 6 according to a sixth example embodiment of the present invention will be described with reference to corresponding drawings. FIG. 38 is a block diagram illustrating a configuration of a processing unit 333-6 of the light irradiation device according to the present example embodiment.

The processing unit 333-6 of the light irradiation device 6 according to the present example embodiment includes a target position estimation unit 347 and an irradiation position optimization unit 348, in addition to the configuration of the processing unit 333 according to the first example embodiment.

Figure 39:
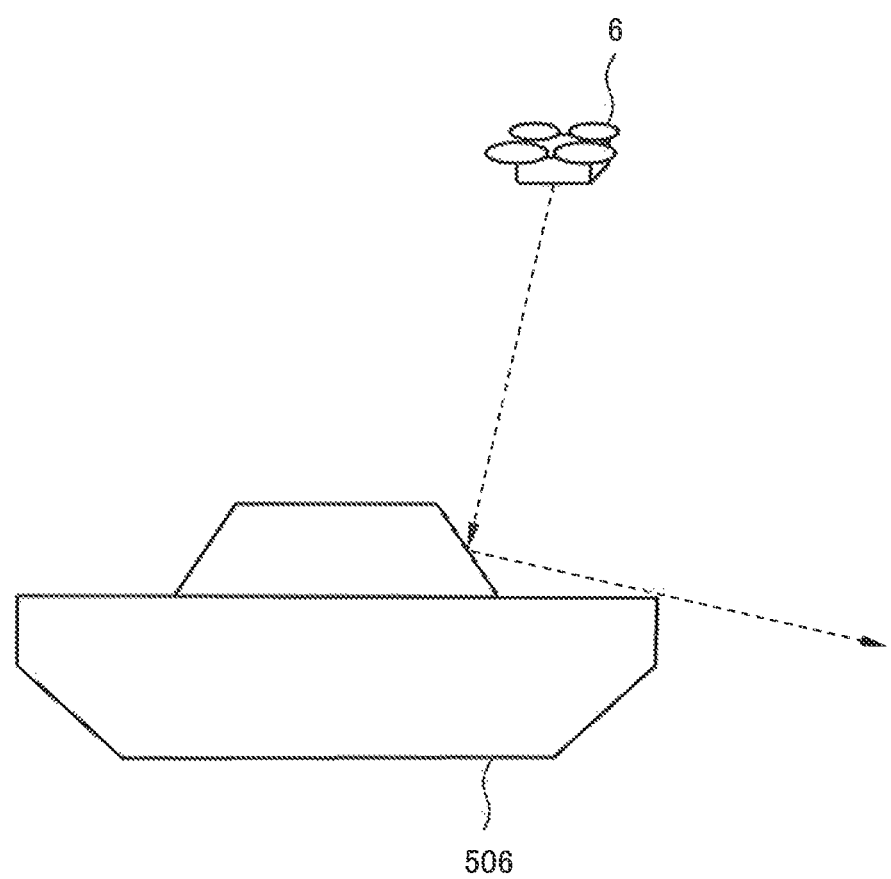
FIG. 39 is a conceptual diagram illustrating one example of a use scene targeted by the light irradiation device according to the sixth example embodiment of the present invention.

FIG. 39 is an example in which when the light irradiation device 6 directly irradiates a light irradiation target 506 with signal light, the emitted signal light is reflected on a surface of the light irradiation target 506 without being scattered. In this case, it is difficult for a flying object to capture guidance light.

Figure 40:
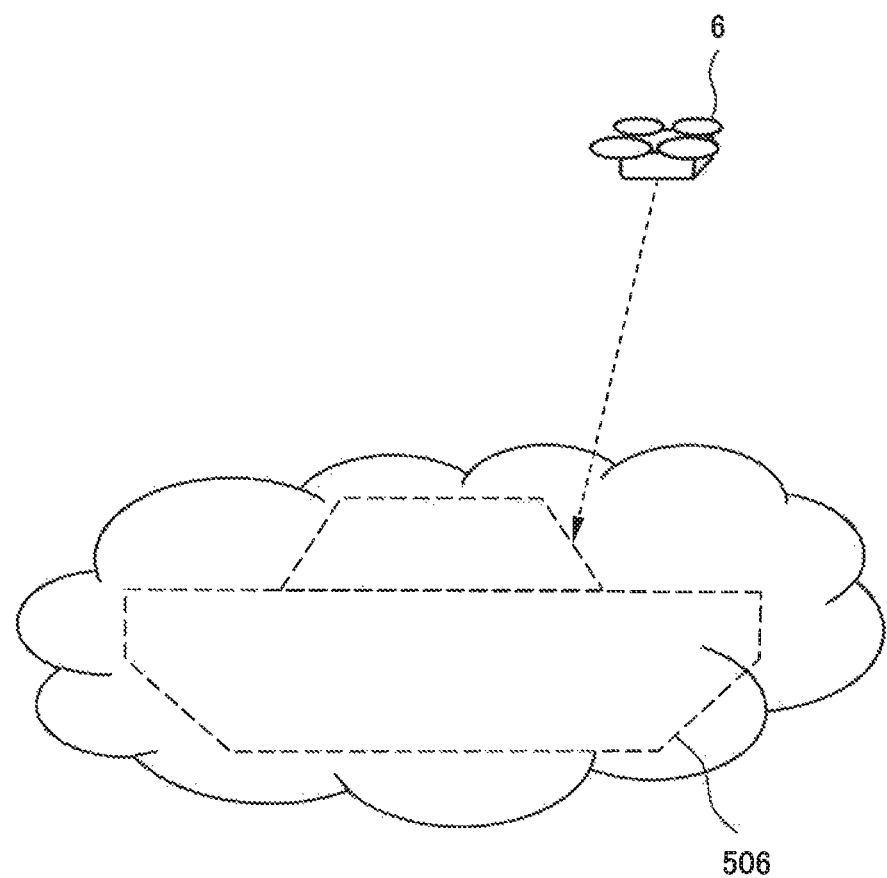
FIG. 40 is a conceptual diagram illustrating one example of a use scene targeted by the light irradiation device according to the sixth example embodiment of the present invention.

FIG. 40 is an example in which the light irradiation target 506 is in a cloud of dust or is making a smoky screen. In this case, it is difficult for the light irradiation device 6 to directly image the light irradiation target 506, and therefore it is difficult to irradiate the light irradiation target 506 with signal light.

As in the examples of FIG. 39 and FIG. 40, when it is difficult for the light irradiation device 6 to directly irradiate the light irradiation target 506 with signal light, it is necessary to change a position to be irradiated with signal light to a vicinity of the light irradiation target 506. In such a case, the information input/output function 30 may verify how much light has returned to the information input/output function 30 in signal light emitted to the light irradiation target 501 and ascertain a state of the light irradiation target 501.

The target position estimation unit 347 estimates a position of the light irradiation target 506, when it is difficult to image the light irradiation target 506 directly.

The target position estimation unit 347 acquires, when, for example, the light irradiation target 506 is making a smoky screen in an own periphery, information relating to the smoky screen from the target recognition unit 343 and identifies an outer edge of the smoky screen. At that time, the target position estimation unit 347 captures a movement of the smoky screen as a movement of the light irradiation target 506 and calculates a moving velocity and a position of the outer edge of the smoky screen. The target position estimation unit 347 then calculates an estimated position of the light irradiation target.

The irradiation position optimization unit 348 optimizes a position to be irradiated with signal light, based on the estimated position of the light irradiation target 506 estimated by the target position estimation unit 347.

Figure 41:
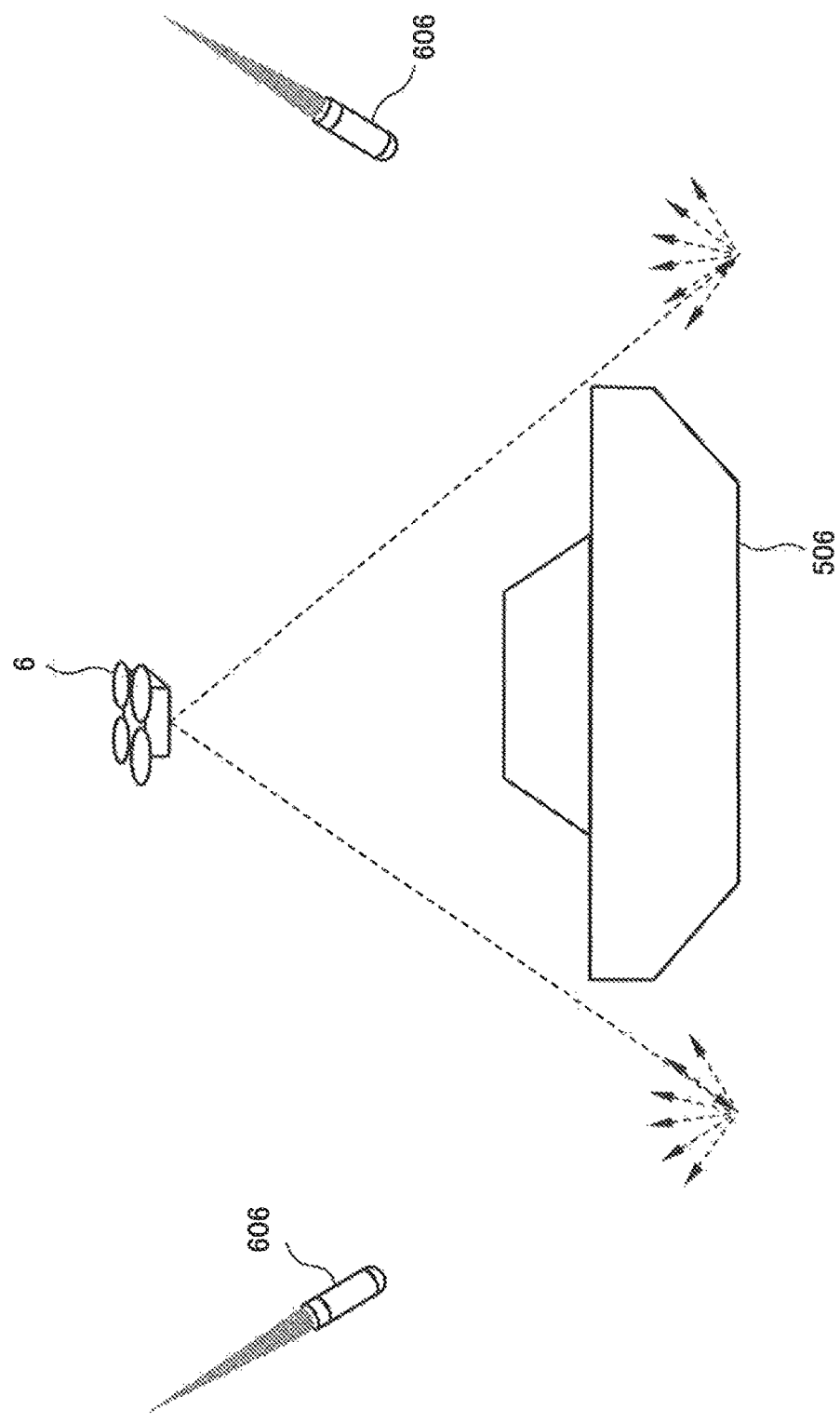
FIG. 41 is a conceptual diagram illustrating one example of a use scene of the light irradiation device according to the sixth example embodiment of the present invention.
Figure 42:
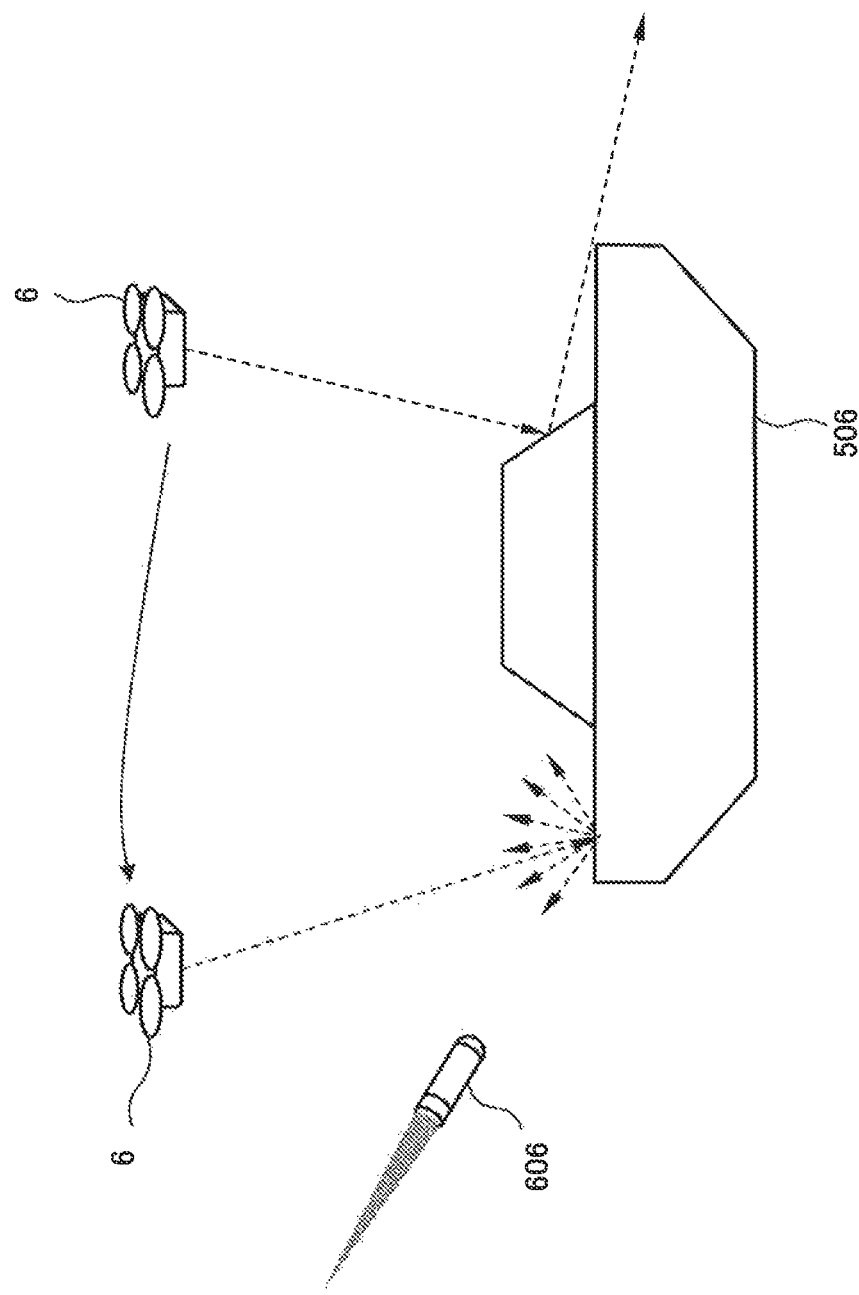
FIG. 42 is a conceptual diagram illustrating one example of a use scene of the light irradiation device according to the sixth example embodiment of the present invention.

As in FIG. 39, it is assumed that, for example, the light irradiation target 506 has an exterior that does not scatter signal light. In such a case, the light irradiation device 6 irradiates, as in FIG. 41, a vicinity of the light irradiation target 506 with signal light. Further, it is assumed that a part of the light irradiation target 506 has an exterior that does not scatter signal light but another part thereof has an exterior that scatters signal light. In such a case, the light irradiation device 6 irradiates, as in FIG. 42, the exterior portion that scatters signal light of the light irradiation target 506 with signal light. However, in cases as in FIG. 39 and FIG. 42, the control means 33 may be configured to control the projection means 32 to irradiate the light irradiation target 506 with light having an irradiation diameter as large as the scattered light of FIG. 14 to emit simulated guidance light.

Figure 43:
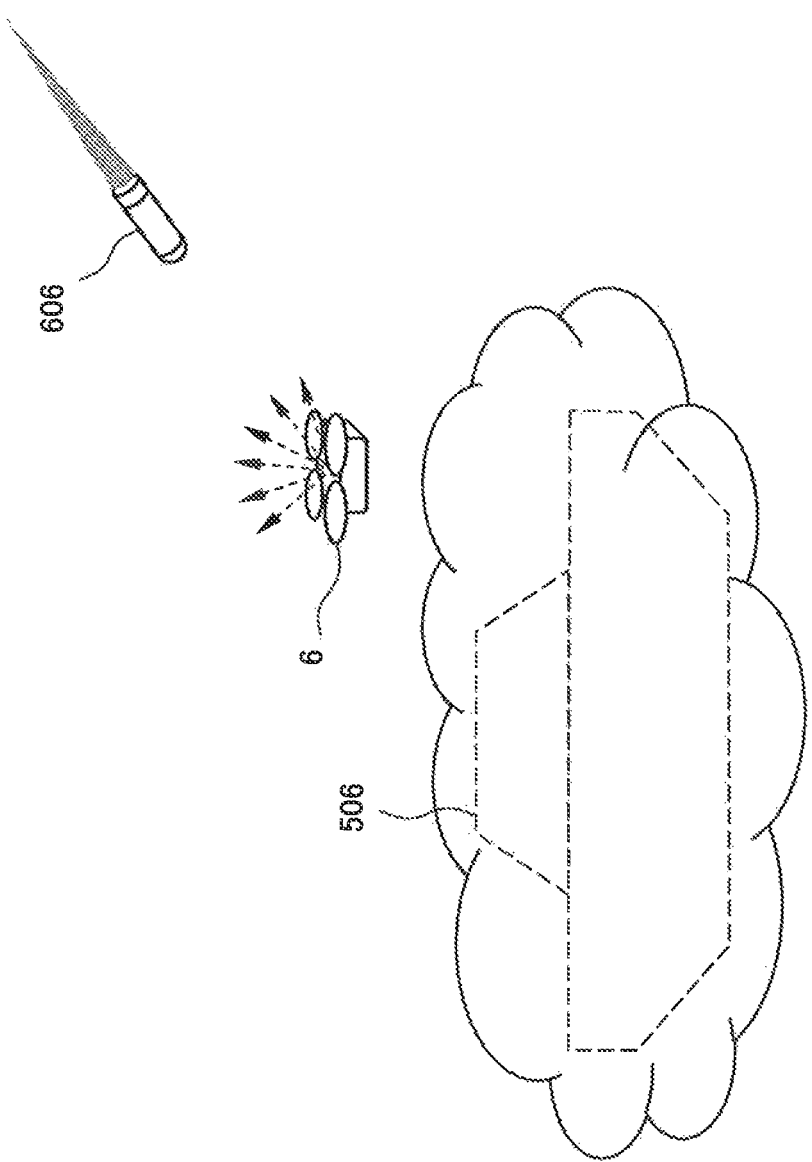
FIG. 43 is a conceptual diagram illustrating one example of a use scene of the light irradiation device according to the sixth example embodiment of the present invention.

Further, when the light irradiation target 506 is making a smoky screen in an own periphery as in FIG. 40, the light irradiation device 6 may emit signal light or guidance light at a position for guiding a flying object to an estimated position of the light irradiation target as in FIG. 43 and guide the flying object.

As described above, even in any of the cases of FIG. 39 and FIG. 40, the flying object 606 can fly by being guided by signal light.

As described above, according to the light irradiation device according to the present example embodiment, even when it is difficult to directly image a light irradiation target or it is difficult to directly irradiate a light irradiation target with signal light, a flying object can be guided to the light irradiation target or a vicinity thereof.

(Hardware Configuration)

Figure 44:
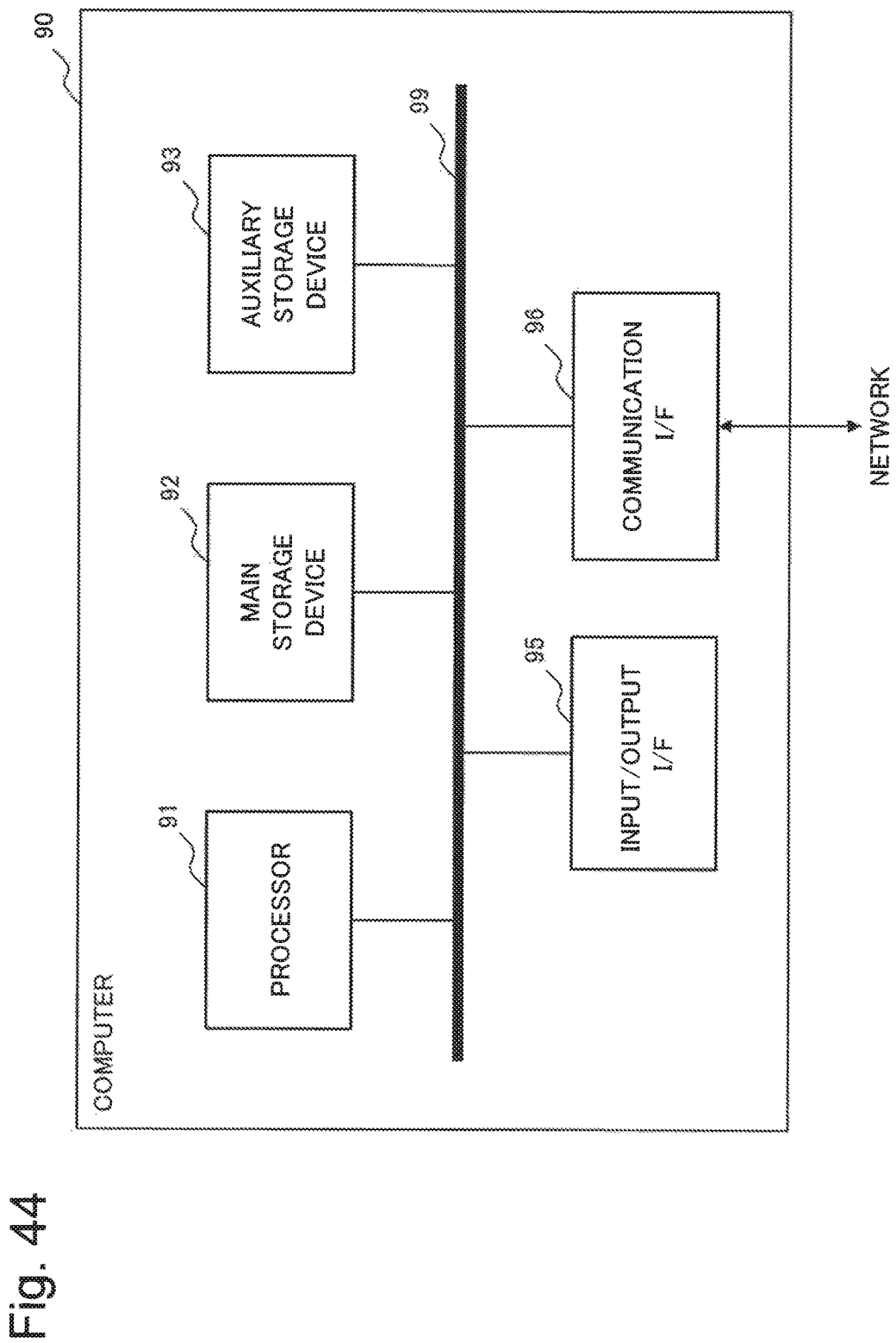
FIG. 44 is a block diagram illustrating one example of a hardware configuration of the light irradiation device of each example embodiment of the present invention.

Next, a hardware configuration for making the function of the light irradiation device according to each example embodiment of the present invention possible will be described by citing a computer 90 of FIG. 44 as one example. The computer 90 of FIG. 44 is one configuration example for making the light irradiation device according to each example embodiment possible and does not limit the scope of the present invention. Further, the light irradiation device according to each example embodiment is preferably a microcomputer including a function of the computer 90 of FIG. 44.

As in FIG. 44, the computer 90 includes a processor 91, a main storage device 92, an auxiliary storage device 93, an input/output interface 95, and a communication interface 96. The processor 91, the main storage device 92, the auxiliary storage device 93, the input/output interface 95, and the communication interface 96 are connected to each other via a bus 99 in such a way as to be able to transfer data. Further, the processor 91, the main storage device 92, the auxiliary storage device 93, and the input/output interface 95 are wirelessly connected to a network such as the Internet, an intranet, and the like via the communication interface 96.

The computer 90 is connected to a server and a computer of a higher-level system via the network and receives data from the higher-level system.

The processor 91 develops a program stored on the auxiliary storage device 93 or the like on the main storage device 92 and executes the developed program. In the present example embodiment, a configuration in which a software program installed on the computer 90 is used may be made. The processor 91 executes arithmetic processing and control processing of the light irradiation device according to the present example embodiment.

The main storage device 92 includes an area where a program is developed. The main storage device 92 may be a volatile memory such as a DRAM (Dynamic Random Access Memory) and the like, for example. Further, a non-volatile memory such as an MRAM (Magnetoresistive Random Access Memory) and the like may be configured/added as the main storage device 92.

The auxiliary storage device 93 is a means that stores various types of data such as an objective image and the like. The auxiliary storage device 93 includes a local disk such as a hard disk, a flash memory, and the like. A configuration in which various types of data are stored on the main storage device 92 may be made to omit the auxiliary storage device 93.

The input/output interface 95 is a device that connects the computer 90 and a peripheral device, based on a connection standard between the computer 90 and the peripheral device. The communication interface 96 is an interface for establishing connection to a network such as the Internet, an intranet, and the like, based on a standard and specification. In FIG. 44, an interface is expressed for short as an I/F (Interface). The input/output interface 95 and the communication interface 96 may be commonalized as an interface connected to an external device.

The computer 90 may be configured to be able to be connected to an input device such as a keyboard, a mouse, a touch panel, and the like as necessary. These input devices are used for inputting information and a setting. When a touch panel is used as an input device, a display unit of a display device may be configured to double as an input unit of the input device. Data transfer between the processor 91 and the input device may be mediated by the input interface 95.

The communication interface 96 is connected to a higher-level system such as a server, another computer, and the like through a network. The higher-level system transmits a phase distribution of a basic image used in each example embodiment of the present invention to the computer 90 via the communication interface 96. Further, the higher-level system transmits various types of data used in each example embodiment of the present invention to the computer 90 via the communication interface 96.

Further, the computer 90 may include a display device for displaying various types of information. When a display device is included, the computer 90 preferably includes a display control device (not illustrated) for controlling display of the display device. The display device may be connected to the computer 90 via the input interface 95.

Further, the computer 90 may include a reader/writer, as necessary. The reader/writer is connected to the bus 99, mediates reading, between the processor 91 and a recording medium (program recording medium), which is not illustrated, of data and a program from the recoding medium, writing of a processing result of the computer 90 onto the recording medium, and the like. The recording medium can be enabled using a semiconductor recording medium such as an SD (Secure Digital) card, a USB (Universal Serial Bus) memory, and the like, for example. Further, the recording medium 516 may be enabled using a magnetic recording medium such as a flexible disk and the like, an optical recording medium such as a CD (Compact Disk), a DVD (Digital Versatile Disc), and the like, or another recording medium.

The above is one example of the hardware configuration for making the light irradiation device according to each example embodiment of the present invention possible. The hardware configuration of FIG. 44 is one example of the hardware configuration for making the light irradiation device according to each example embodiment possible and does not limit the scope of the present invention. Further, a processing program that causes a computer to execute processing according to the light irradiation device according to each example embodiment is also included in the scope of the present invention. Further, a program recording medium recording the processing program according to each example embodiment is also included in the scope of the present invention.

While the present invention has been described with reference to example embodiments thereof, the present invention is not limited to these example embodiments. The constitution and details of the present invention can be subjected to various modifications which can be understood by those skilled in the art, without departing from the scope of the present invention.

This application is based upon and claims the benefit of priority from Japanese patent application No. 2015-085822, filed on Apr. 20, 2015, the disclosure of which is incorporated herein in its entirety by reference.

REFERENCE SIGNS LIST

1 Light irradiation device
10 Main body
11 Antenna
12 Communication means
13 Flight control means
14 Propeller drive means
15 Rechargeable battery
17 Slave device attachment/detachment means
18 Slave device
20 Propeller
21 Blade
22 Motor
25 Frame
30 Information input/output function
31 Imaging means
32 Projection means
33 Control means
36 Light source
37 Light source drive unit
38 Projection unit
50 Power feeding station
51 Communication unit
52 Take-off/landing space
53 Power feeding control unit
54 Power feeding unit
60 Monitoring center
131 Information input unit
132 Information processing unit
133 Flight position identification unit
134 Drive condition setting unit
135 Flight condition storage unit
136 Rechargeable battery monitoring unit
171 Reception unit
172 Attachment/detachment control unit
173 Attachment/detachment mechanism
181 Slave device-side attachment/detachment mechanism
182 Target attachment mechanism
183 Light emission unit
200 Light irradiation target detection device
201 Microwave generation unit
202 Microwave irradiation unit
203 Reflected wave reception unit
204 Measurement unit
301 Camera
302 Projector
311 Imaging element
313 Image processing processor
314 Internal memory
315 Data output unit
321 Light source drive unit
322 Light source
324 Phase modulation element control unit
325 Phase modulation element
326 Projection unit
327 Fourier transform lens
328 Aperture
329 Projection lens
331 Imaging control unit
332 Communication unit
333 Processing unit
334 Projection image storage unit
335 Projection control unit
336 Sound wave control unit
337 Waveform storage unit
338 Sound wave determination unit
341 Image acquisition unit
342 Image analysis unit
343 Target storage unit
344 Target recognition unit
345 Irradiation condition determination unit
346 Irradiation pattern storage unit
347 Target position estimation unit
348 Irradiation position optimization unit
351 Sound wave output means
352 Sound wave input means

What is claimed is:

1. A light irradiation device comprising:
an imager that images a monitoring region;
a projector comprising a phase-modulation-type space modulation element,
wherein the projector irradiates the monitoring region with signal light comprising modulation light reflected by a display surface of the phase modulation element;
a controller that controls the imager to image the monitoring region and controls the projector to emit the signal light;
a propeller that moves the light irradiation device in the air; and
a flight controller that controls flight of the light irradiation device by controlling the propeller; and
at least one slave device that is detachable, the slave device being configured to be attached to a light irradiation target and comprising a light emission unit that generates guidance light for guiding a flying object,
wherein the controller controls, when recognizing the light irradiation target to be irradiated with the signal light on image data imaged by the imager, the projector to emit the signal light toward the light irradiation target, wherein the projector displays a phase distribution, the phase distribution for displaying an objective image on a projected surface, and wherein the projector irradiates the display surface of the phase modulation element with light.

2. The light irradiation device according to claim 1, wherein the controller outputs, when recognizing the light irradiation target on the image data, a flight instruction for causing the light irradiation device to fly toward the light irradiation target to the flight controller, and wherein the flight controller controls the light irradiation device to fly toward the light irradiation target in accordance with the flight instruction.

3. The light irradiation device according to claim 2, wherein the controller comprises:

an imaging controller that controls the imager;

a projection controller that controls the projector; and a processor that analyzes the image data obtained by imaging the monitoring region, and wherein the processor comprises:

an image acquisition unit that acquires the image data from the imager;

an image analysis unit that analyzes the image data acquired by the image acquisition unit, detects a light irradiation candidate on the image data, and outputs information relating to the detected light irradiation candidate;

a target storage unit that stores information relating to the light irradiation target;

a target recognition unit that verifies, when acquiring the information relating to the light irradiation candidate output by the image analysis unit, whether the light irradiation candidate is the light irradiation target by referring to the information relating to the light irradiation target stored on the target storage unit and outputs, when recognizing the light irradiation target, the information relating to the light irradiation candidate;

an irradiation pattern storage unit that stores an irradiation pattern of the signal light to be emitted to the light irradiation target; and an irradiation condition determination unit that determines, based on the information relating to the light irradiation candidate output from the target recognition unit, the irradiation pattern by referring to the irradiation pattern storage unit.

4. The light irradiation device according to claim 3, wherein the controller comprises a target position estimation unit that estimates a position of the light irradiation target from the image data.

5. The light irradiation device according to claim 4, wherein the controller comprises an irradiation position optimization unit that optimizes, based on the position of the light irradiation target estimated by the target position estimation unit, an irradiation position to be irradiated with signal light.

6. The light irradiation device according to claim 3, wherein the target storage unit stores information for recognizing a bird as information relating to the light irradiation target, wherein the target recognition unit verifies, when acquiring information relating to the light irradiation candidate output by the image analysis unit, whether the light irradiation candidate is a bird by referring to the information for recognizing a bird stored on the target storage unit and outputs, when the bird is recognized, information in which the light irradiation target is a bird, wherein the irradiation condition determination unit determines, based on the information in which the light irradiation target is a bird output from the target recognition unit, the irradiation pattern by referring to the irradiation pattern storage unit, and wherein the projection control unit performs control for emitting signal light toward the bird that is the light irradiation target.

7. The light irradiation device according to claim 1, wherein the flight controller comprises:

a flight position identification unit that identifies a position where the light irradiation device is flying;

a flight condition storage unit that stores a flight condition for the light irradiation device;

an information input unit that receives information relating to the monitoring region and the light irradiation target;

an information processing unit that sets a flight condition for the light irradiation device based on the information input to the information input unit; and a drive condition setting unit that sets a drive condition for the propeller by referring to the flight condition stored on the flight condition storage unit.

8. The light irradiation device according to claim 7, wherein the information processing unit sets, when acquiring a flight condition from a higher-level system, a flight condition for the light irradiation device based on the flight condition acquired from the higher-level system.

9. The light irradiation device according to claim 1, further comprising a sound wave output unit that outputs, toward the light irradiation target, a sound wave having directionality.

10. The light irradiation device according to claim 1, further comprising:

a sound wave input unit that acquires a sound wave during monitoring of the monitoring region, wherein the controller comprises:

a waveform storage unit that stores feature data of a sound wave emitted from the light irradiation target; and a sound wave determination unit that compares a waveform of the sound wave acquired by the sound wave input unit and the feature data of the sound wave stored on the waveform storage unit and determines a presence or absence of the feature data emitted from the light irradiation target in the waveform of the sound wave acquired during monitoring of the monitoring region.

11. The light irradiation device according to claim 1, wherein the projector comprises:

a light source that emits light having a specific wavelength;

a light source driver that drives the light source in accordance with the control of the controller;

a phase modulator that comprises a display surface that light emitted from the light source enters and displays a phase distribution of an image to be emitted to the light irradiation target on the display surface;

a phase modulator controller that displays the phase distribution on the display surface of the phase modulator; and a projection unit that projects signal light emitted from the display surface of the phase modulator to the light irradiation target.

12. The light irradiation device according to claim 11, wherein the projector irradiates a plurality of the light irradiation targets of the monitoring region with signal light at the same time.

13. The light irradiation device according to claim 11, wherein the light source emits laser light having a wavelength of an infrared region, and
wherein the phase modulator controller controls the display surface of the phase modulator to display a phase distribution of an encrypted image.

14. A light irradiation system comprising:
a light irradiation device comprising:
an imager that images a monitoring region;
a projector comprising a space modulation element of a phase modulation type,
wherein the projector irradiates the monitoring region with signal light comprising modulation light reflected by a display surface of the phase modulation element;
a controller that controls the imager to image the monitoring region and controls the projector to emit the signal light;
a propeller that moves the light irradiation device in the air;
a flight controller that controls flight of the light irradiation device by controlling the propeller and monitors a charging state of a rechargeable battery mounted on the light irradiation device;
at least one slave device that is detachable, the slave device being configured to be attached to a light irradiation target and comprising a light emission unit that generates guidance light for guiding a flying object; and
a stationary camera station comprising the imager, the projector, and the controller,
wherein the controller controls, when recognizing the light irradiation target to be irradiated with signal light on image data imaged by the imager, the projector to emit the signal light toward the light irradiation target; and
wherein the projector displays a phase distribution for displaying an objective image on a projected surface, and irradiates the display surface of the phase modulation element with light.

15. The light irradiation system according to claim 14, wherein the light irradiation device and the camera station cooperate with another light irradiation device and another camera station by wirelessly communicating with each other and cooperatively irradiate the light irradiation target with signal light for guiding the light irradiation target in a desired direction.

16. The light irradiation system according to claim 14, further comprising a power feeding station that feeds power to the light irradiation device,
wherein the flight controller performs control for moving toward the power feeding station in accordance with a charging state of the rechargeable battery of the light irradiation device.

17. The light irradiation system according to claim 14, further comprising a light irradiation target detection device comprising:
a microwave generation unit that generates a microwave having a specific wavelength;
a microwave irradiation unit that emits the microwave generated by the microwave generation unit;
a reflected wave reception unit that comprises an antenna for receiving a reflected wave of the microwave emitted by the microwave emission unit; and
a measurement unit that measures a position and a direction of the light irradiation target from the reflected wave received by the reflected wave reception unit.

18. The light irradiation system according to claim 14, wherein the system acquires image data of the monitoring region by wireless communication with the camera station and the light irradiation device and controls, when recognizing the light irradiation target on the acquired image data, either the camera station or the light irradiation device to emit signal light toward the light irradiation target.

* * * * *